(12) United States Patent
Beveridge et al.

(10) Patent No.: US 11,368,517 B2
(45) Date of Patent: Jun. 21, 2022

(54) SECURE AUTOMATED RESOURCE-EXCHANGE SYSTEM

(71) Applicant: VMware, Inc., Palo Alto, CA (US)

(72) Inventors: Daniel James Beveridge, Apollo Beach, FL (US); Ricky Trigalo, Palo Alto, CA (US); Jivan Madtha, Pune (IN); Anil Sharma, Palo Alto, CA (US); Joerg Lew, Rettenberg (DE)

(73) Assignee: VMware, Inc., Palo Alto, CA (US)

( * ) Notice: Subject to any disclaimer, the term of this patent is extended or adjusted under 35 U.S.C. 154(b) by 1233 days.

(21) Appl. No.: 15/832,065

(22) Filed: Dec. 5, 2017

(65) Prior Publication Data

US 2018/0095997 A1  Apr. 5, 2018

Related U.S. Application Data

(63) Continuation-in-part of application No. 15/285,355, filed on Oct. 4, 2016, now Pat. No. 10,965,733.
(Continued)

(51) Int. Cl.
*H04L 67/10* (2022.01)
*G06F 9/455* (2018.01)
(Continued)

(52) U.S. Cl.
CPC .............. *H04L 67/10* (2013.01); *G06F 9/455* (2013.01); *G06F 9/45558* (2013.01);
(Continued)

(58) Field of Classification Search
CPC ..... H04L 67/10; H04L 47/70; G06F 16/2471; G06F 9/455; G06F 9/45558; G06F 2009/45579
See application file for complete search history.

(56) References Cited

U.S. PATENT DOCUMENTS

2006/0059565 A1* 3/2006 Green .................. G06F 9/50
726/27
2012/0131591 A1* 5/2012 Moorthi ................ H04L 67/10
718/104

(Continued)

OTHER PUBLICATIONS

Yeluri, Raghuram, and Enrique Castro-Leon. Building the Infrastructure for Cloud Security: A Solutions View. Springer Nature, 2014. (Year: 2014).*

(Continued)

*Primary Examiner* — Mohsen Almani

(57) ABSTRACT

The current document is directed a resource-exchange system that facilitates resource exchange and sharing among computing facilities. The currently disclosed methods and systems employ efficient, distributed-search-based auction methods and subsystems within distributed computer systems that include large numbers of geographically distributed data centers to locate resource-provider computing facilities that match the resource needs of resource-consumer computing facilities. Multiple security methods and subsystems are employed to prevent unauthorized access to resource-exchange-system services, to secure resource-exchange-system-participant data from unauthorized access, and to prevent hosted virtual machines and other hosted computational entities from interfering with operation of native virtual machines and other native computational entities within hosting resource-provider computing facilities.

9 Claims, 52 Drawing Sheets

Related U.S. Application Data

(60) Provisional application No. 62/380,450, filed on Aug. 28, 2016.

(51) Int. Cl.
  *G06F 16/2458* (2019.01)
  *H04L 47/70* (2022.01)

(52) U.S. Cl.
  CPC .......... *G06F 16/2471* (2019.01); *H04L 47/70* (2013.01); *G06F 2009/45579* (2013.01)

(56) References Cited

U.S. PATENT DOCUMENTS

| | | |
|---|---|---|
| 2015/0067171 A1 | 3/2015 | Yum et al. |
| 2015/0326449 A1 | 11/2015 | Melander et al. |
| 2016/0308762 A1* | 10/2016 | Teng .................. H04L 12/4641 |
| 2017/0097841 A1* | 4/2017 | Chang ................ H04L 41/5038 |

OTHER PUBLICATIONS

International Search Report, dated Nov. 29, 2017.

* cited by examiner

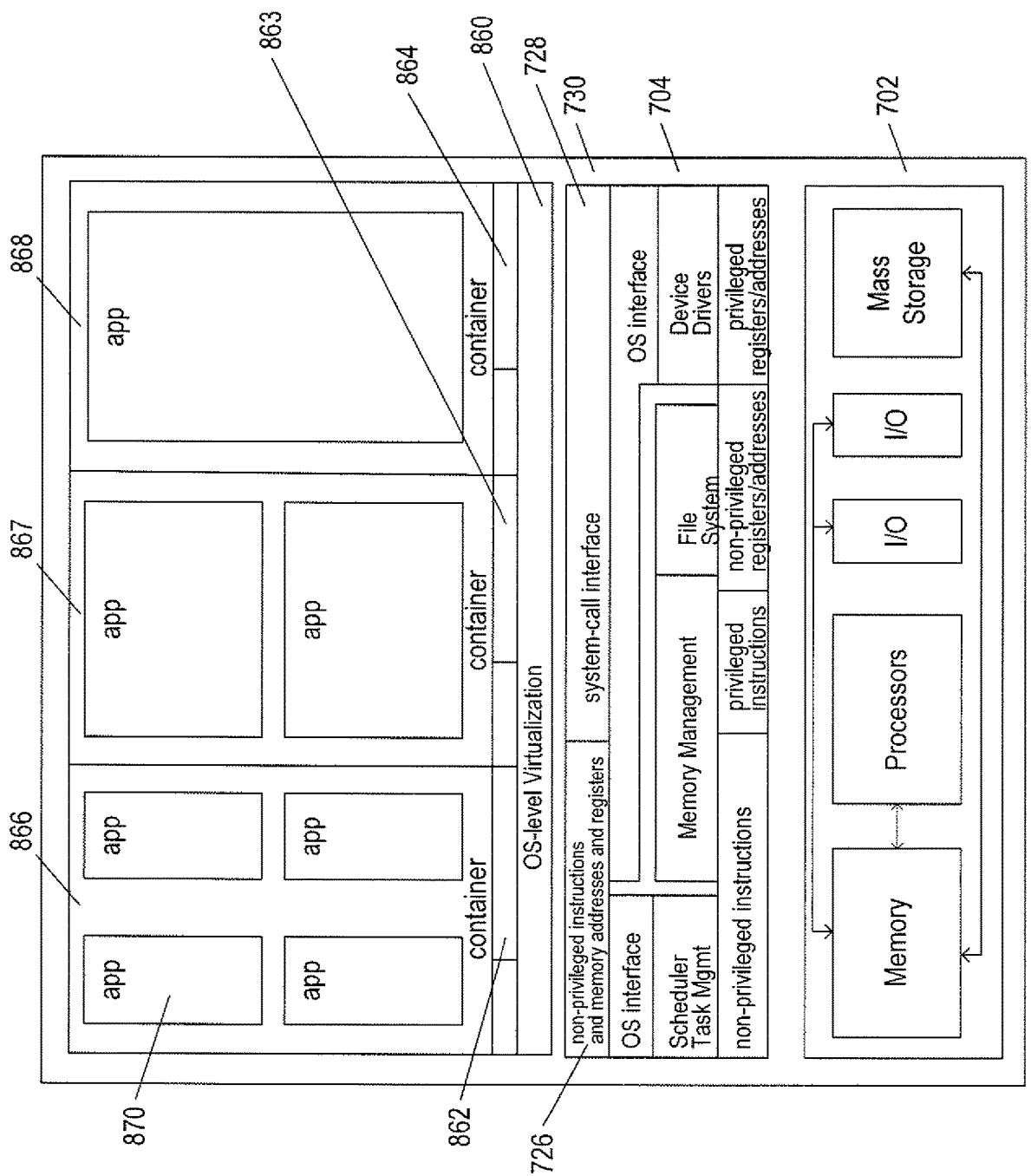

1540 — filter     attribute : relational_expression

1542 — policy     filter
                 {filter, filter}
                 {filter, filter, . . . , filter}

1544 — search_evaluation_expression     evaluator
                                             {evaluator, evaluator}
                                             {evaluator, evaluator, . . . , evaluator}

1546 — evaluator     simple_evaluator
                   weight, simple_evaluator 1548 — simple evaluator     minimum-positive_attribute
                          floor, minimum-positive_attribute 1550 — minimum-positive_attribute     numeric or ordered-set attribute with values that map
                                       to a set of numerically increasing values ordered in
                                       descending order with respect to desirability or fitness 1552 — search     search_evaluation_expression
               search_evaluation_expression, policy
               search_evaluation_expression, {policy, . . . , policy}

SECURE AUTOMATED RESOURCE-EXCHANGE SYSTEM

CROSS-REFERENCE TO RELATED APPLICATIONS

This application is a continuation-in-part of application Ser. No. 15/285,355, filed Oct. 4, 2016, which claims the benefit of Provisional Application No. 62/380,450, filed Aug. 28, 2016.

TECHNICAL FIELD

The current document is directed to distributed computer systems, distributed-computer-system management subsystems, and, in particular, to a secure automated resource-exchange system that protects automated-resource-exchange-system data, communications, and service access from being inadvertently or deliberately compromised.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computer systems, as a result of which owners, administrators, and users of distributed computer systems and consumers of computational resources provided by distributed computing systems increasingly rely on automated and semi-automated management and computational-resource-distribution subsystems to organize the activities of many users and computational-resource consumers and to control access to, and use of, computational resources within distributed computer systems. In many cases, greater overall computational efficiency can be obtained for a large number of distributed computing facilities when resources can be shared and exchanged among the distributed computing facilities. However, currently, effective resource sharing and exchange among computing facilities of multiple organizations is generally difficult or impossible.

SUMMARY

The current document is directed a resource-exchange system that facilitates resource exchange and sharing among computing facilities. The currently disclosed methods and systems employ efficient, distributed-search-based auction methods and subsystems within distributed computer systems that include large numbers of geographically distributed data centers to locate resource-provider computing facilities that match the resource needs of resource-consumer computing facilities. Multiple security methods and subsystems are employed to prevent unauthorized access to resource-exchange-system services, to secure resource-exchange-system-participant data from unauthorized access, and to prevent hosted virtual machines and other hosted computational entities from interfering with operation of native virtual machines and other native computational entities within hosting resource-provider computing facilities.

BRIEF DESCRIPTION OF THE DRAWINGS

FIGS. 8A-D illustrate several types of virtual machine and virtual-machine execution environments.

FIGS. 15A-C illustrate certain of the information and data entities used within the currently disclosed distributed-search methods and subsystems.

FIGS. 19A-B illustrate operation of the evaluator queues and master queue within an active search context.

DETAILED DESCRIPTION OF EMBODIMENTS

The current document is directed to a resource exchange that facilitates resource sharing among multiple computing facilities. In a first subsection, below, an overview of the problem domain addressed by the currently disclosed methods and systems is provided in a first subsection. A second subsection provides an overview of computer systems, virtualization layers, and distributed computer systems. A third subsection describes as distributed search engine and a fourth subsection provides a brief description of a distributed resource-exchange system that employs the distributed search engine and that aggregates a large number of physical and virtual data centers to create a distributed, multi-organization computing, resource-exchange, and resource-sharing facility. A fifth subsection discusses the life cycle of a resource exchange as represented by a resource-exchange context. Finally, in a sixth subsection, the currently disclosed security methods and subsystems are described.

The Problem Domain Addressed by the Currently Disclosed Methods and Systems

Figure 1:
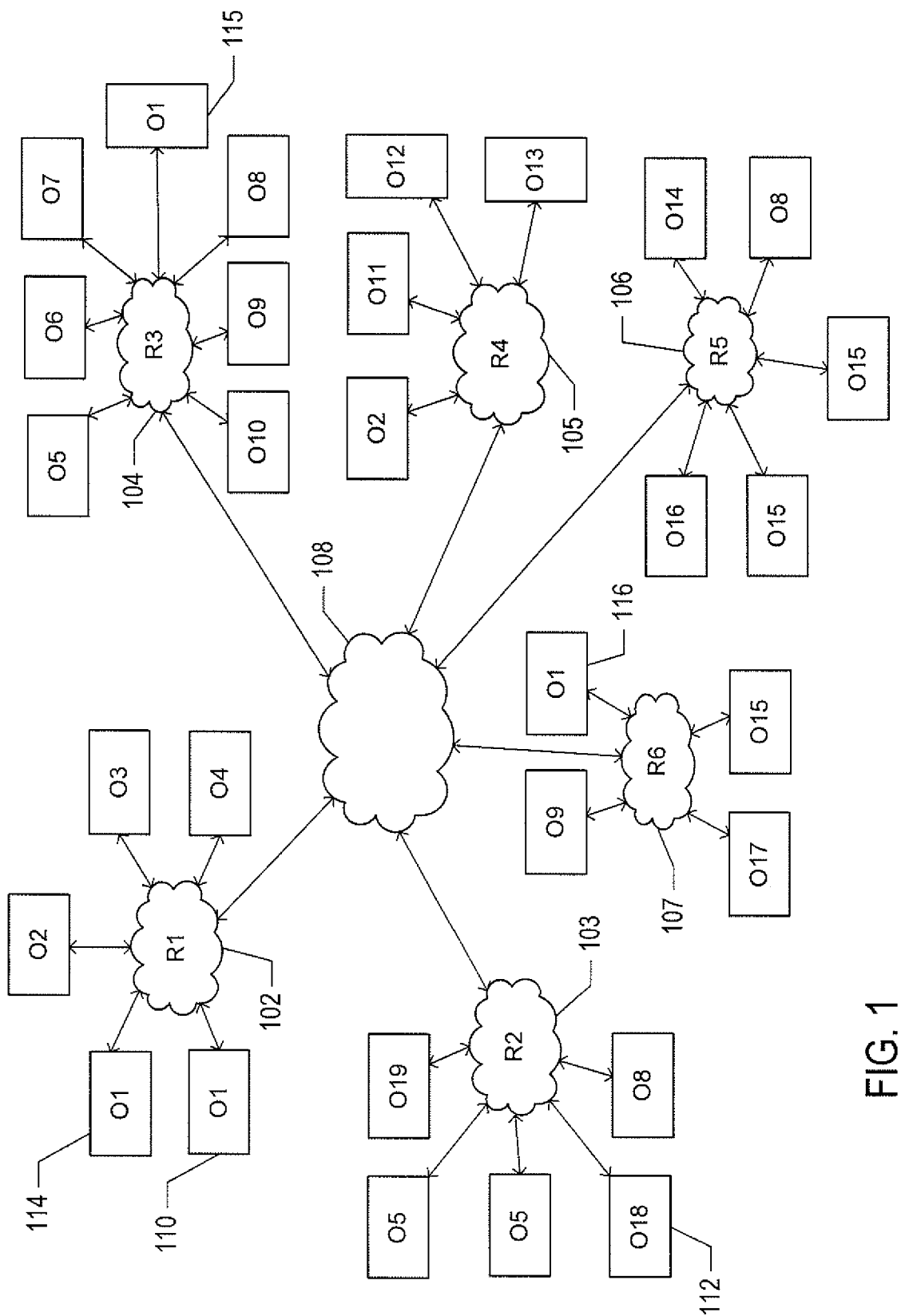
FIGS. 1, 2A-E, and 3 illustrate the problem domain addressed by the methods and systems disclosed in the current document.
Figure 2A:
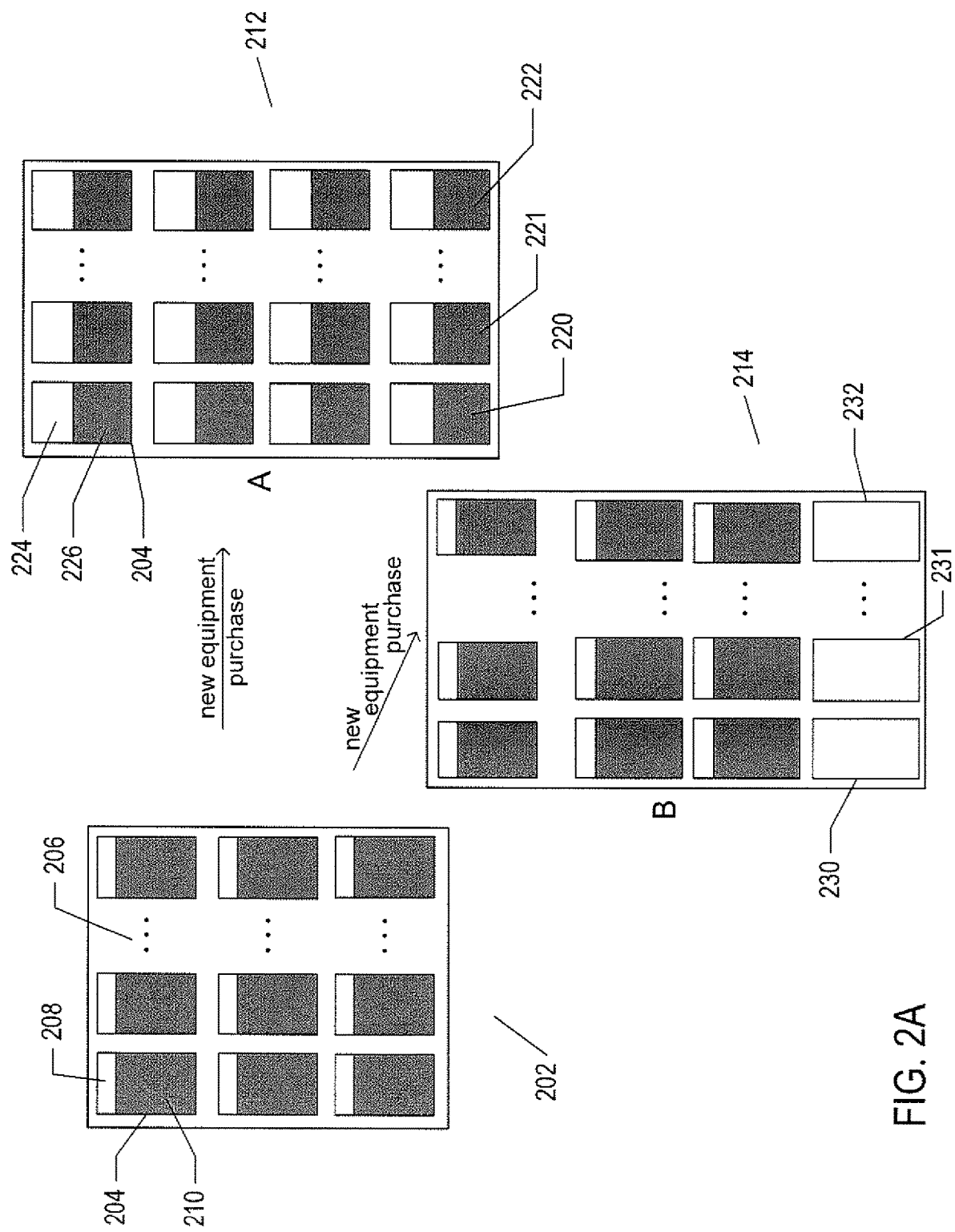
Figure 2B:
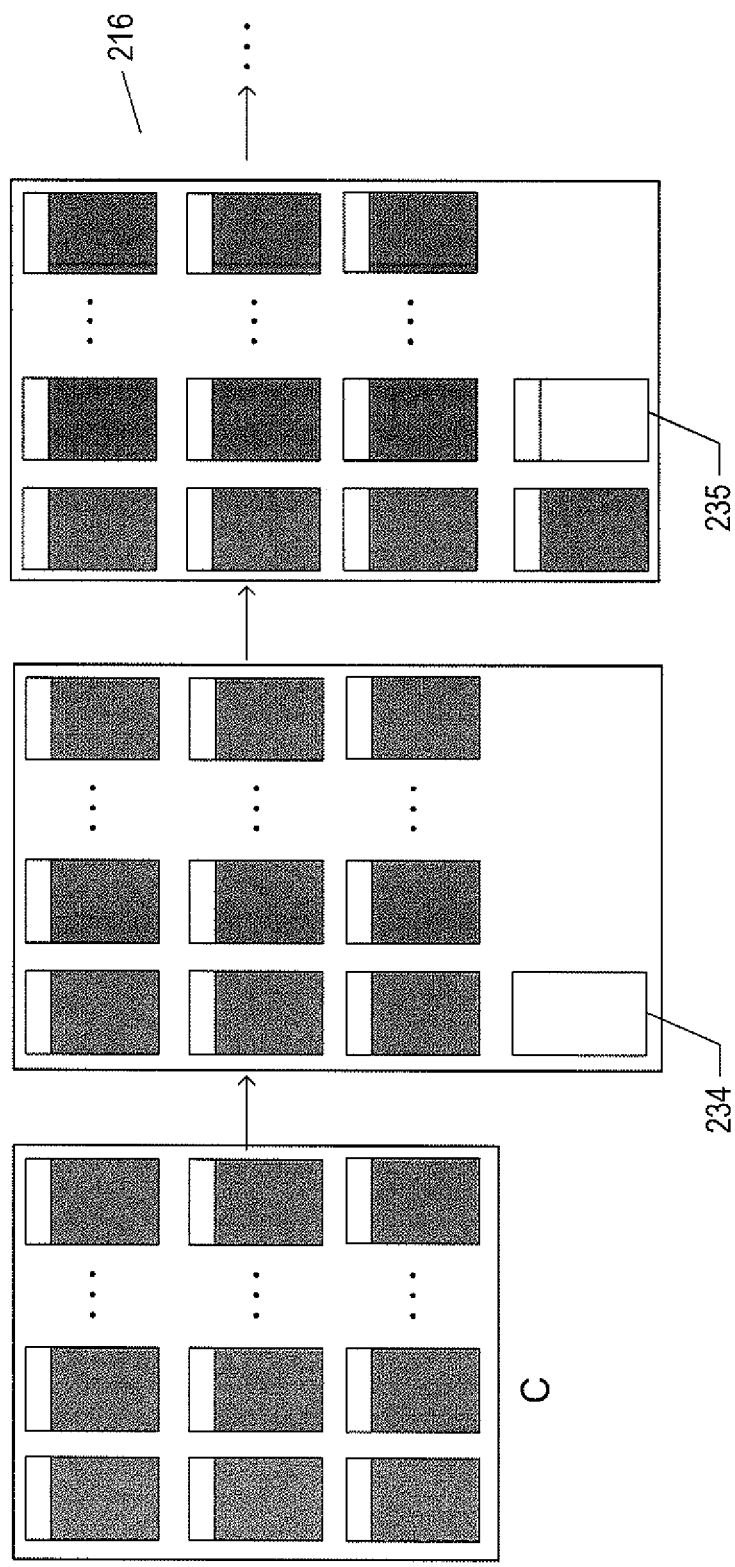
Figure 2C:
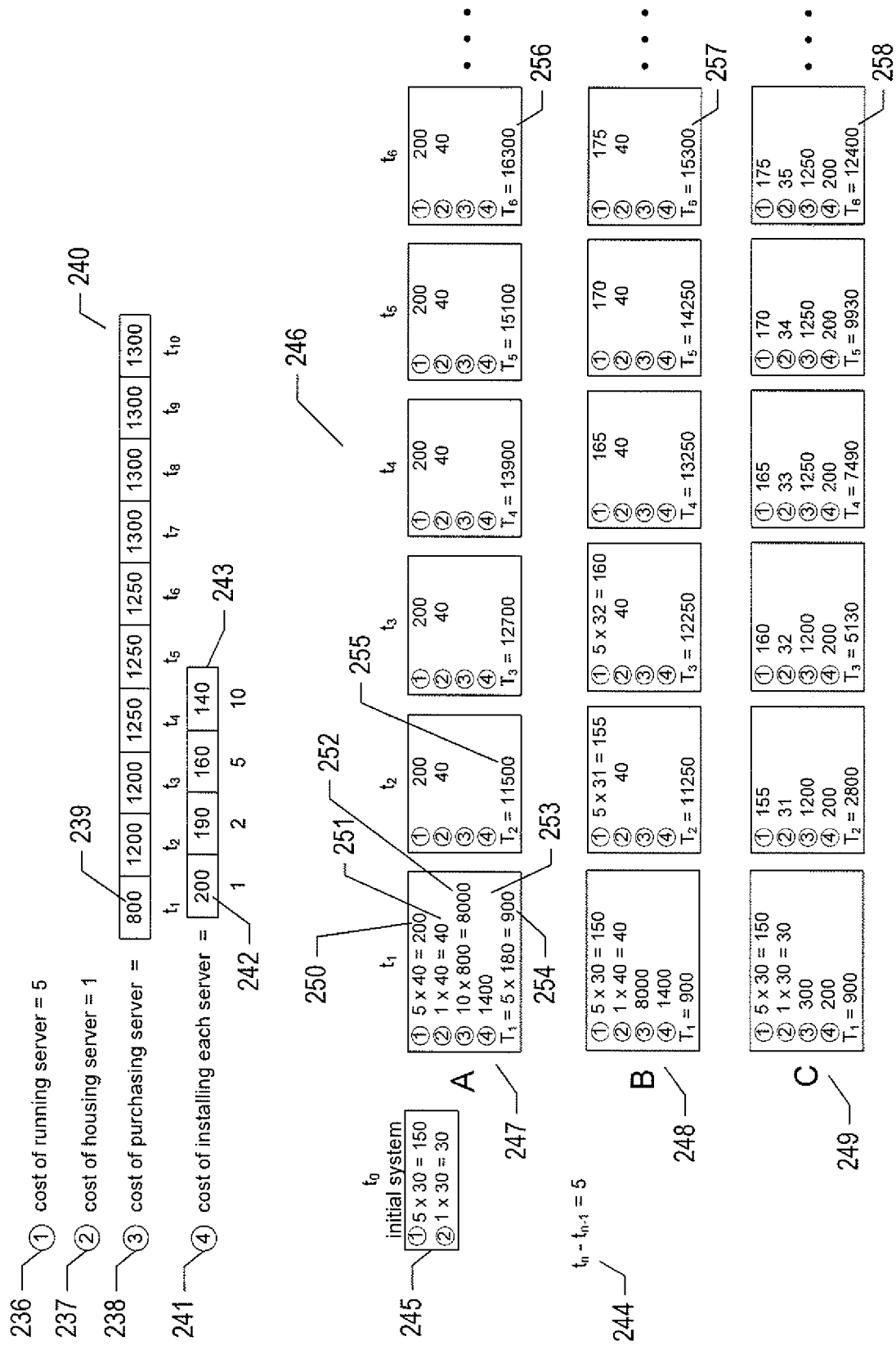
Figure 2D:
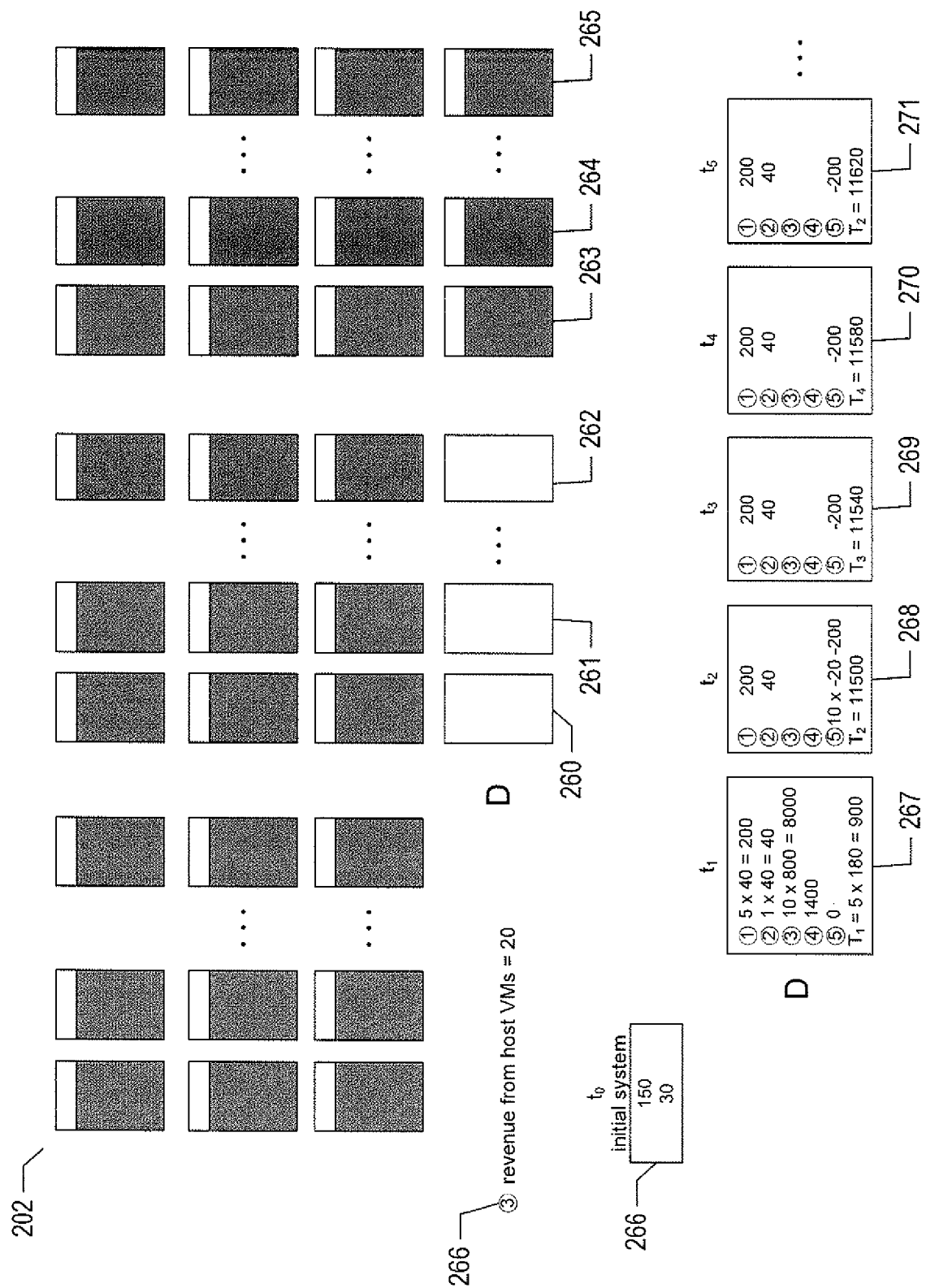
Figure 2E:
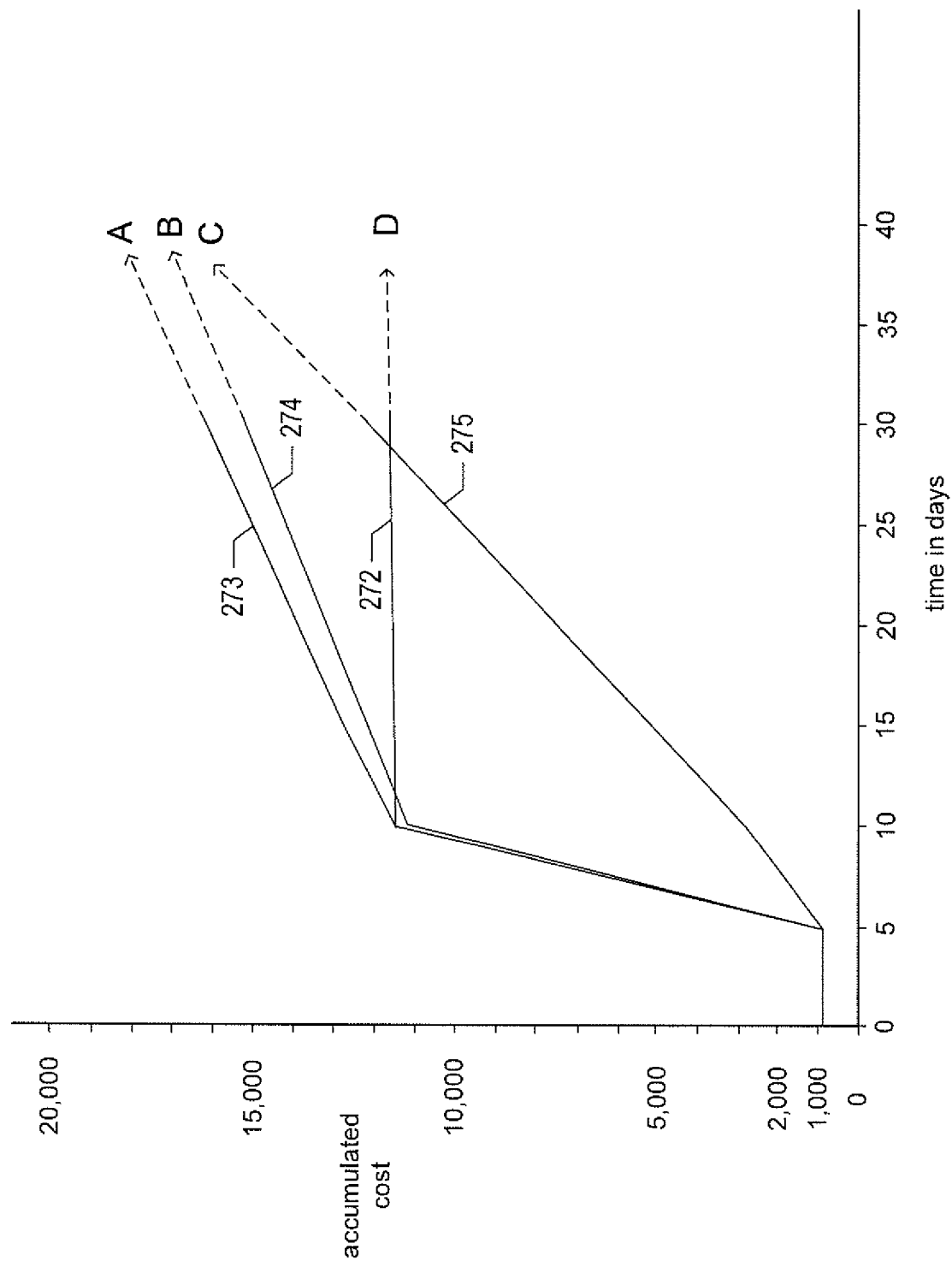
Figure 3:
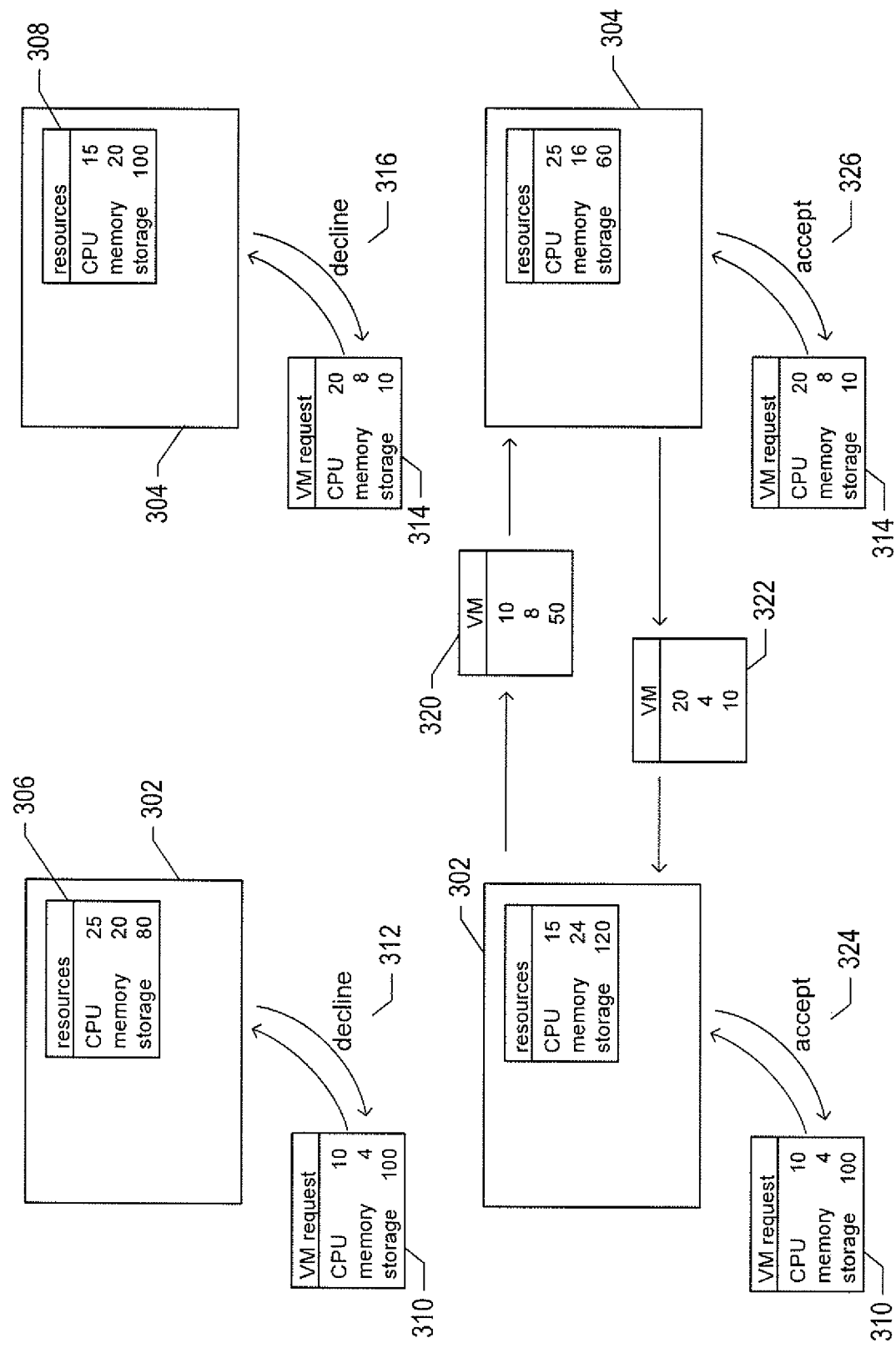

FIGS. 1-3 illustrate the problem domain addressed by the methods and systems disclosed in the current document. FIG. 1 shows a large number of virtual and physical data centers spread throughout a large geographical area. Each virtual/physical data center may include hundreds to thousands of individual computer systems along with internal networking and pooled mass-storage resources. Although only 30 virtual/physical data centers are shown in FIG. 1, hundreds to thousands of virtual/physical data centers may be spread throughout a large geographical area. As shown in FIG. 1, the virtual/physical data centers are connected to regional communications hubs 102-107, which are, in turn, interconnected through wide-area networking 108. Each virtual/physical data center is represented by a rectangle, such as virtual/physical data center 110. Each rectangle representing a virtual/physical data center is additionally labeled with an indication of the organization that owns and maintains the virtual/physical data center, such as the indication "O1" within the rectangle representing virtual/physical data center 110. Certain organizations own and maintain only a single virtual/physical data center, including organization "O18," which owns and maintains virtual/physical data center 112. Other organizations own and maintain multiple virtual/physical data centers, including organization "O1," which owns and maintains virtual/physical data centers 110 and 114-116.

Currently, an organization can supplement the computational resources of the organization's one or more virtual/physical data centers by contracting for computational resources from cloud-computing facilities. An organization can configure virtual machines within a cloud-computing facility to remotely run applications and services on behalf of the organization. Use of computational resources provided by cloud-computing facilities allows an organization to expand and contract computational resources in response to increasing and decreasing demand for the services provided by the organization, without purchasing additional physical computer systems to satisfy increased demand and without powering down physical computer systems to lessen ongoing costs associated with spare capacity. The advent of cloud computing has enabled organizations to make use of flexible and dynamic remote computational resources to obtain needed computational resources without needing to purchase, maintain, and manage additional computational resources on-site. However, third-party cloud-computing facilities do not fully address the computational-resource needs of organizations, fail to address the recurring problem of spare capacity within private virtual/physical data centers, and fail to provide seamless migration of virtual machines back and forth between resource consumers and resource providers as well as seamless extension of a resource-consumer's private virtual-machine execution environment into the cloud-based domain of resource providers.

It should be emphasized that the problem domain addressed by the currently disclosed methods and systems is, in general, one of computational efficiency. As discussed below, the automated resource-exchange system, in which the currently disclosed methods and systems are employed, facilitates sharing and exchange of computational resources among very large numbers of virtual/physical data centers that are owned, maintained, and managed by large numbers of different organizations. The resource-exchange system effectively aggregates portions of the computational resources of the large number of virtual/physical data centers for use by organizations in need of additional computational resources. As a result, the large numbers of virtual/physical data centers, as a whole, can achieve significantly greater computational efficiencies through resource exchange and sharing. In other words, the resource-exchange system provides a means for partially aggregating multiple virtual/physical data centers and for increasing the computational efficiency of the partially aggregated virtual/physical data centers.

In the implementations discussed in the current application, the resource-exchange system partially aggregates multiple virtual/physical data centers by providing a largely automated auction-based marketplace in which computational resources are advertised for lease by resource sellers and leased from resource sellers by resource buyers. In other words, the resource-exchange system achieves computational efficiencies through computational-resource transactions. In the described implementations, these transactions involve financial exchanges between buyers and sellers. However, the financial exchanges are used to simplify the complex problems associated with matching buyers to sellers and sellers to buyers. Similar computational efficiencies can be alternatively obtained using more abstract credit exchanges, rather than financial exchanges or by directly trading different types of computational resources and services. However, since many of the various considerations and constraints associated with leasing computational resources and with other types of resource exchanges are naturally expressed in terms of financial costs and benefits, use of financial exchanges represents a significant computational efficiency for the resource-exchange system. The primary goal for creating and operating the resource-exchange system is, despite the use of financial transactions, to increase the overall efficiencies related to owning, maintaining, and the managing virtual/physical data centers rather than to create a new type of financial market.

FIGS. 2A-E illustrate an example of a cost-efficiency increase for a virtual/physical data center made possible by the resource-exchange system. In FIG. 2A, the virtual/physical data center 202 is represented as a large rectangle containing numerous physical server computers, including server 204. In FIGS. 2A-E, multiple ellipses, such as ellipses 206, are used to indicate that a particular row of servers includes many additional servers not explicitly shown in the figures. In the numerical examples that follow, each of the ellipses represents seven servers that are not shown in the figures. Each server, including server 204, is generally shown as including a first unshaded portion, such as portion 208 of server 204, representing unused server resources and a second shaded portion, such as second portion 210, representing currently used server resources. Server 204 is currently being used at 80% of the server's total capacity. In this example, servers are generally loaded to 80% capacity. In the example of FIGS. 2A-E, the organization managing the virtual/physical data center 202 intends to purchase an additional 10 servers due to an expected low price point for servers. Three different strategies for purchasing the 10 additional servers are shown, in FIGS. 2A-B, as strategies A 212, B 214, and C 216.

According to strategy A, the 10 additional servers 220-222 are immediately purchased and installed in the virtual/physical data center 212. Tasks running within the virtual/physical data center 212 are redistributed among the now 40 servers running within the virtual/physical data center. Redistribution of the tasks lowers the use of each server to 60% of capacity, as can be seen by comparing the size of the unshaded portion 224 and shaded portion 226 of server 204 in the virtual/physical data center illustrating strategy A 212 to the unshaded portion 208 and shaded portion 210 of server 204 in the initial 30-server virtual/physical data center 202.

Purchasing the 10 additional servers according to strategy B involves immediately purchasing the 10 additional servers 230-232 but leaving them powered down until there is additional demand within the virtual/physical data center for additional computational resources. Purchasing the 10 additional servers according to strategy C involves purchasing one additional server 234 and waiting to purchase a second additional server 235 until the first additional server 234 approaches use at 80% of capacity.

FIG. 2C illustrates the costs incurred at successive time points by the organization when additional servers are purchased according to strategies A, B, and C. The cost calculations are approximate and based on a coarse, 5-day granularity, but nonetheless relative accurately illustrate the cost implications of the three different strategies. For this simple example, there are four different types of costs associated with acquiring and running servers: (1) the cost of running a server 236, which includes power and maintenance costs, estimated at five dollars per day; (2) the cost of housing the server within the data center 237, estimated to be 1 dollar per day; (3) the cost of purchasing a new server 238, $800 at time $t_1$ (239 in table 240), with purchase-cost increases at subsequent time intervals shown in table 240; and (4) the cost of installing a server in the data center 241, estimated at $200 for installing a single server 242, but less per server as the number of servers installed at a single time point increases, as shown in table 243. In the current example, each interval between successive time points represents five days 244. The initial system includes 30 servers 245 and thus incurs a cost of $150 per day to run the servers and a cost of $30 per day to house the servers. In the lower portion of FIG. 2C 246, the accumulated costs for the data center at successive intervals $t_1, t_2, \ldots, t_6$ are shown for strategy A 247, strategy B 248, and strategy C 249. These costs assume that the purchase of the 10 additional servers begins at time point $t_1$, 5 days following an initial time point $t_0$. For strategy A, at time point $t_1$, the cost for running the 40 servers 250 is $200 per day, the cost for housing the servers 251 is $40 per day, the cost for purchasing the 10 additional servers 252 is $8000, according to table 240, and the cost of installing the 10 additional servers 253 is $1400, according to table 243. The total cost accumulated since time point $t_0$ 253 is $900, which is the cost of running the initial virtual/physical data center 202 per day, $180, multiplied by 5 days. For strategy A at time point $t_2$, the total cost accumulated since time point $t_0$ 255 is $11,500, which includes the total cost 254 of $900 accumulated up to time point $t_1$ along with the price of purchasing and installing the 10 additional servers and 5 times the daily cost of running the servers, $240×5=$1200. As shown in FIG. 2C, by time point $t_6$, the total accumulated cost 256 of strategy A is $16,300, the total accumulated cost 257 of strategy B is $15,300, and the total accumulated cost 258 of strategy C is $12,400. However, the rate of increase in total-accumulated-cost for strategy C is much steeper than those for strategies A and B.

FIG. 2D illustrates a fourth strategy D for purchasing the 10 additional servers made possible by the resource-exchange system. According to the fourth strategy D, the 10 additional servers 260-262 are immediately purchased and installed. However, rather than redistributing tasks within the virtual/physical data center, as in strategy A, the organization managing virtual/physical data center 202 advertises the availability of computational-resource leases to other organizations participating in the marketplace provided by the resource-exchange system. As a result, within a reasonably short period of time, the new additional servers are operating at 80% of capacity 263-2652 executing virtual machines on behalf of remote computational-resource leasing organizations. Because the organization managing virtual/physical data center 202 is leasing the 10 additional servers, there is a negative cost, or revenue 266, associated with the 10 additional servers. Using the same illustration conventions as used in FIG. 2C, the costs associated with strategy D are shown at successive time points 267-271. By comparing these costs to those for strategies A, B, and C, shown in FIG. 2C, the rate of increase in total-accumulated-cost for strategy D is much flatter than those for strategies A, B, and C.

FIG. 2E shows a plot of the total accumulated cost vs. time for the four strategies A, B, C, and D, discussed above with reference to FIGS. 2A-D. Clearly, after less than 30 days, strategy D, represented by cost curve 272, provides a significantly lower accumulated cost then strategies A, B, and C, represented by cost curves 273-275. The resource-exchange system has provided a way for the organization managing virtual/physical data center 202 to maximize use of the computational resources within the virtual/physical data center and, by doing so, minimize operating costs. In addition, the organizations that lease computational resources provided by the 10 additional servers also achieve access to greater computational bandwidth for far less cost than would be incurred by purchasing and installing new physical servers. Considering the data centers participating in the market provided by the resource-exchange system as a large computing-facility aggregation, the aggregate computational efficiency is much higher, when leasing transactions are automatically facilitated by the resource-exchange system, than when no resource exchanges are possible. In the example discussed above with reference to FIGS. 2A-E, a larger fraction of the aggregate computational resources of the data centers are used because additional tasks are being executed by the 10 additional servers. Eventually, the 10 additional servers in data center 202 may be used for executing tasks on behalf of the organization that manages virtual/physical data center 202, once the leases have terminated. But, by initially purchasing the 10 additional servers at time point $t_1$, the organization managing data center 202 has taken advantage of a favorable purchase price for the 10 additional servers at time point $t_1$ without bearing the cost of the spare capacity represented by the 10 additional servers until internal tasks become available.

FIG. 3 illustrates another example of how the resource-exchange system can increase the computational efficiency of an aggregation of virtual/physical data centers. At the top of FIG. 3, two virtual/physical data centers 302 and 304 are shown as large rectangles. Indications 306 and 308 of the currently available computational resources within the virtual/physical data centers 302 and 304 are shown within the rectangles representing virtual/physical data centers 302 and 304. These resources include CPU bandwidth, available memory, and available mass-storage, in appropriate units. The first virtual/physical data center 302 is shown receiving a request 310 to execute an additional task, implemented as a virtual machine, that requires 10 units of CPU bandwidth, 4 units of memory, and 100 units of mass storage. The first virtual/physical data center declines 312 the request because the first virtual/physical data center has insufficient storage resources for executing the virtual machine. Similarly, the second virtual/physical data center 304 receives a request 314 to execute a new virtual machine, but declines 316 the request because the second data lacks sufficient CPU bandwidth to execute the new virtual machine.

The same two virtual/physical data centers 302 and 304 and the same two virtual-machine-execution requests 310 and 314 are again shown in the lower portion of FIG. 3. However, in the example shown in the lower portion of FIG. 3, the two data centers have exchanged two already executing virtual machines 320 and 322 via the marketplace provided by the resource-exchange system. The virtual/physical first data center 302 has leased computational resources from the second virtual/physical data center 304 to execute a storage-intensive virtual machine 320. Because the second virtual/physical data center has an excess of mass-storage resources, the second virtual/physical data center can host virtual machine 320 less expensively than the virtual machine can be executed within the first virtual/physical data center 302. Similarly, the second data center has leased computational resources from the first virtual/physical data center to execute the CPU-bandwidth-intensive virtual machine 322. The result of exchanging virtual machines 320 and 322 is a decrease in the operational costs for both data centers and more balanced ratios of different types of available computational resources within each virtual/physical data center. As a result, the first virtual/physical data center 302 can now accept 324 the virtual-machine-execution request 310 and the second virtual/physical data center 304 can now except 326 the virtual-machine-execution request 314. Thus, due to ongoing computational-resource exchanges made possible by the resource-exchange system, the partial aggregation of the two data centers can run more tasks, with greater overall capacity usage, than in the case that resource exchanges are not possible. The partial aggregation of the two virtual/physical data centers is significantly more computationally efficient because of their use of the marketplace provided by the resource-exchange system.

Thus, although the resource-exchange system is discussed in terms of providing a computational-resource-leasing marketplace, the resource-exchange system is an effective tool for increasing the computational efficiency of a partial aggregation of multiple data centers or multiple clusters within a datacenter. The resource-exchange system functions to increase the fraction of resource-capacity usage in the partial aggregation of multiple data centers as well as to redistribute load in order to balance the ratios of different available computational resources used within each data center to facilitate execution of additional task load.

Overview of Computer Systems and Computer Architecture

Figure 4:
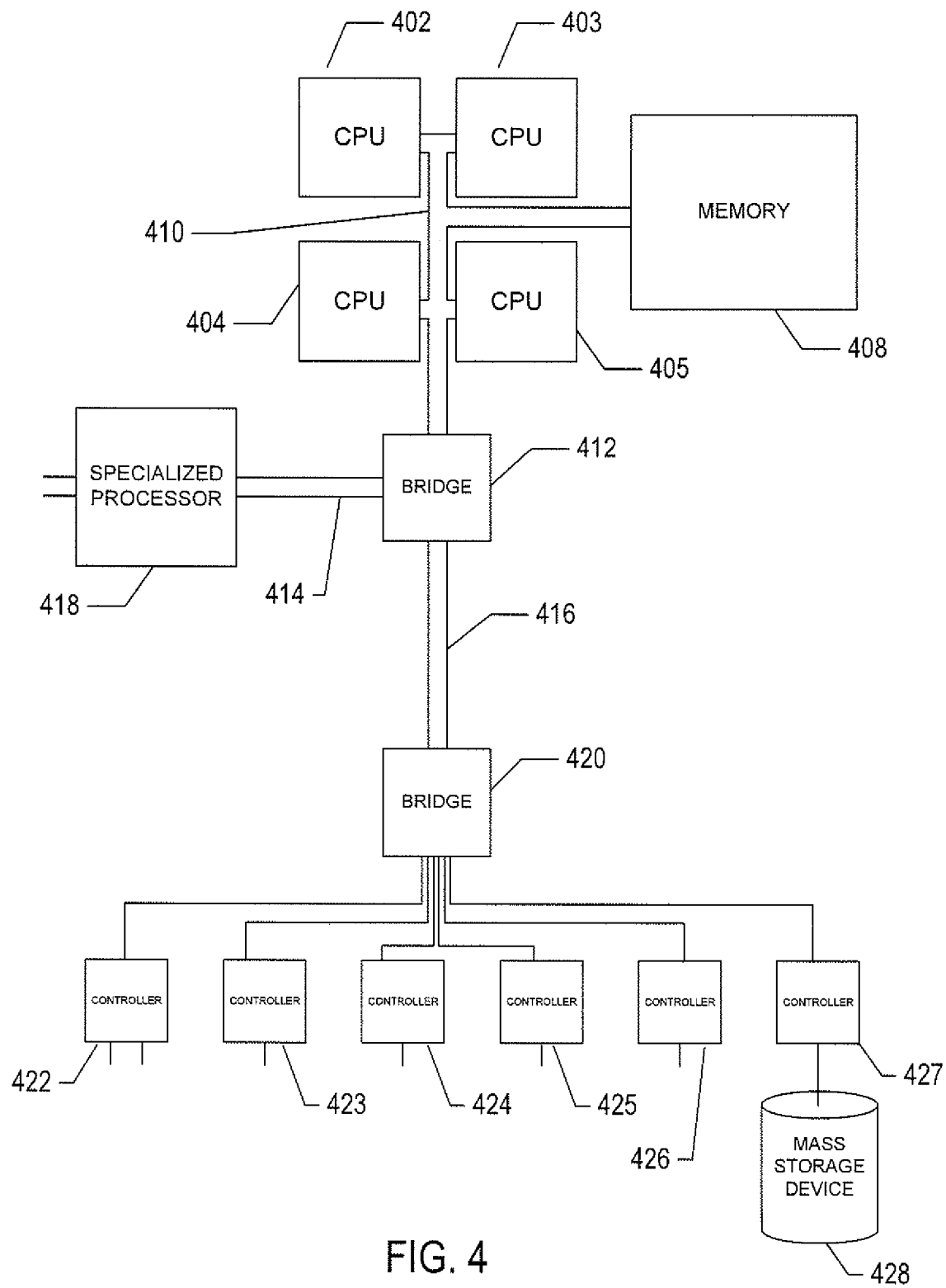
FIG. 4 provides a general architectural diagram for various types of computers.

FIG. 4 provides a general architectural diagram for various types of computers. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different mass-storage devices 428, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 5:
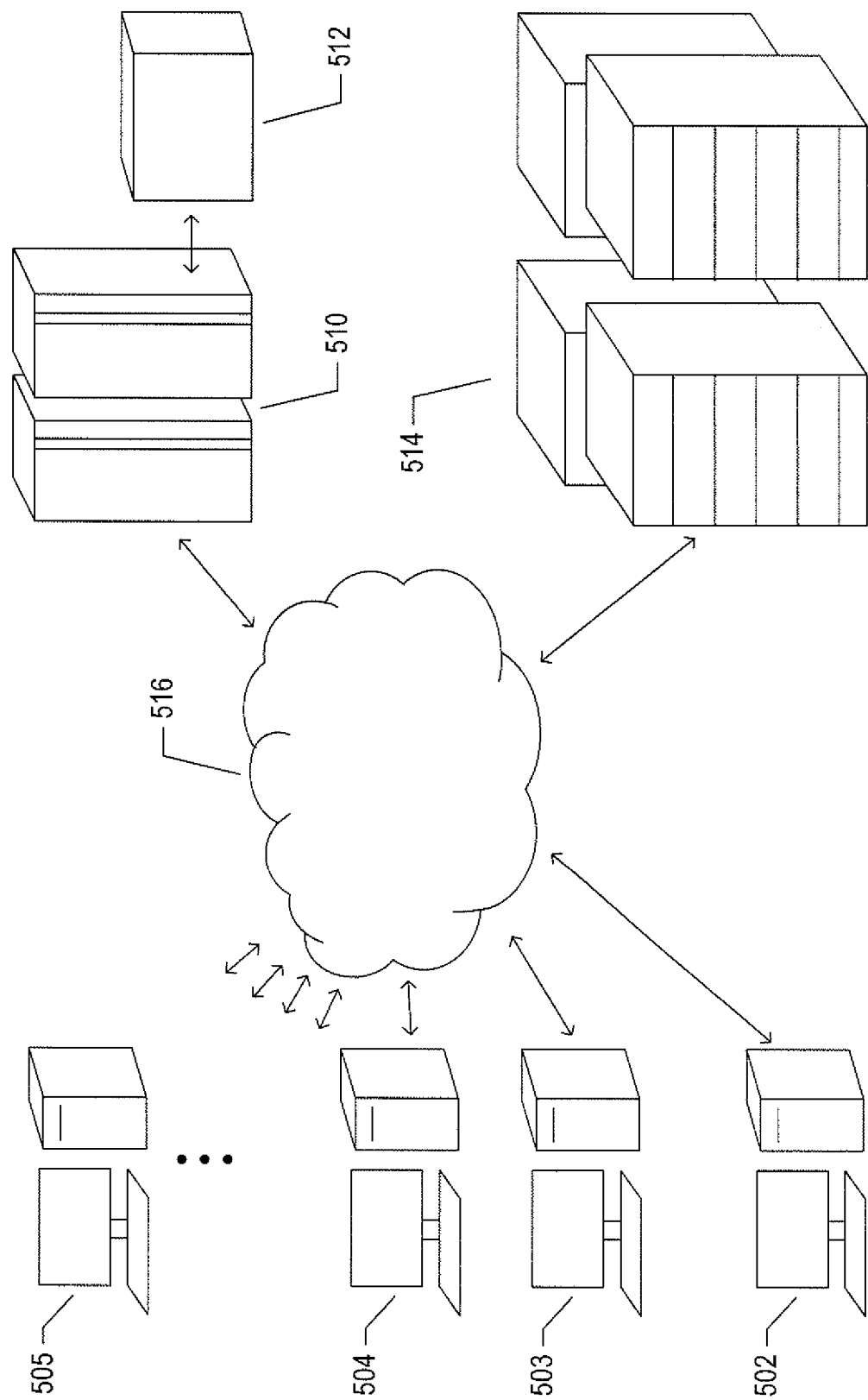
FIG. 5 illustrates an Internet-connected distributed computer system.

FIG. 5 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 5 shows a typical distributed system in which a large number of PCs 502-505, a high-end distributed mainframe system 510 with a large data-storage system 512, and a large computer center 514 with large numbers of rack-mounted servers or blade servers all interconnected through various communications and networking systems that together comprise the Internet 516. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 6:
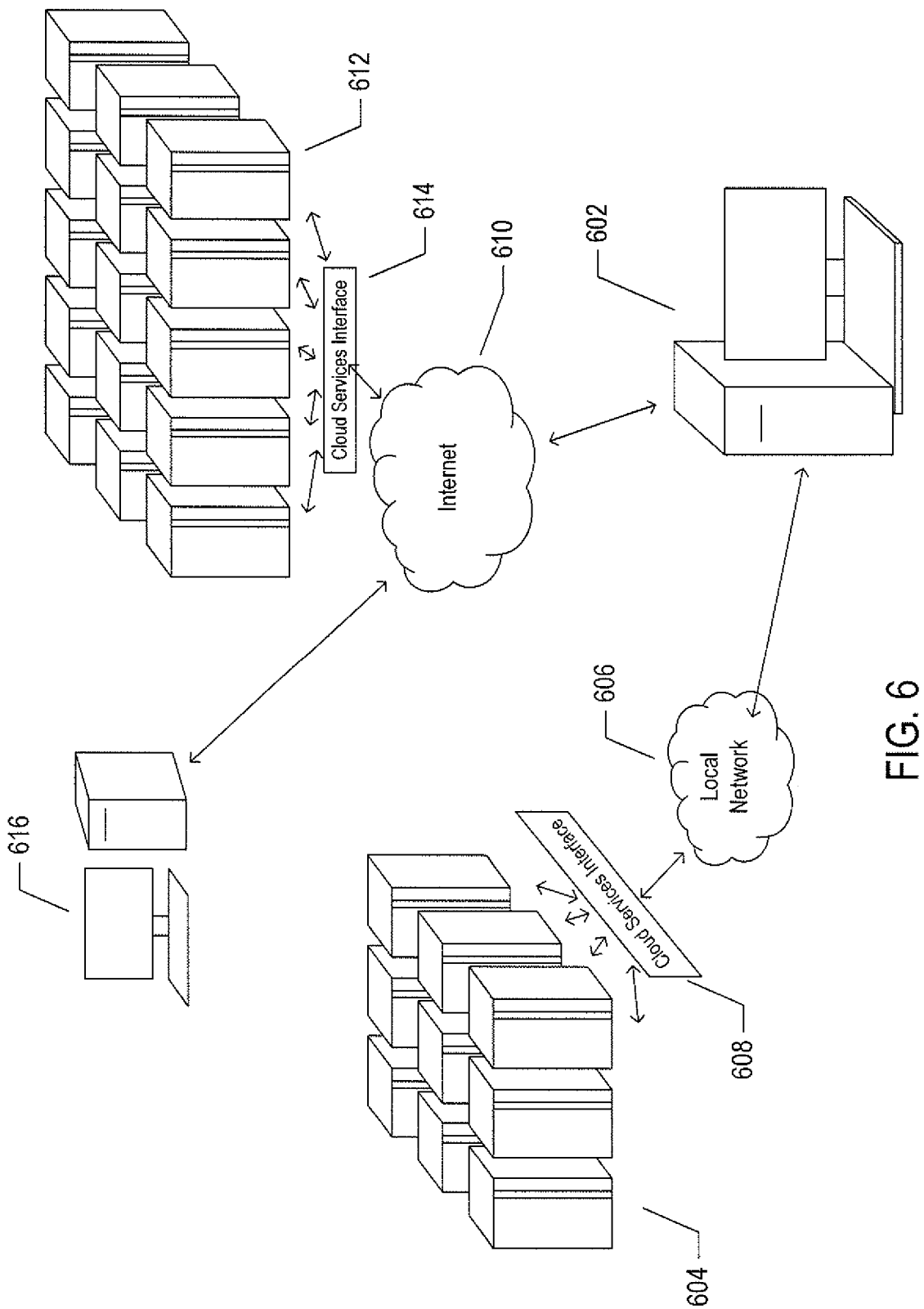
FIG. 6 illustrates cloud computing.

FIG. 6 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 6, a system administrator for an organization, using a PC 602, accesses the organization's private cloud 604 through a local network 606 and private-cloud interface 608 and also accesses, through the Internet 610, a public cloud 612 through a public-cloud services interface 614. The administrator can, in either the case of the private cloud 604 or public cloud 612, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 616.

Figure 7:
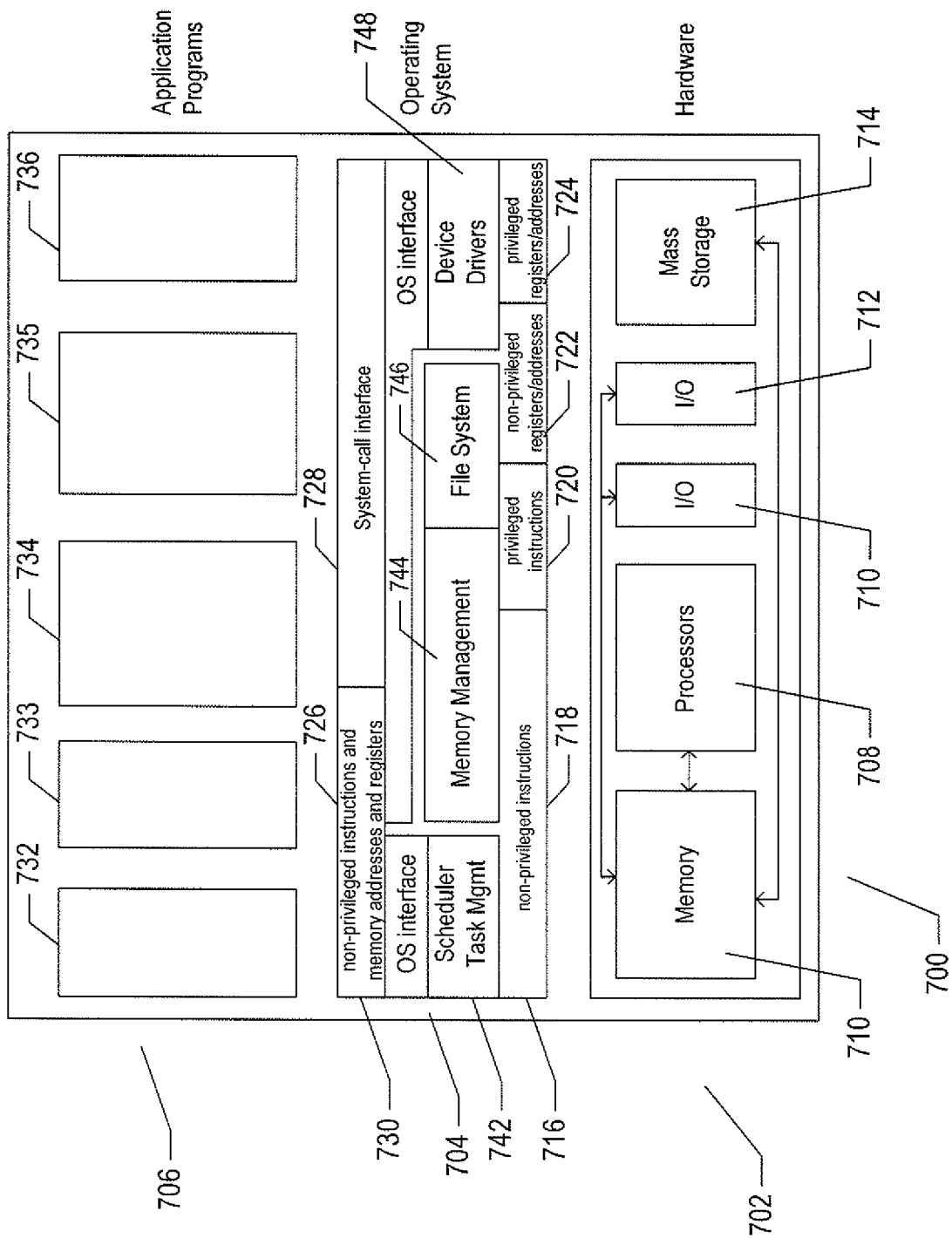
FIG. 7 illustrates generalized hardware and software components of a general-purpose computer system, such as a general-purpose computer system having an architecture similar to that shown in FIG. 1.

FIG. 7 illustrates generalized hardware and software components of a general-purpose computer system, such as a general-purpose computer system having an architecture similar to that shown in FIG. 4. The computer system 700 is often considered to include three fundamental layers: (1) a hardware layer or level 702; (2) an operating-system layer or level 704; and (3) an application-program layer or level 706. The hardware layer 702 includes one or more processors 708, system memory 710, various input-output ("I/O") devices 710 and 712, and mass-storage devices 714. Of course, the hardware level also includes many other components, including power supplies, internal communications links and busses, specialized integrated circuits, many different types of processor-controlled or microprocessor-controlled peripheral devices and controllers, and many other components. The operating system 704 interfaces to the hardware level 702 through a low-level operating system and hardware interface 716 generally comprising a set of non-privileged computer instructions 718, a set of privileged computer instructions 720, a set of non-privileged registers and memory addresses 722, and a set of privileged registers and memory addresses 724. In general, the operating system exposes non-privileged instructions, non-privileged registers, and non-privileged memory addresses 726 and a system-call interface 728 as an operating-system interface 730 to application programs 732-736 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 742, memory management 744, a file system 746, device drivers 748, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 746 facilitates abstraction of mass-storage-device and memory resources as a high-level, easy-to-access, file-system interface.

In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 8A:
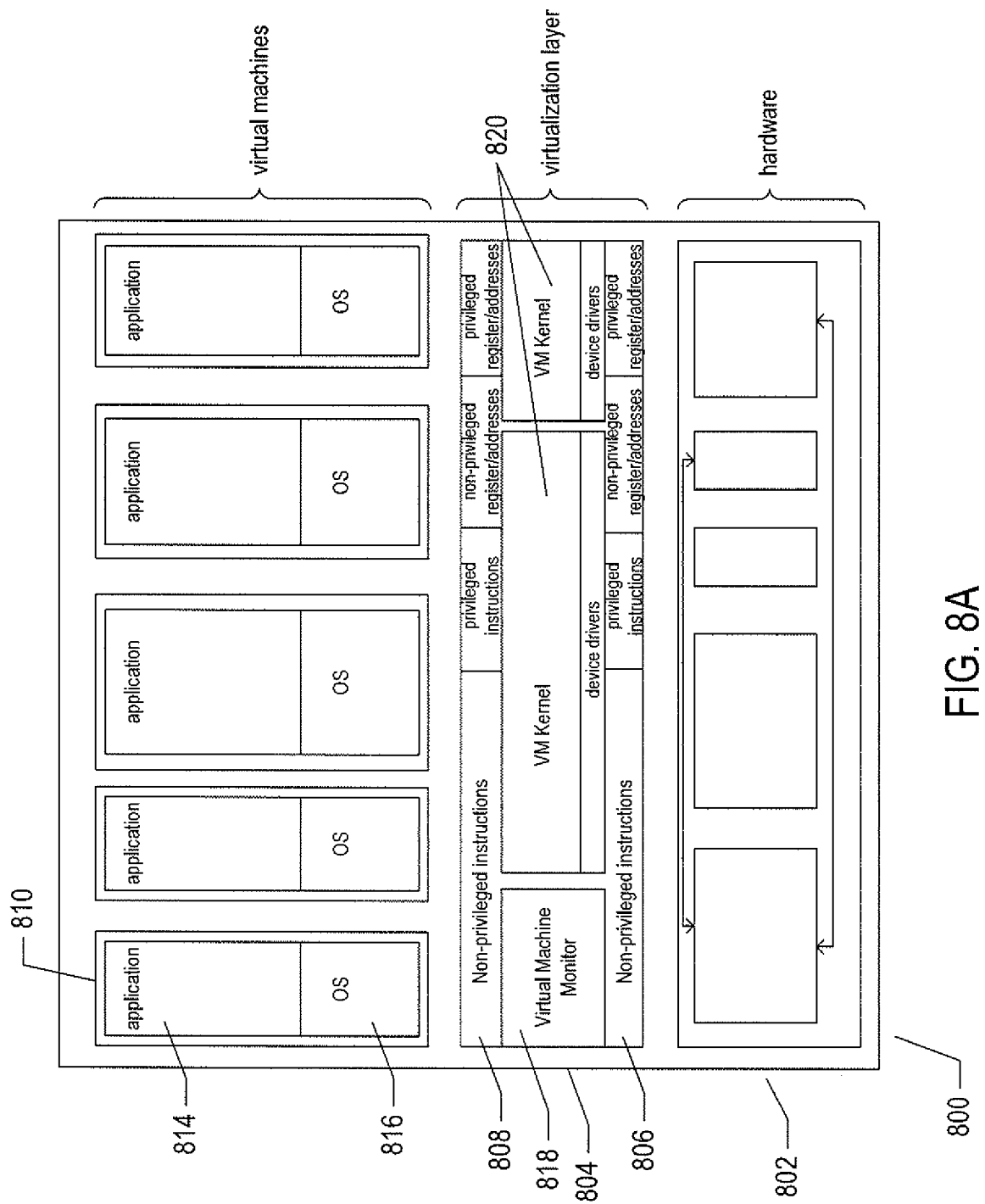
Figure 8B:
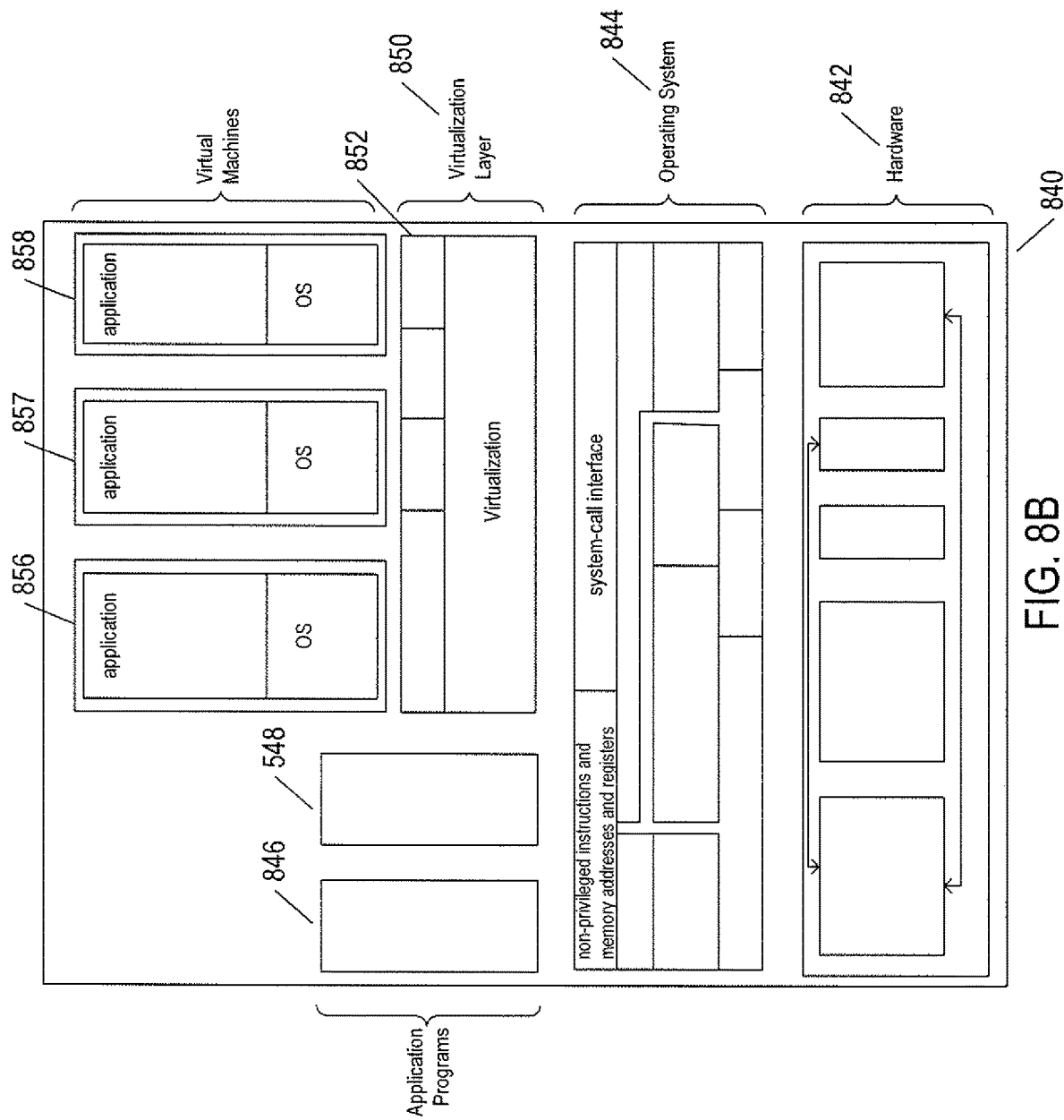

For these reasons, a higher level of abstraction, referred to as the "virtual machine," has been developed and evolved to further abstract computer hardware in order to address many difficulties and challenges associated with traditional computing systems, including the compatibility issues discussed above. FIGS. 8A-B illustrate two types of virtual machine and virtual-machine execution environments. FIGS. 8A-B use the same illustration conventions as used in FIG. 7. FIG. 8A shows a first type of virtualization. The computer system 800 in FIG. 8A includes the same hardware layer 802 as the hardware layer 702 shown in FIG. 7. However, rather than providing an operating system layer directly above the hardware layer, as in FIG. 7, the virtualized computing environment illustrated in FIG. 8A features a virtualization layer 804 that interfaces through a virtualization-layer/hardware-layer interface 806, equivalent to interface 716 in FIG. 7, to the hardware. The virtualization layer provides a hardware-like interface 808 to a number of virtual machines, such as virtual machine 810, executing above the virtualization layer in a virtual-machine layer 812. Each virtual machine includes one or more application programs or other higher-level computational entities packaged together with an operating system, referred to as a "guest operating system," such as application 814 and guest operating system 816 packaged together within virtual machine 810. Each virtual machine is thus equivalent to the operating-system layer 704 and application-program layer 706 in the general-purpose computer system shown in FIG. 7. Each guest operating system within a virtual machine interfaces to the virtualization-layer interface 808 rather than to the actual hardware interface 806. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 808 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 818 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 808, the accesses result in execution of virtualization-layer code to simulate or emulate the privileged resources. The virtualization layer additionally includes a kernel module 820 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 8B illustrates a second type of virtualization. In FIG. 8B, the computer system 840 includes the same hardware layer 842 and software layer 844 as the hardware layer 702 shown in FIG. 7. Several application programs 846 and 848 are shown running in the execution environment provided by the operating system. In addition, a virtualization layer 850 is also provided, in computer 840, but, unlike the virtualization layer 804 discussed with reference to FIG. 8A, virtualization layer 850 is layered above the operating system 844, referred to as the "host OS," and uses the operating system interface to access operating-system-provided functionality as well as the hardware. The virtualization layer 850 comprises primarily a VMM and a hardware-like interface 852, similar to hardware-like interface 808 in FIG. 8A. The virtualization-layer/hardware-layer interface 852, similar to interface 716 in FIG. 7, provides an execution environment for a number of virtual machines 856-858, each including one or more application programs or other higher-level computational entities packaged together with a guest operating system.

In FIGS. 8A-B, the layers are somewhat simplified for clarity of illustration. For example, portions of the virtualization layer 850 may reside within the host-operating-system kernel, such as a specialized driver incorporated into the host operating system to facilitate hardware access by the virtualization layer.

While the traditional virtual-machine-based virtualization layers, described with reference to FIGS. 8A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 8C illustrates the OSL-virtualization approach. In FIG. 8C, as in previously discussed FIG. 7, an operating system 704 runs above the hardware 702 of a host computer. The operating system provides an interface for higher-level computational entities, the interface including a system-call interface 728 and exposure to the non-privileged instructions and memory addresses and registers 726 of the hardware layer 702. However, unlike in FIG. 8A, rather than applications running directly above the operating system, OSL virtualization involves an OS-level virtualization layer 860 that provides an operating-system interface 862-864 to each of one or more containers 866-868. The containers, in turn, provide an execution environment for one or more applications, such as application 870 running within the execution environment provided by container 866. The container can be thought of as a partition of the resources generally available to higher-level computational entities through the operating system interface 730. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 8D:
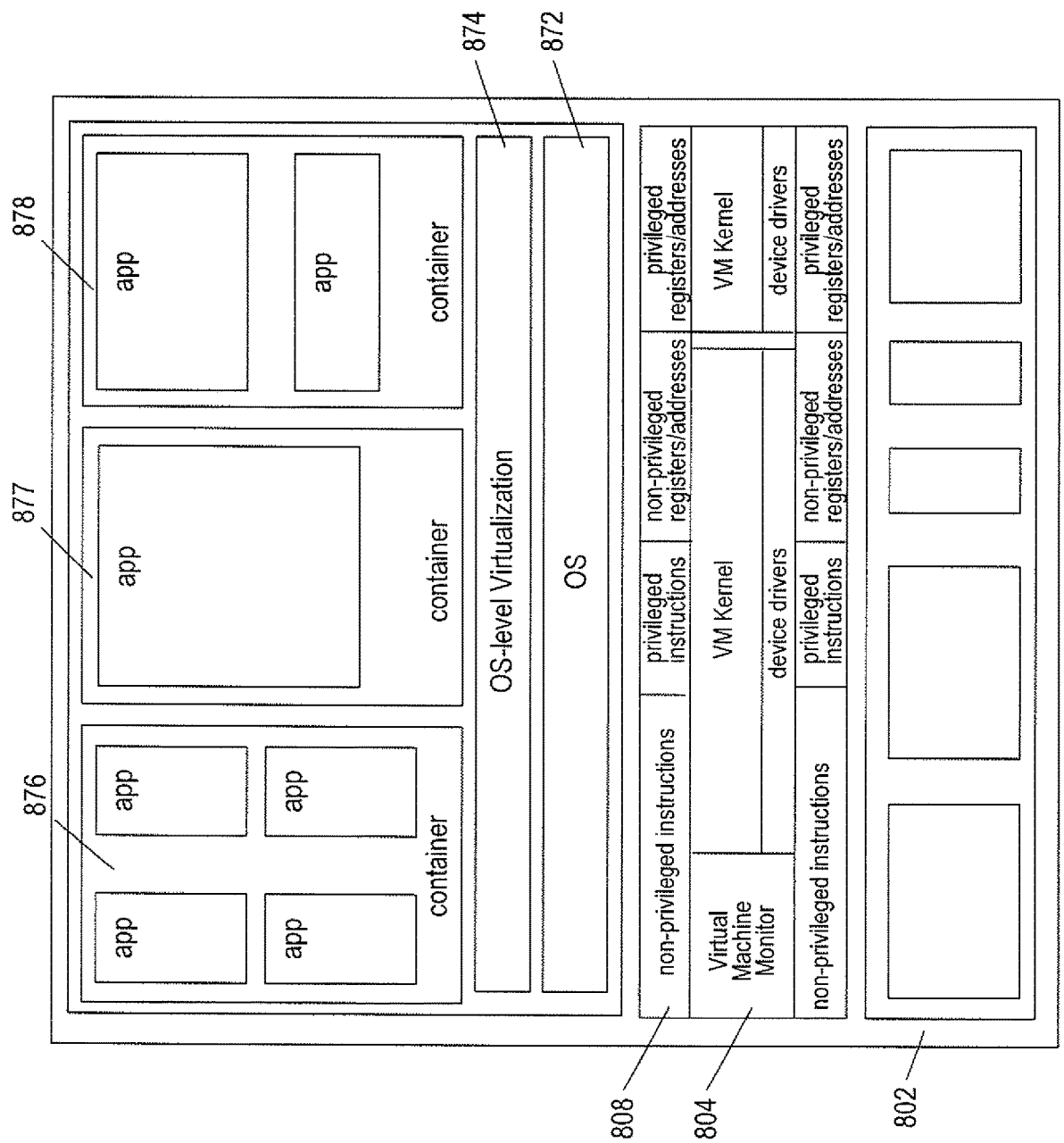

FIG. 8D illustrates an approach to combining the power and flexibility of traditional virtualization with the advantages of OSL virtualization. FIG. 8D shows a host computer similar to that shown in FIG. 8A, discussed above. The host computer includes a hardware layer 802 and a virtualization layer 804 that provides a simulated hardware interface 808 to an operating system 872. Unlike in FIG. 8A, the operating system interfaces to an OSL-virtualization layer 874 that provides container execution environments 876-878 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 874. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 8D, provides much of the advantages of both a traditional virtualization layer and the advantages of OSL virtualization. Note that, although only a single guest operating system and OSL virtualization layer as shown in FIG. 8D, a single virtualized host system can run multiple different guest operating systems within multiple virtual machines, each of which supports one or more containers.

In FIGS. 8A-D, the layers are somewhat simplified for clarity of illustration. For example, portions of the virtualization layer 850 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 9:
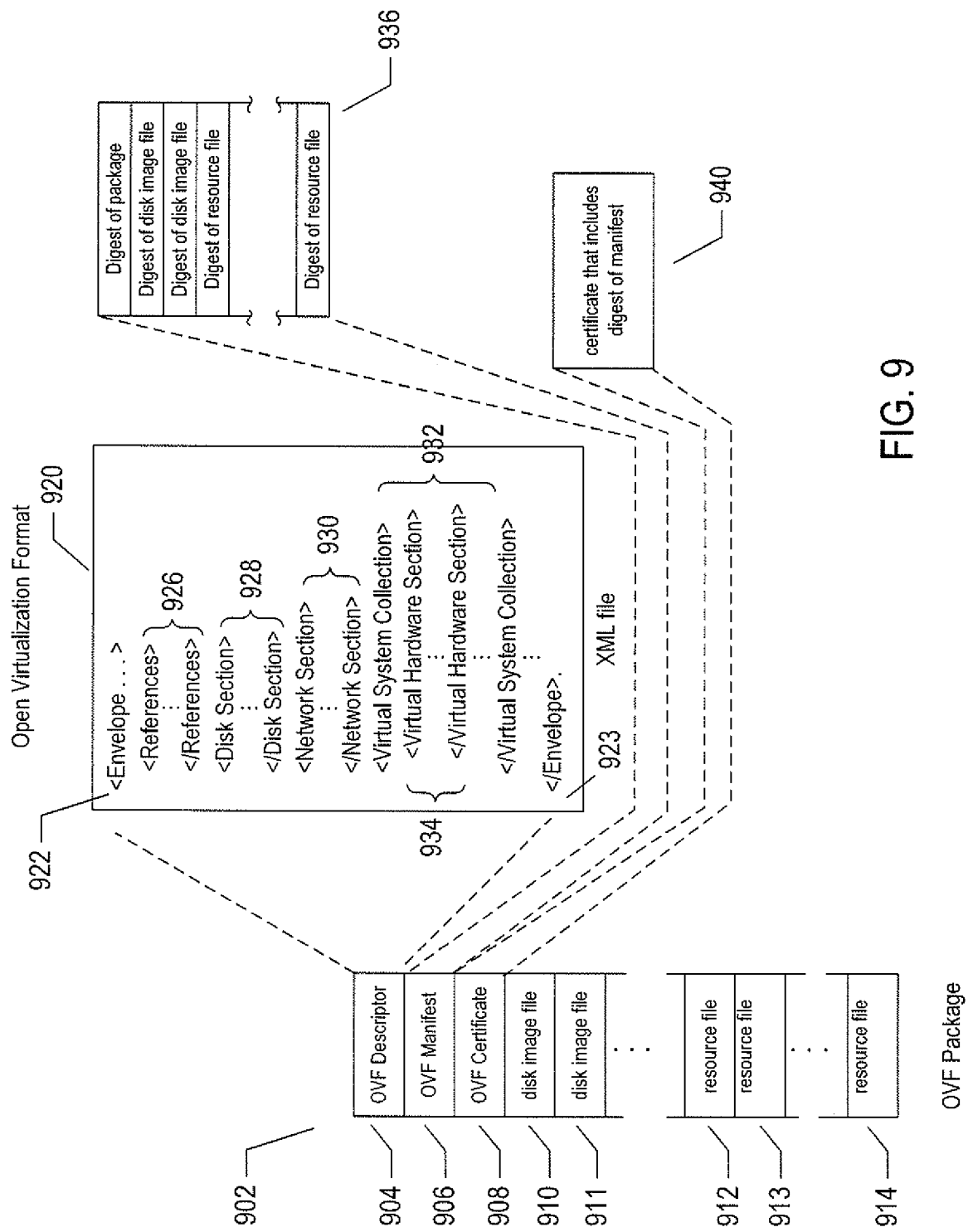
FIG. 9 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 9 illustrates an OVF package. An OVF package 902 includes an OVF descriptor 904, an OVF manifest 906, an OVF certificate 908, one or more disk-image files 910-911, and one or more resource files 912-914. The OVF package can be encoded and stored as a single file or as a set of files. The OVF descriptor 904 is an XML document 920 that includes a hierarchical set of elements, each demarcated by a beginning tag and an ending tag. The outermost, or highest-level, element is the envelope element, demarcated by tags 922 and 923. The next-level element includes a reference element 926 that includes references to all files that are part of the OVF package, a disk section 928 that contains meta information about the virtual disks included in the OVF package, a networks section 930 that includes meta information about the logical networks included in the OVF package, and a collection of virtual-machine configurations 932 which further includes hardware descriptions of each virtual machine 934. There are many additional hierarchical levels and elements within a typical OVF descriptor. The OVF descriptor is thus a self-describing XML file that describes the contents of an OVF package. The OVF manifest 906 is a list of cryptographic-hash-function-generated digests 936 of the entire OVF package and of the various components of the OVF package. The OVF certificate 908 is an authentication certificate 940 that includes a digest of the manifest and that is cryptographically signed. Disk image files, such as disk image file 910, are digital encodings of the contents of virtual disks and resource files 912 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 10:
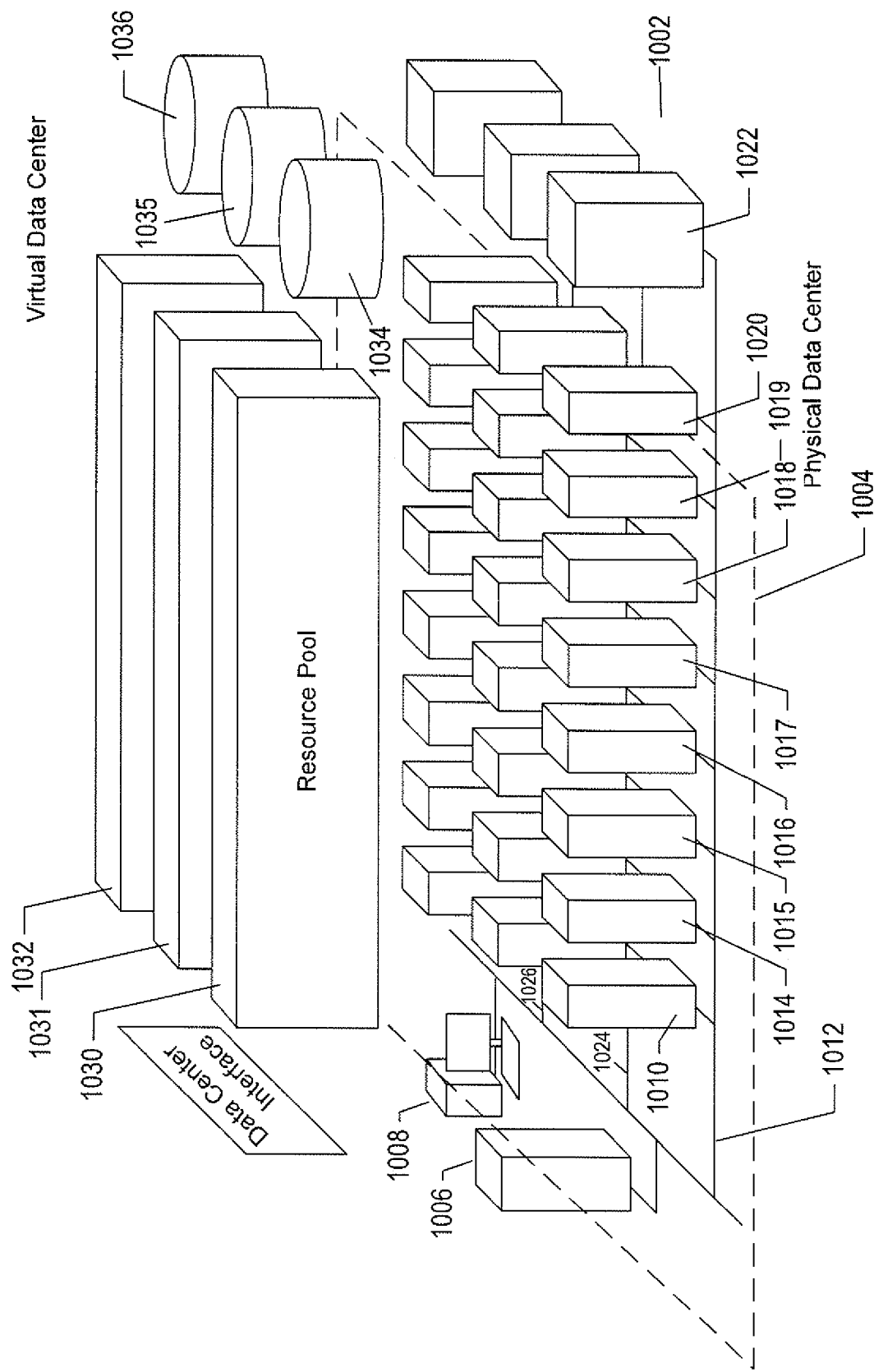
FIG. 10 illustrates virtual data centers provided as an abstraction of underlying physical-data-center hardware components.

FIG. 10 illustrates virtual data centers provided as an abstraction of underlying physical-data-center hardware components. In FIG. 10, a physical data center 1002 is shown below a virtual-interface plane 1004. The physical data center consists of a virtual-infrastructure management server ("VI-management-server") 1006 and any of various different computers, such as PCs 1008, on which a virtual-data-center management interface may be displayed to system administrators and other users. The physical data center additionally includes generally large numbers of server computers, such as server computer 1010, that are coupled together by local area networks, such as local area network 1012 that directly interconnects server computer 1010 and 1014-1020 and a mass-storage array 1022. The physical data center shown in FIG. 10 includes three local area networks 1012, 1024, and 1026 that each directly interconnects a bank of eight servers and a mass-storage array. The individual server computers, such as server computer 1010, each includes a virtualization layer and runs multiple virtual machines. Different physical data centers may include many different types of computers, networks, data-storage systems and devices connected according to many different types of connection topologies. The virtual-data-center abstraction layer 1004, a logical abstraction layer shown by a plane in FIG. 10, abstracts the physical data center to a virtual data center comprising one or more resource pools, such as resource pools 1030-1032, one or more virtual data stores, such as virtual data stores 1034-1036, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 11:
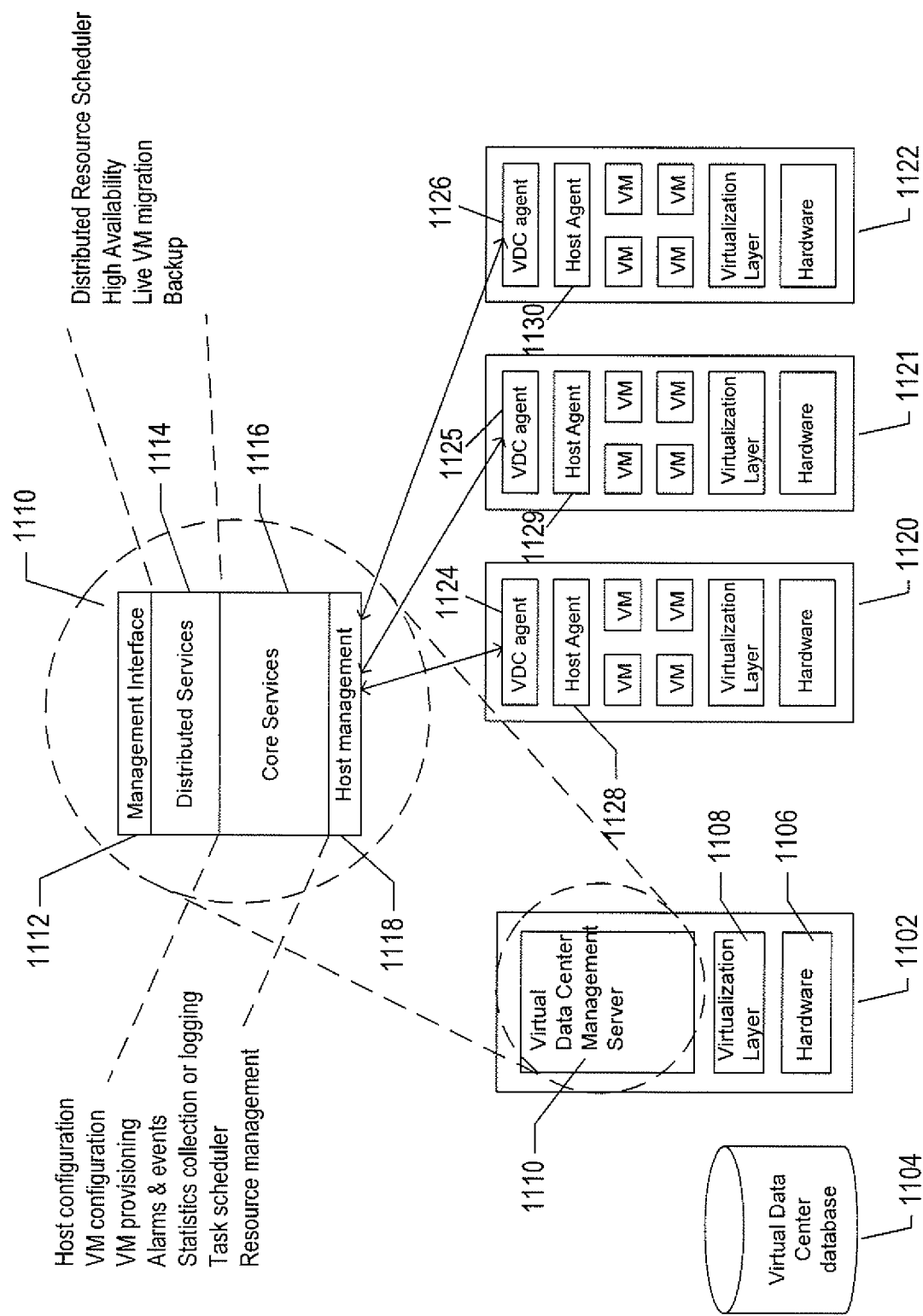
FIG. 11 illustrates virtual-machine components of a VI-management-server and physical servers of a physical data center above which a virtual-data-center interface is provided by the VI-management-server.

FIG. 11 illustrates virtual-machine components of a VI-management-server and physical servers of a physical data center above which a virtual-data-center interface is provided by the VI-management-server. The VI-management-server 1102 and a virtual-data-center database 1104 comprise the physical components of the management component of the virtual data center. The VI-management-server 1102 includes a hardware layer 1106 and virtualization layer 1108, and runs a virtual-data-center management-server virtual machine 1110 above the virtualization layer. Although shown as a single server in FIG. 11, the VI-management-server ("VI management server") may include two or more physical server computers that support multiple VI-management-server virtual appliances. The virtual machine 1110 includes a management-interface component 1112, distributed services 1114, core services 1116, and a host-management interface 1118. The management interface is accessed from any of various computers, such as the PC 1008 shown in FIG. 10. The management interface allows the virtual-data-center administrator to configure a virtual data center, provision virtual machines, collect statistics and view log files for the virtual data center, and to carry out other, similar management tasks. The host-management interface 1118 interfaces to virtual-data-center agents 1124, 1125, and 1126 that execute as virtual machines within each of the physical servers of the physical data center that is abstracted to a virtual data center by the VI management server.

The distributed services 1114 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 1120-1122 also includes a host-agent virtual machine 1128-1130 through which the virtualization layer can be accessed via a virtual-infrastructure application programming interface ("API"). This interface allows a remote administrator or user to manage an individual server through the infrastructure API. The virtual-data-center agents 1124-1126 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 12:
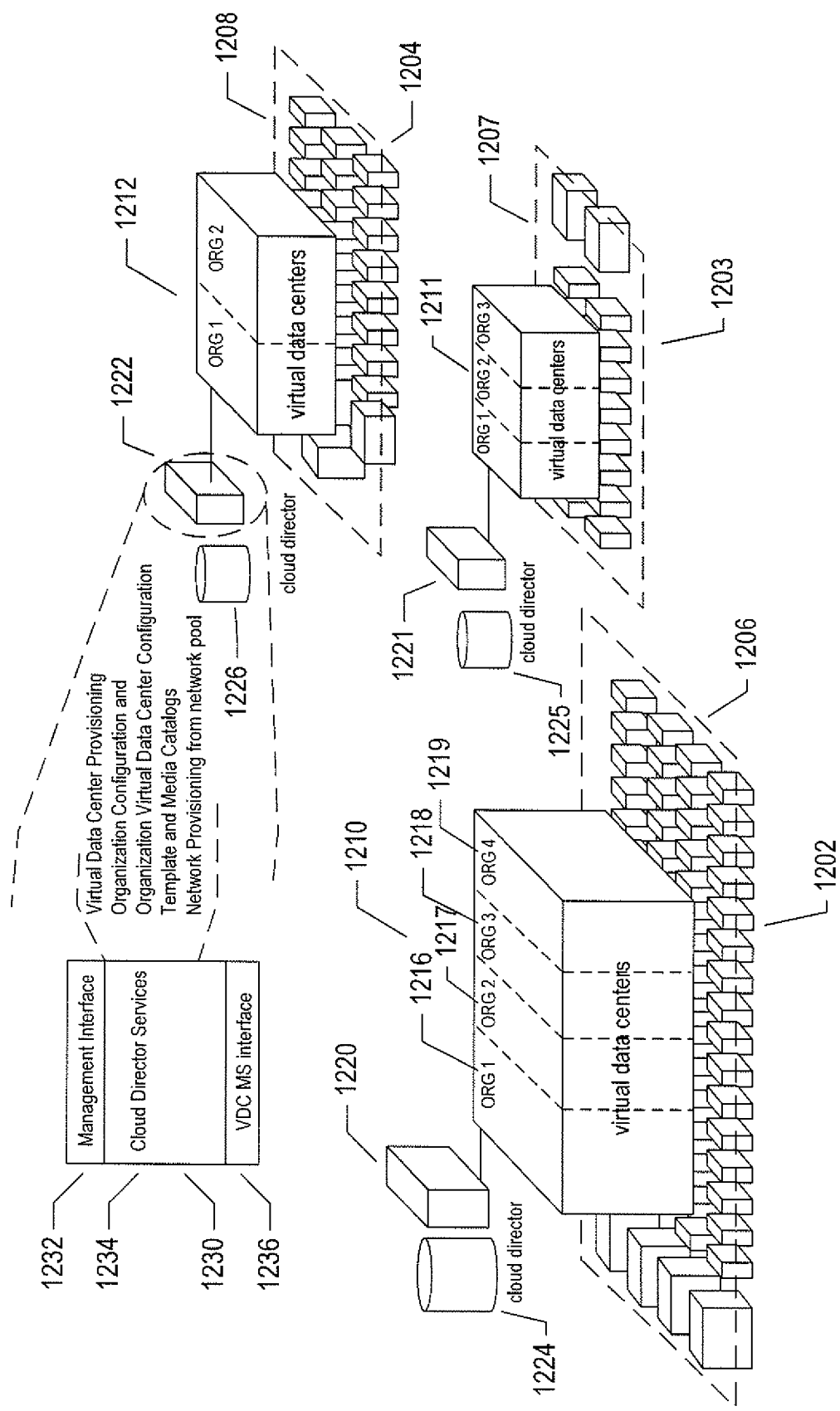
FIG. 12 illustrates a cloud-director level of abstraction.

FIG. 12 illustrates a cloud-director level of abstraction. In FIG. 12, three different physical data centers 1202-1204 are shown below planes representing the cloud-director layer of abstraction 1206-1208. Above the planes representing the cloud-director level of abstraction, multi-tenant virtual data centers 1210-1212 are shown. The resources of these multi-tenant virtual data centers are securely partitioned in order to provide secure virtual data centers to multiple tenants, or cloud-services-accessing organizations. For example, a cloud-services-provider virtual data center 1210 is partitioned into four different tenant-associated virtual-data centers within a multi-tenant virtual data center for four different tenants 1216-1219. Each multi-tenant virtual data center is managed by a cloud director comprising one or more cloud-director servers 1220-1222 and associated cloud-director databases 1224-1226. Each cloud-director server or servers runs a cloud-director virtual appliance 1230 that includes a cloud-director management interface 1232, a set of cloud-director services 1234, and a virtual-data-center management-server interface 1236. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 10 and 12, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 13:
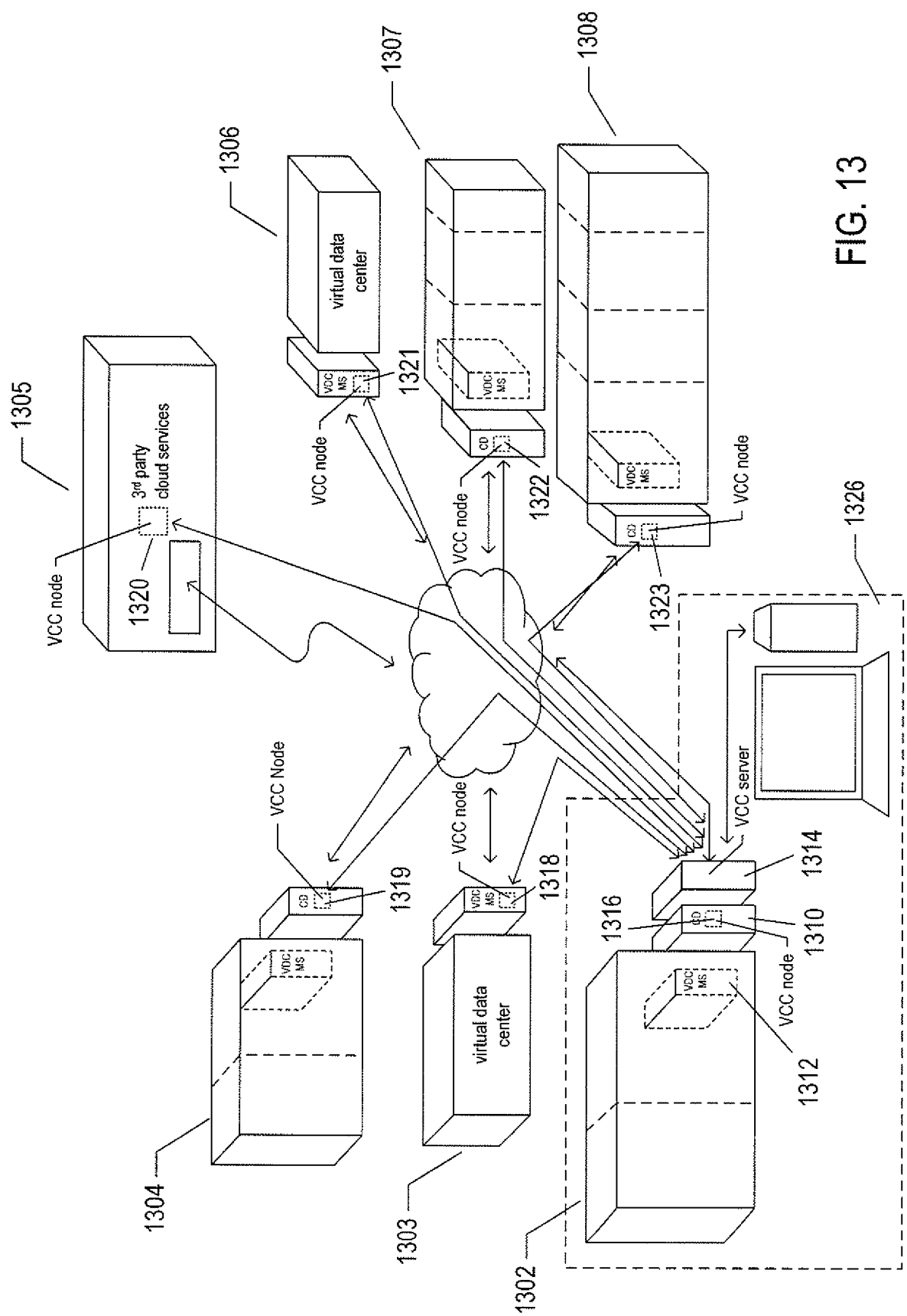
FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 13, seven different cloud-computing facilities are illustrated 1302-1308. Cloud-computing facility 1302 is a private multi-tenant cloud with a cloud director 1310 that interfaces to a VI management server 1312 to provide a multi-tenant private cloud comprising multiple tenant-associated virtual data centers. The remaining cloud-computing facilities 1303-1308 may be either public or private cloud-computing facilities and may be single-tenant virtual data centers, such as virtual data centers 1303 and 1306, multi-tenant virtual data centers, such as multi-tenant virtual data centers 1304 and 1307-1308, or any of various different kinds of third-party cloud-services facilities, such as third-party cloud-services facility 1305. An additional component, the VCC server 1314, acting as a controller is included in the private cloud-computing facility 1302 and interfaces to a VCC node 1316 that runs as a virtual appliance within the cloud director 1310. A VCC server may also run as a virtual appliance within a VI management server that manages a single-tenant private cloud. The VCC server 1314 additionally interfaces, through the Internet, to VCC node virtual appliances executing within remote VI management servers, remote cloud directors, or within the third-party cloud services 1318-1323. The VCC server provides a VCC server interface that can be displayed on a local or remote terminal, PC, or other computer system 1326 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Distributed-Search Engine

The current document is directed to a distributed resource-exchange system that employs a distributed-search subsystem to identify potential resource exchanges and select, from the identified potential resource exchanges, resource exchanges that best meet specified requirements and constraints. The distributed-search subsystem provides an auction-based method for matching of resource providers to resource users within a very large, distributed aggregation of virtual and physical data centers owned and managed by a large number of different organization. The distributed-search subsystem, however, is a general searching subsystem that can be used for many additional distributed-search operations.

Distributed searches are initiated by distributed-search participants, which may be any type of processor-controlled device that supports access to a distributed-search application programming interface ("API") or graphical user interface ("UI"). In a described implementation, the distributed-search subsystem comprises one or more local instances and one or more distributed-search engines. In the described implementation, local instances execute as web-application plug-ins within one or more virtual machines of a management subsystem. However, many alternative implementations are possible, including standalone applications and even hardware appliances. The local instances support the distributed-search API and/or UI, store local-instance data to support the distributed-search API and/or UI, and exchange request messages and response messages with the one or more distributed-search engines to initiate distributed searches, add attributes to a set of centrally stored attributes, and manage operation of the distributed-search subsystem. The one or more distributed-search engines communicate with local instances, centrally store various types of distributed-search-subsystem data, and carry out distributed searches on behalf of requesting local instances, maintaining an active search context for each search.

Entities for which searches are carried out can be of many different types, from information and data to hardware components and subsystems, automated services, products, remote computer systems connected to the distributed computer system, human users of those systems, and various types of computers, information, devices, and information accessible to the remote computer systems. The entities are characterized by attribute/value pairs. For example, a computational resource might be characterized by the attribute/value pairs: memory/2 GB; processor_bandwidth/1.2 GHz; network_bandwidth/100 MB\sec. Search results may include the values for one or more attributes as well as identifying information for providers, network addresses, and additional information.

Searches are parameterized by attribute/value pairs. These parameters may specify a scope for the search, minimum requirements for successful responses, search termination conditions, and many other operational parameters that allow searches to accurately tailored to user and participant needs. Participants may also be characterized by attribute/value pairs. For example, participants may be characterized by ratings that reflect past performance in supplying requested products and services.

Figure 14A:
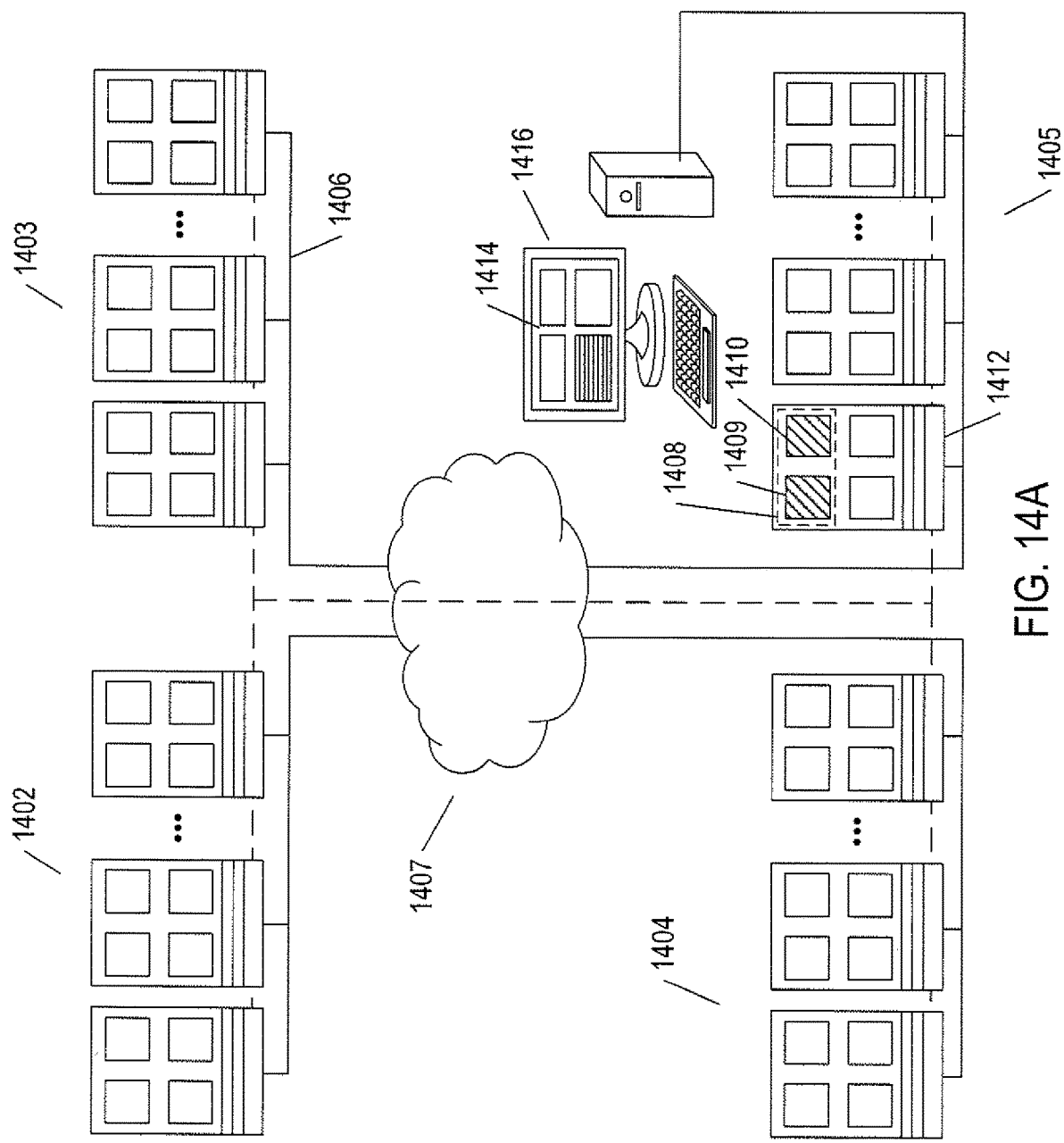
FIGS. 14A-C illustrate components and general operation of the distributed-search methods and subsystems.
Figure 14B:
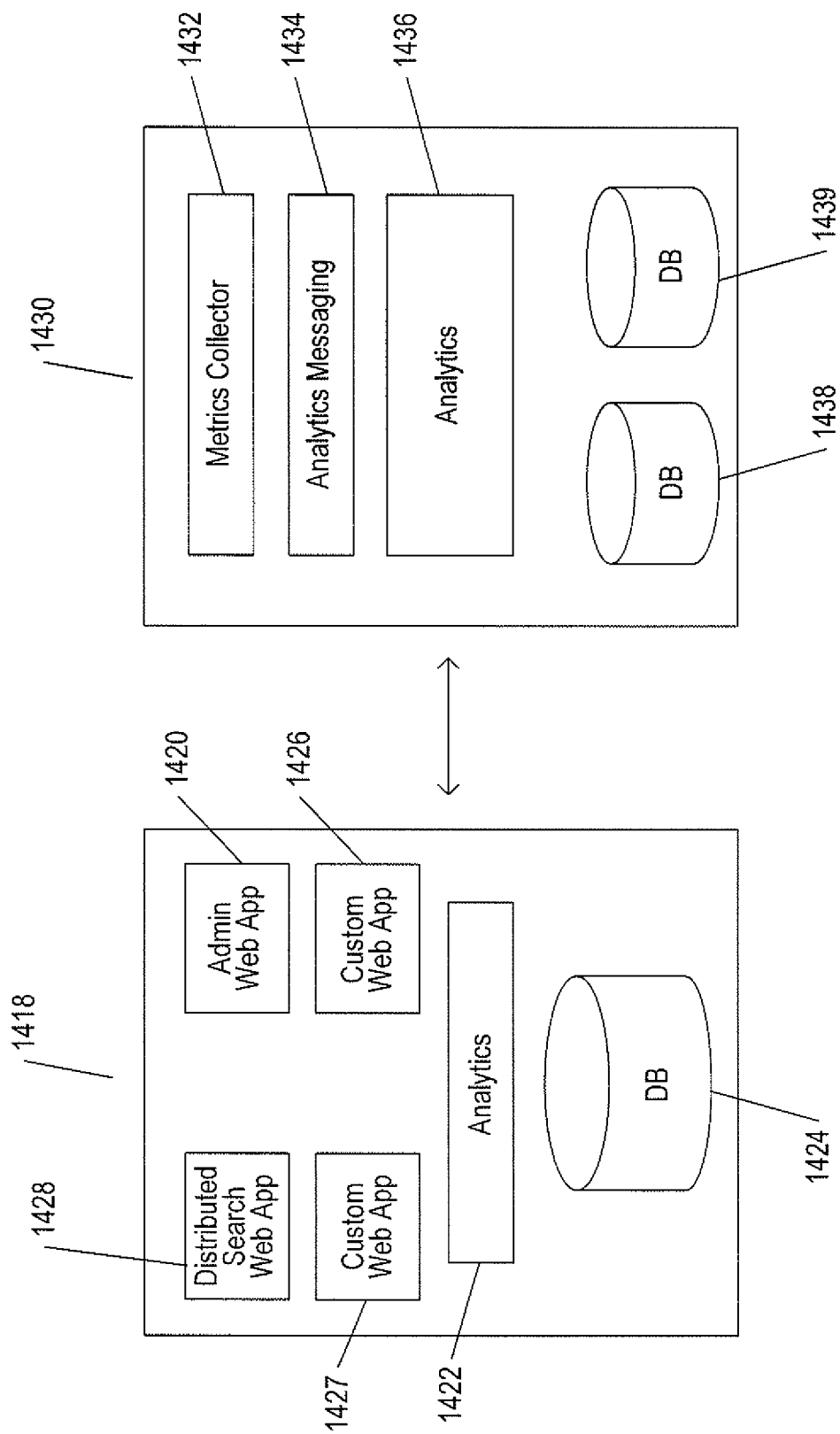
Figure 14C:
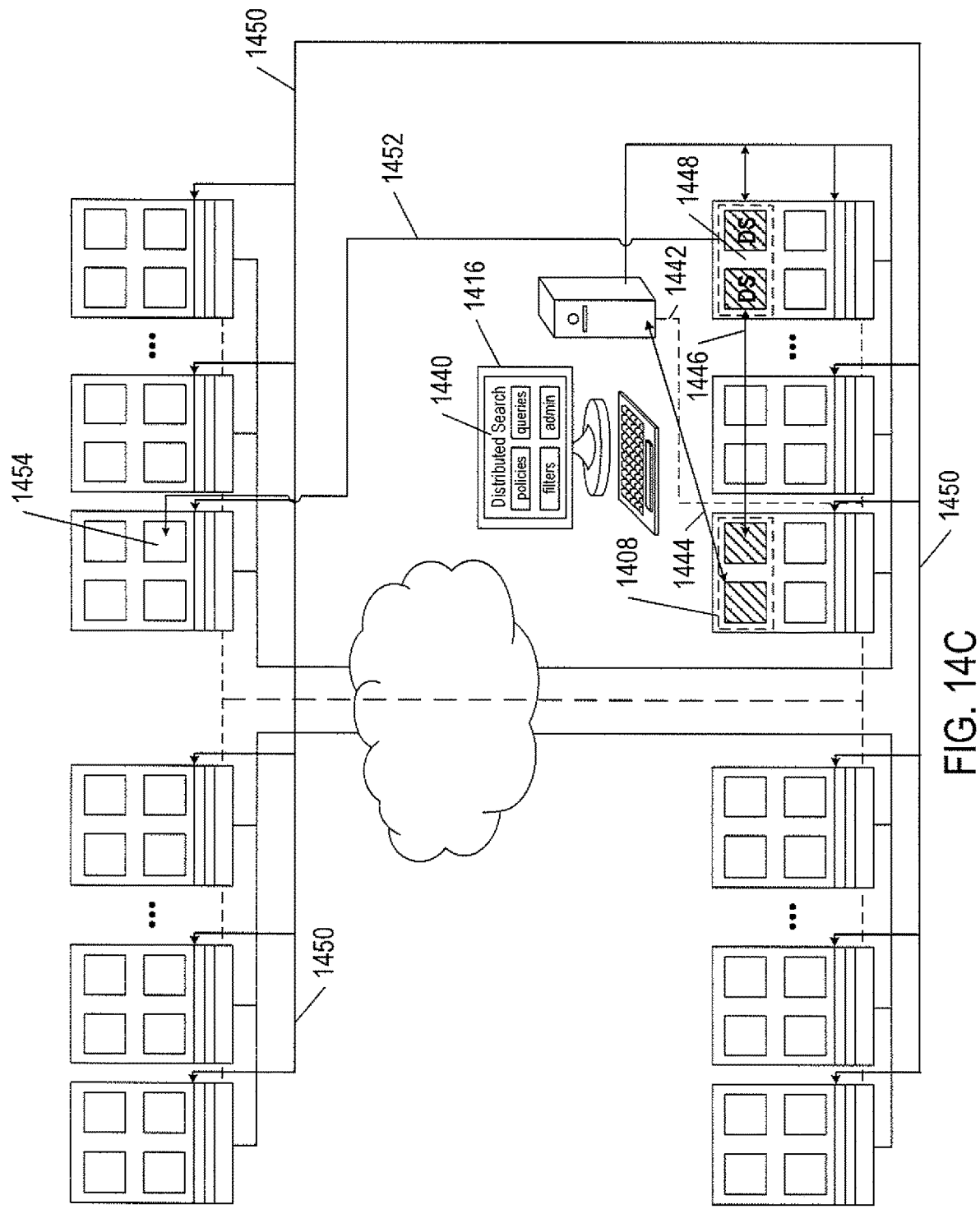

FIGS. 14A-C illustrate components and general operation of the distributed-search methods and subsystems. FIG. 14A uses illustration conventions, which are next described, that are subsequently used in FIG. 14C. A large distributed computer system is represented, in FIGS. 14A and 14C, by four sets 1402-1405 of computers, each set representing a virtualized-server cluster, virtual data center, or group of virtual data centers. In large distributed computer systems, there may be tens, hundreds, or more server clusters and virtual data centers linked together by many layers of internal and external communications systems. In FIGS. 14A and 11C, local internal communications are represented by interconnecting lines or channels, such as local network 1406 within server cluster or virtual data center 1403, and one or more wide-area networks or other external communications systems are represented by cloud 1407. The distributed-computer-system representation used in FIGS. 14A-C is abstracted to provide for concise and simple illustration of the currently disclosed distributed-search methods and subsystems.

In the example distributed computer system shown in FIGS. 14A and 14C, a management subsystem is implemented as a multi-tiered application 1408 including two or more virtual machines 1409-1410 within a management server 1412 of a server cluster or virtual data center 1405. The management subsystem displays a management user interface 1414 on one or more management consoles 1416 used by system managers or administrators to manage operation of a server cluster or virtual data center. Each server cluster or virtual data center, such as server clusters or virtual data centers 1402-1404, may also include a management subsystem, such as the management subsystem 1408-1410 within server cluster or virtual data center 1405. In certain implementations, a management subsystem may span two or more server clusters or virtual data centers.

The management subsystem provides a comprehensive server cluster or virtual data center management interface to system administrators. Through the management user interface, system administrators specify operational parameters that control facilities that store, manage, and deploy multi-tiered application and VM templates, facilities that provide for high-availability virtual-machine execution, tools for migrating executing VMs among servers and execution environments, VM replication, and data backup and recovery services.

FIG. 14B illustrates one implementation of a high-level architecture of the management subsystem 1408-1410 discussed above with reference to FIG. 14A. In the management subsystem, a first virtual machine 1418 is responsible for providing the management user interface via an administrator web application 1420, as well as compiling and processing certain types of analytical data 1422 that are stored in a local database 1424. In addition, the first virtual machine runs numerous custom web applications 1426-1427 that provide additional functionalities accessible through the management user interface. The first virtual machine also provides an execution environment for a distributed-search web application 1428 that represents a local instance of the distributed-search subsystem within a server cluster, virtual data center, or some other set of computational resources within the distributed computer system. A second virtual machine 1430 is primarily concerned with collecting metrics 1432 from various types of components, subcomponents, servers, network-storage appliances, and other components of the distributed computing system via analytics messaging 1434 and then analyzing the collected metrics 1436 to provide continuous representations of the status and state of the distributed computer system, to automatically identify various types of events and problems that are addressed automatically, semi-automatically, or manually by system administrators, and to provide additional types of monitoring and analysis, the results of which are stored in several local databases 1438-1439.

As shown in FIG. 14C, the local instance of the distributed-search subsystem (1428 in FIG. 14B) is invoked, in one implementation, through the management user interface to provide a distributed-search user interface 1440 to a system administrator or, in other cases, to provide a distributed-search application programming interface ("API") to various automated management and computational-resource-distribution subsystems within the distributed computer system. Communication between the management subsystem 1408 and the system console 1416 is provided, in one implementation, over a secure virtual management network within the distributed computer system, represented in FIGS. 14A and 14C by dashed lines, such as dashed line 1442. The distributed-search user interface 1440 provides facilities for the creation and storage of search policies, filters, and search queries, further discussed below. The distributed-search user interface also provides various types of administration operations and functionalities. A user launches searches through the distributed-search user interface and automated subsystems launches searches through a distributed-search API, both provided by a local instance of the distributed-search subsystem. A search initiated by specifying filters, policies, and search-result evaluation criteria previously created and stored through the distributed-search user interface or distributed-search API.

A search is initiated by the transmission of a search-initiation request, from the distributed-search user interface or through a remote call to the distributed-search API 1444, to a local instance of the distributed-search subsystem within the management subsystem 1408. The local instance of the distributed-search subsystem then prepares a search-request message that is transmitted 1446 to a distributed-search engine 1448, in one implementation implemented as a multi-tiered application containing one or more distributed-search-engine virtual machines that runs within a server or other computer system within the distributed computer system. The distributed-search engine transmits dynamic-attribute-value requests to each of a set of target participants within the distributed computing system, as represented by arrows emanating from the distributed-search engine 1448 and directed to each of a particular component or layer within the computer systems of the distributed computer system. The transmission may occur over a period of time in which batches of dynamic-attribute-value requests are transmitted at intervals, to avoid overloading communications subsystems. The set of target participants is obtained by using filters included within the search request to evaluate centrally stored static attribute values for entities within the distributed computer system, as discussed, in detail, below. Initial filtering avoids transmission of messages to entities incapable of satisfying search-request criteria. Note that the target participants may be any type or class of distributed-computing-system component or subsystem that can support execution of functionality that receives dynamic-attribute-value-request messages from a distributed-search engine. In certain cases, the target participants are components of management subsystems, such as local instances of the distributed-search subsystem (1428 in FIG. 14B). However, target participants may also be virtualization layers, operating systems, virtual machines, applications, or even various types of hardware components that are implemented to include an ability to receive attribute-value-request messages and respond to the received messages. Finally, the distributed-search engine 1448 receives responses from the target participants within the distributed computer system and continuously evaluates the responses to maintain a small set of best responses. In many cases, there may be significant periods of time between reception of a dynamic-attribute-value request by a target participant and sending of a response by the target participant. When termination criteria for the search are satisfied, and the search is therefore terminated, the set of best responses to the transmitted dynamic-attribute-value-request messages are first verified, by a message exchange with each target participant that furnished the response message, and are then transmitted 1452 from the distributed-search engine to one or more search-result recipients 1454 specified in the initial search request. A search-result recipient may be the local instance of the distributed-search subsystem that initiated the distributed search, but may alternatively be any other component or entity or set of components or entities of the distributed computer system that supports reception of a distributed search-results message.

Figure 15A:
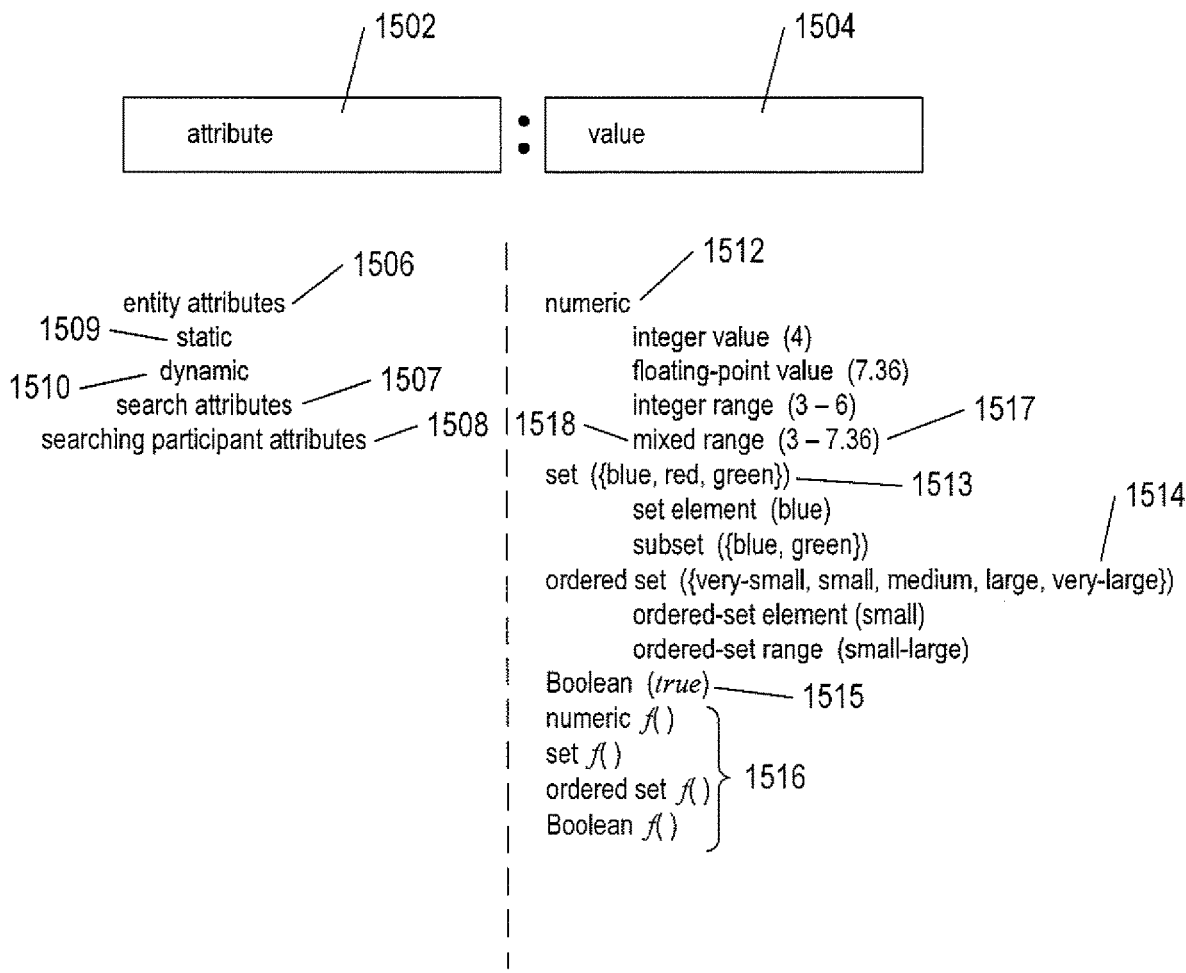
Figure 15B:
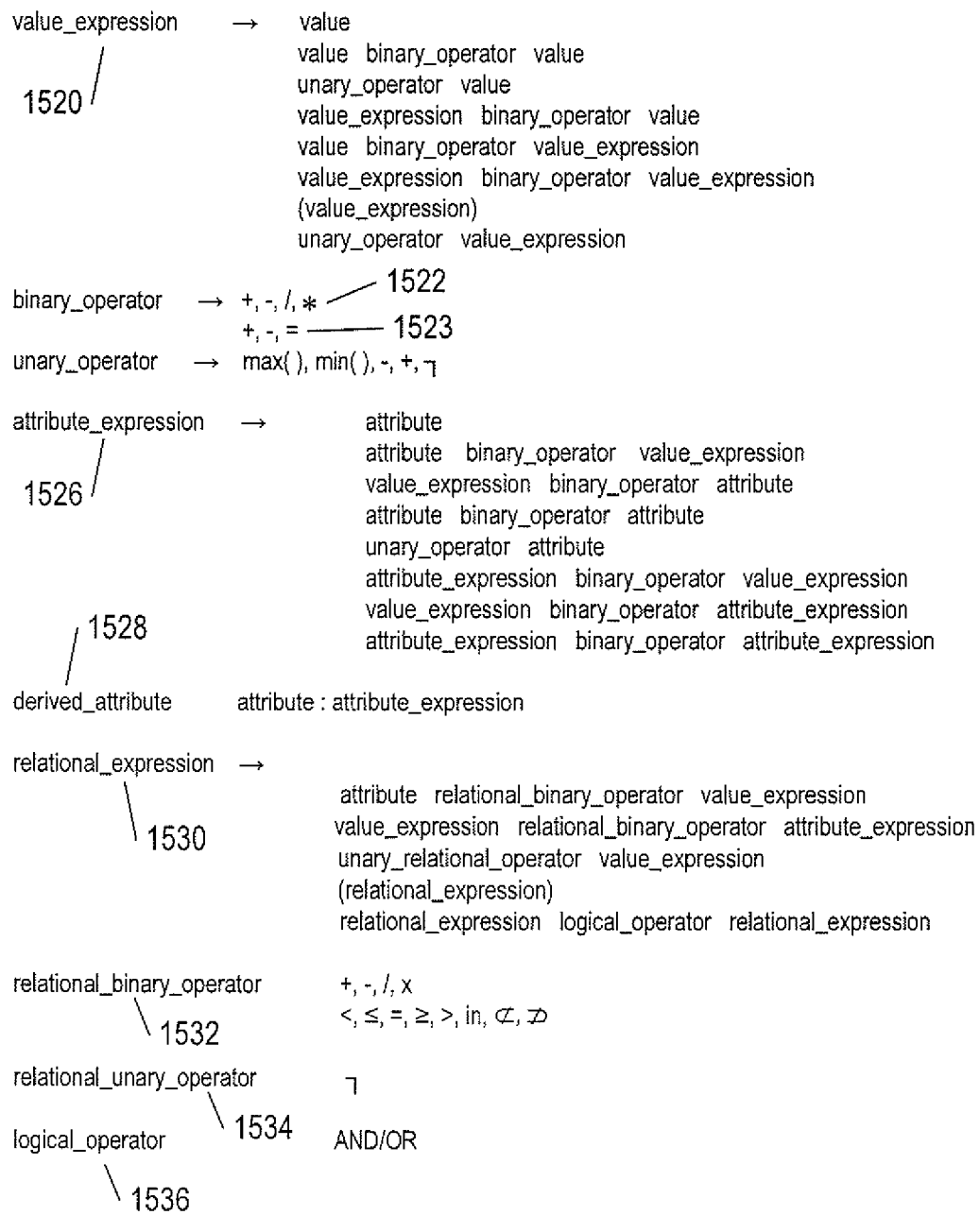

FIGS. 15A-C illustrate certain of the information and data entities used within the currently disclosed distributed-search methods and subsystems. The distributed search is used to identify entities managed by, contained within, or accessible to distributed-search participants. These entities are characterized by attribute/value pairs. An entity may be a participant, a service, information, distributed-computer-system components, remote computers connected through communications media with the distributed computer system, remote-computer users, or any of many other types of entities that can be characterized by attribute values and that are desired to be identified through distributed searches.

FIG. 15A illustrates an attribute/value pair. The attribute 1502 is an alphanumeric string that identifies a particular attribute within a universal set of attributes used by the distributed-search methods and subsystems. Attributes are, in many implementations, centrally stored and managed by one or more distributed-search engines. An attribute is instantiated by being associated with one or more any of the above-mentioned types of entities. Instantiated attributes are associated with values. In this respect, an attribute is similar to a variable used in programming-language statements. The variable has a name, is instantiated within a particular scope comprising the routines from which it is visible, and an instantiated variable can store any of various different values within the value domain of the variable.

In the currently disclosed distributed-search methods and subsystems, three types of attributes are generally encountered: (1) entity attributes 1506, which are associated with entities that are identified by searches; (2) search attributes 1507, which identify particular parameters for a given distributed search; and (3) search-participant attributes 1508, which characterize a participant, generally a participant initiating a distributed search. Entity attributes 1506 fall into two classes: (1) static entity attributes 1509, which are entity attributes that, when instantiated, have either constant values or have values that are only infrequently changed and can therefore be pre-fetched and stored by the distributed-search engine in advance of being used during the initiation of distributed searches; and (2) dynamic entity attributes 1510, which are frequently modified and are therefore retrieved, at search time, by transmitting dynamic-attribute-value-request messages to target participants. The value 1504 currently associated with an instantiated attribute 1502 in an attribute/value pair is generally represented by an alphanumeric string. Attribute values can be numeric 1512, elements of a set 1513, elements of an ordered set 1514, Boolean values 1515, or generalized calls to functions or procedures that return numeric, set, ordered-set, or Boolean values 1526. A value may be one of a single element of a set, a subset of a set, single numeric values, or numeric-value ranges. In FIG. 15A, examples of the various different types of values are given in parentheses, such as the example range "[3-7.36]" 1517 provided for the mixed-range subtype 1518 of the numeric 1512 value type.

FIG. 15B shows certain derived types of information and data used by the distributed-search methods and subsystems to which the current application is directed. Values may be combined in value expressions 1520. These are familiar arithmetic and set expressions that include binary arithmetic operators 1522 and binary set operators 1523 as well as various types of arithmetic and set unary operators 1524. Value expressions can be considered to be expressions equivalent to constant values. Similarly, attributes may be combined in attribute expressions 1526 which are equivalent to expressions in programming languages that include variables. When the attributes in an attribute expression are replaced by specific values with which they are associated, the attribute expression is equivalent to a constant value. A derived attribute 1528 is an attribute defined in terms of other attributes. Value expressions can be combined by common relational operators to produce relational value expressions 1530 using relational binary operators 1532, relational unary operators 1534, and logical operators 1536.

FIG. 15C illustrates additional data and information types used in the distributed-search methods and subsystems to which the current application is directed. A filter 1540 is a relational expression that specifies a value or range of values for an attribute. A policy 1542 comprises one or more filters. A search-evaluation expression 1544 is used to evaluate returned dynamic-attribute values from participant search-request responders in order to compute a score for a response, as discussed, in detail, below. A search-evaluation expression comprises one or more evaluators. An evaluator 1546 is either a simple evaluator or a weight/simple-evaluator pair. A simple evaluator 1548 is a minimum-positive attribute or a floor/minimum-positive-attribute pair. A minimum-positive attribute is an attribute having values selected from a numeric or ordered-set value domain that map to a set of numerically increasing values, generally beginning with the value "0." As the value increases, the desirability or fitness of the attribute and its associated value decreases. For example, an attribute "price" may have values in the range [0, maximum_price], with lower prices more desirable than higher prices and the price value 0, otherwise referred to as "free," being most desirable. In general, an attribute that is not a minimally positive can be easily transformed into a derived, minimum-positive-attribute. For example, the attribute "expected lifetime" can be transformed into the derived attribute "early expiration" by: early_expiration:MAXI-MUM_LIFETIME−expected_lifetime. A weight is a numeric multiplier and a floor is a numeric or ordered-set value. Weights are used to adjust the relative importance of attributes in search-evaluation expression and a floor is used to set a lowest-meaningful value of an attribute to a value greater than 0, for numeric attributes, or to an ordered-set value greater than the minimum value in the ordered set. A search 1552 is either a search-evaluation expression or a search-evaluation expression and one or more policies.

Figure 16A:
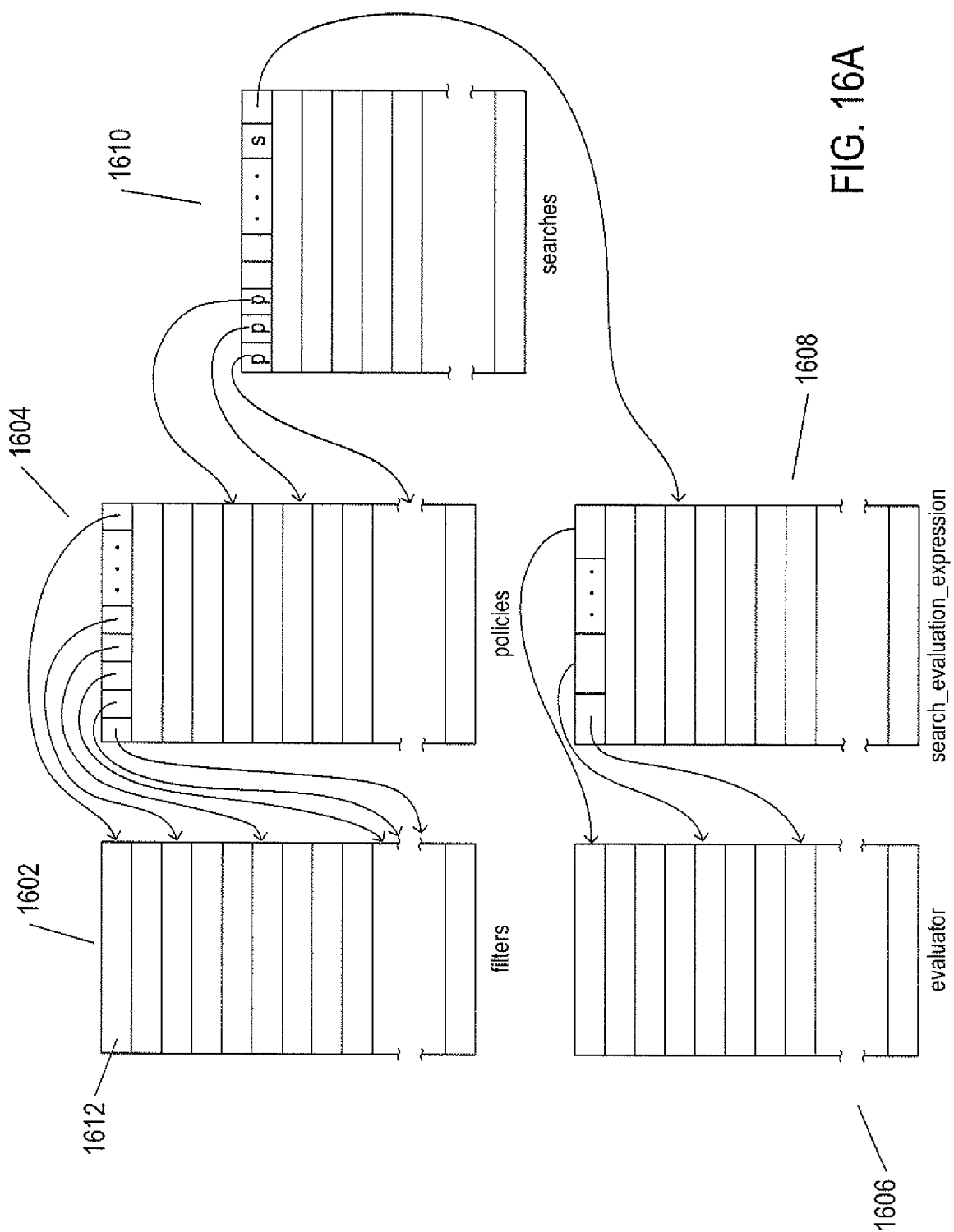
FIGS. 16A-B illustrate certain types of data maintained and used within local instances of the distributed-search subsystem and within a distributed-search engine.
Figure 16B:
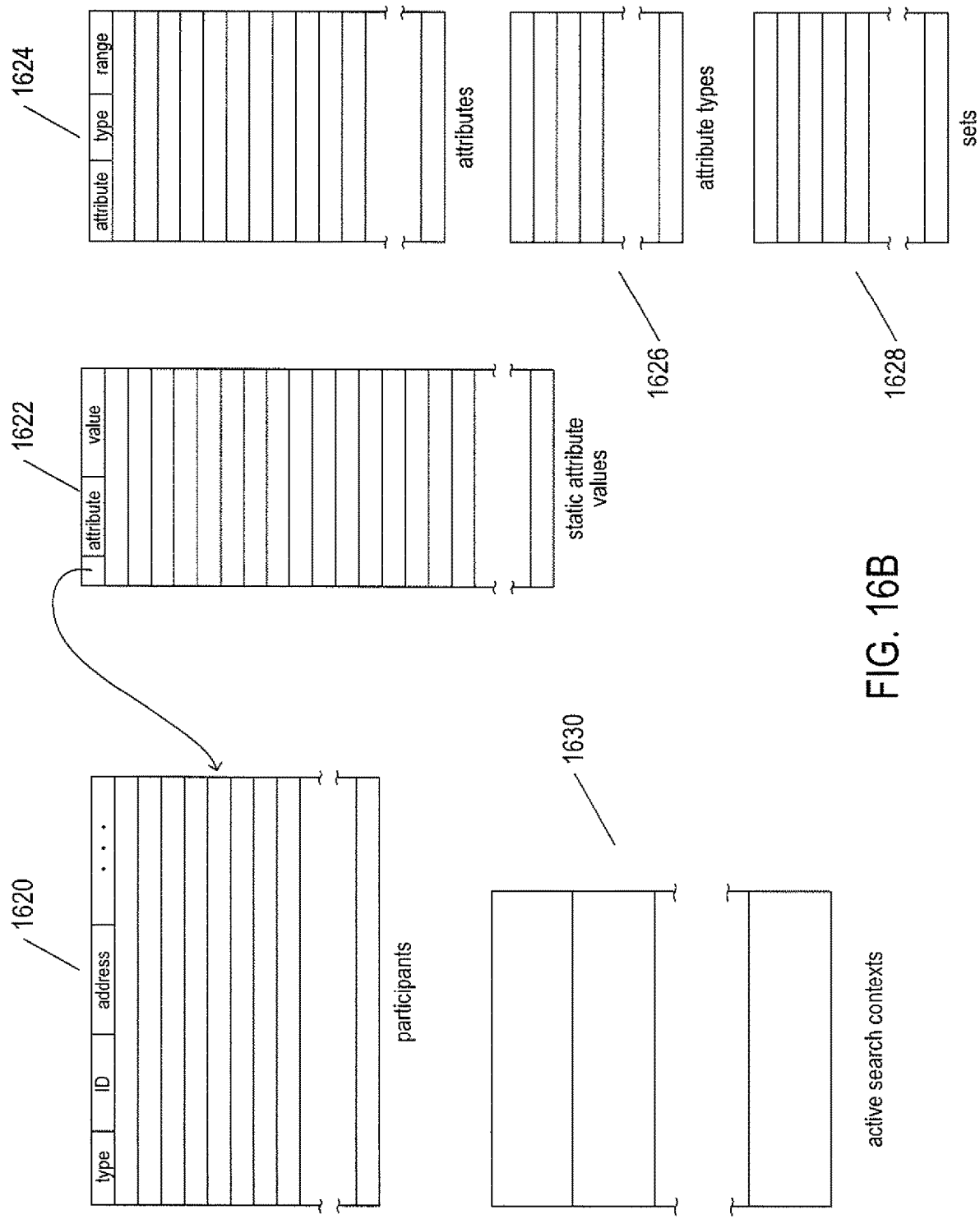

FIGS. 16A-B illustrate certain types of data maintained and used within local instances of the distributed-search subsystem and within a distributed-search engine. As shown in FIG. 16A, a local instance of the distributed-search subsystem stores one or more filters 1602, one or more policies 1604, each policy comprising one or more filters, one or more evaluators 1606, one or more search-evaluation expressions 1608, each search-evaluation expression comprising one or more evaluators, and one or more searches 1610, each search comprising a search-evaluation expression and zero, one, or more policies. In FIG. 16A, each row, such as row 1612, within a set of information entities, such as the set of filters 1602, represents a single information entity of the type of the entity set. The various types of information entities may be stored in relational database tables, including singly or multiply indexed relational database tables, or in any of many other different types of data-storage objects and systems.

Using similar illustration conventions as used in FIG. 16A, FIG. 16B shows the types of information entities stored within the distributed-search engine. The information-entity sets include a set of participants 1620, a set of continuously collected static-attribute/value pairs associated with participants 1622, a set of attributes 1624 and a set of attribute types 1626 which define the attributes that can be used in filters and profiles, a set of sets 1628 from which set values and subsets are selected for set-valued attributes, and a set of active search contexts 1630, each active search context representing a distributed search currently being executed by the distributed-search subsystem.

Figure 17:
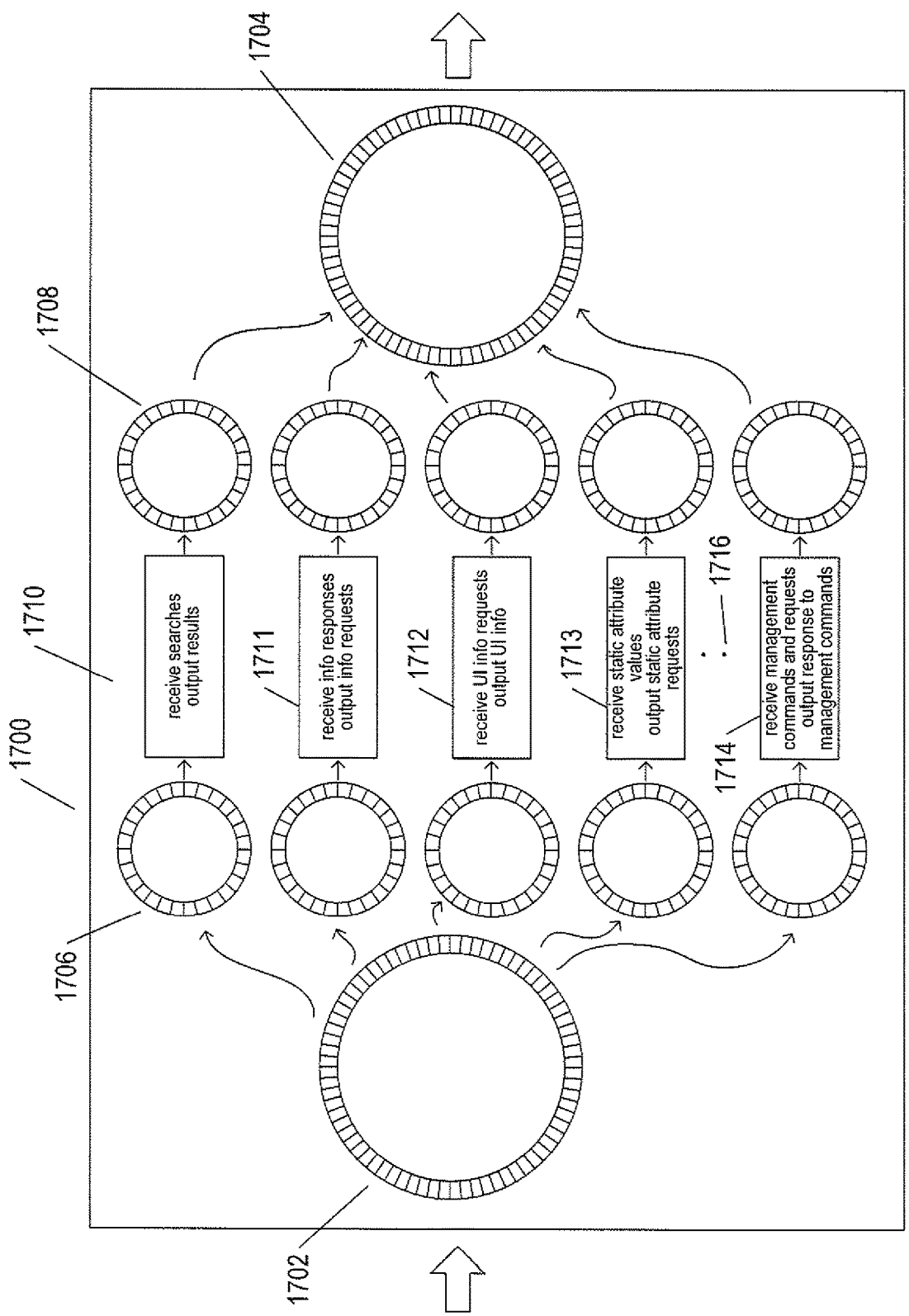
FIG. 17 is a high-level diagram of the distributed-search engine.

FIG. 17 is a high-level diagram of the distributed-search engine. The distributed-search engine receives incoming messages from one or more communications subsystems in an input queue 1702 and outputs messages to an output queue 1704 from which they are extracted and transmitted by the one or more communications subsystems. There are many different types of messages received and transmitted by the distributed-search engine. Different types of messages can be thought of as being distributed from the input queue 1702 to input queues for specific message types, such as input queue 1706 for search requests. Similarly, specific types of output messages are output to specific output queues, such as output queue 1708, from which they are input to the general output queue 1704 for transmission. Various different types of controllers or logic modules 1710-1714 process particular types of input messages and generate particular types of output messages. For example, controller 1710 receives search requests from distributed-search participants and outputs results corresponding to the search requests. Controller 1711 outputs information requests, such as dynamic attribute-value requests, and receives responses to those information requests. Controller 1712 receives UI information requests from local instances of the distributed-search subsystem and outputs responses to those requests. For example, a local instance of the distributed-search subsystem may request a current list of the different types of attributes that can be used to construct filters, policies, and search-evaluation expressions. Controller 1713 outputs static-attribute requests to distributed-search participants and receives response to those requests. Controller 1714 receives management commands and requests from local instances of the distributed-search subsystem and outputs responses to the received commands and requests. Ellipses 1716 indicate that a distributed-search engine may include additional types of controllers that receive and output additional specific types of messages.

Figure 18:
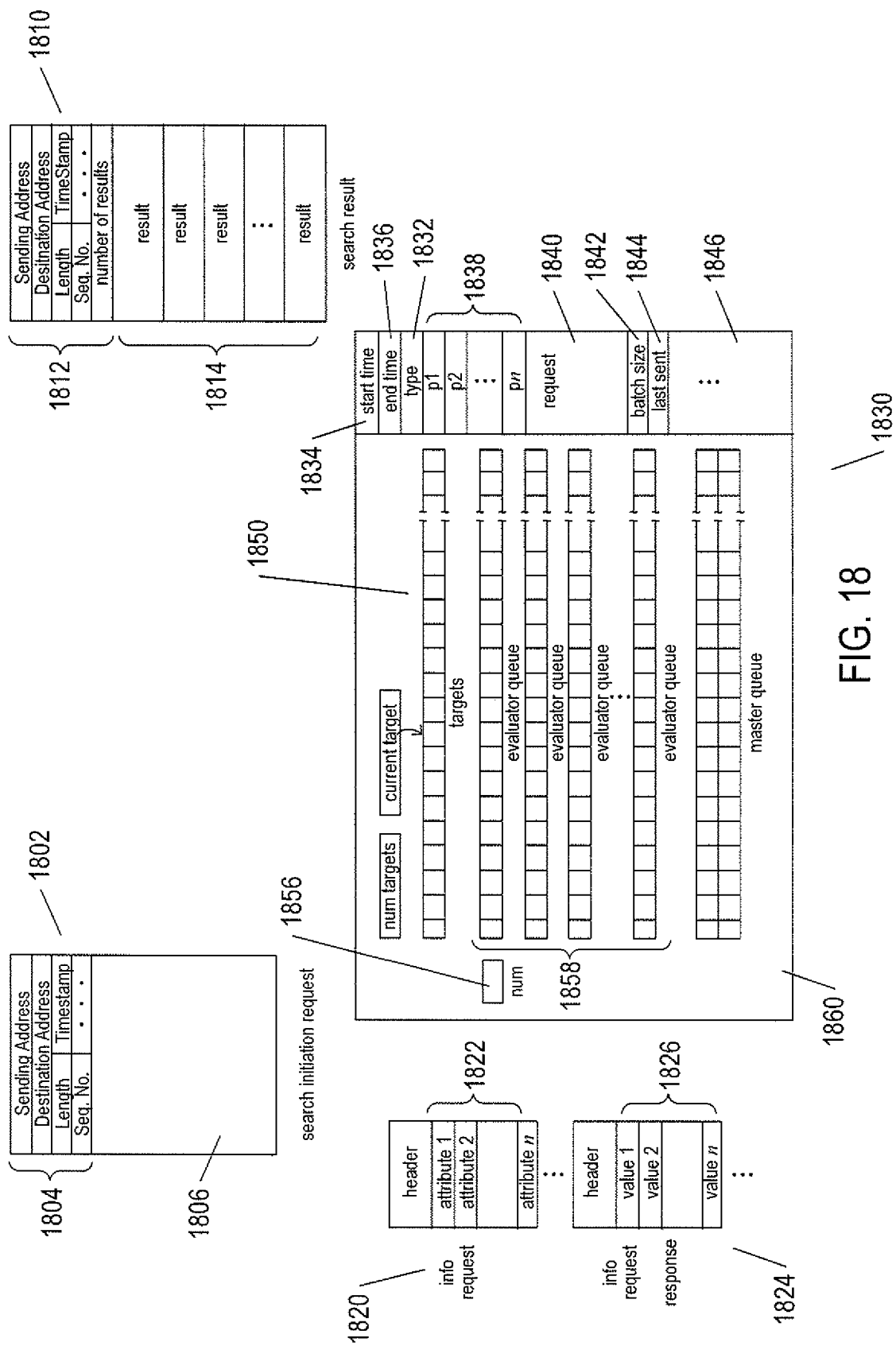
FIG. 18 illustrates various messages and data structures used during execution of a distributed search by the currently disclosed distributed-search subsystem, including an active search context, a search request, a search-request response, and information requests and responses.

FIG. 18 illustrates various messages and data structures used during execution of a distributed search by the currently disclosed distributed-search subsystem, including an active search context, a search request, a search-request response, and information requests and responses. A search-initiation-request message 1802 includes header information 1804 as well as a search-initiation request 1806 that includes a search-evaluation expression and zero, one, or more policies. A search-result message 1810 also includes a header 1812 and one or more search results 1814. Search results identify entities and include attribute/value pairs that characterize the entities. An information request 1820 is sent by the distributed-search engine to target participants requesting current values for a set of dynamic attributes 1822 specified in the information-request message. A response to the information-request message 1824 includes the requested dynamic-attribute values 1826.

An active search context 1830 is a complex data structure maintained by the distributed-search engine for each distributed search currently being executed by the distributed-search engine. In one implementation, an active search context includes an indication of the type of search 1832, a start time for the search 1834, an end time for the search 1836, and a number of additional search parameters 1838. The active search context may store the search-initiation-request message 1840 that initiated the search. The active search context may additionally include a batch size 1842, indicating the number of information requests to be sent in each batch of transmitted information requests and an indication of the time at which the last batch of information-request messages was sent 1844. Ellipses 1846 indicate that many additional parameters and information entities may be stored within an active search context. The active search context may also include a list of target participants 1850 to which information requests need to be directed. These may be participant addresses, expressions from which sets of participant addresses may be computed, or other types of information that can be used to generate addresses for target participants during execution of a distributed search. In addition, the active search context includes an indication of the number of evaluators in the search-evaluation expression 1856, a set of evaluator queues 1858, and a master queue 1860. The evaluator queues maintain an ordered set of returned dynamic-attribute values corresponding to the dynamic attribute associated each evaluator in the search-evaluation expression. The master queue 1860 maintains dynamic-attribute values, scores, and other information for the participants with the best-evaluated responses so far received. Operation of the evaluator queues and master queue is discussed, in great detail, below.

Figure 19A:
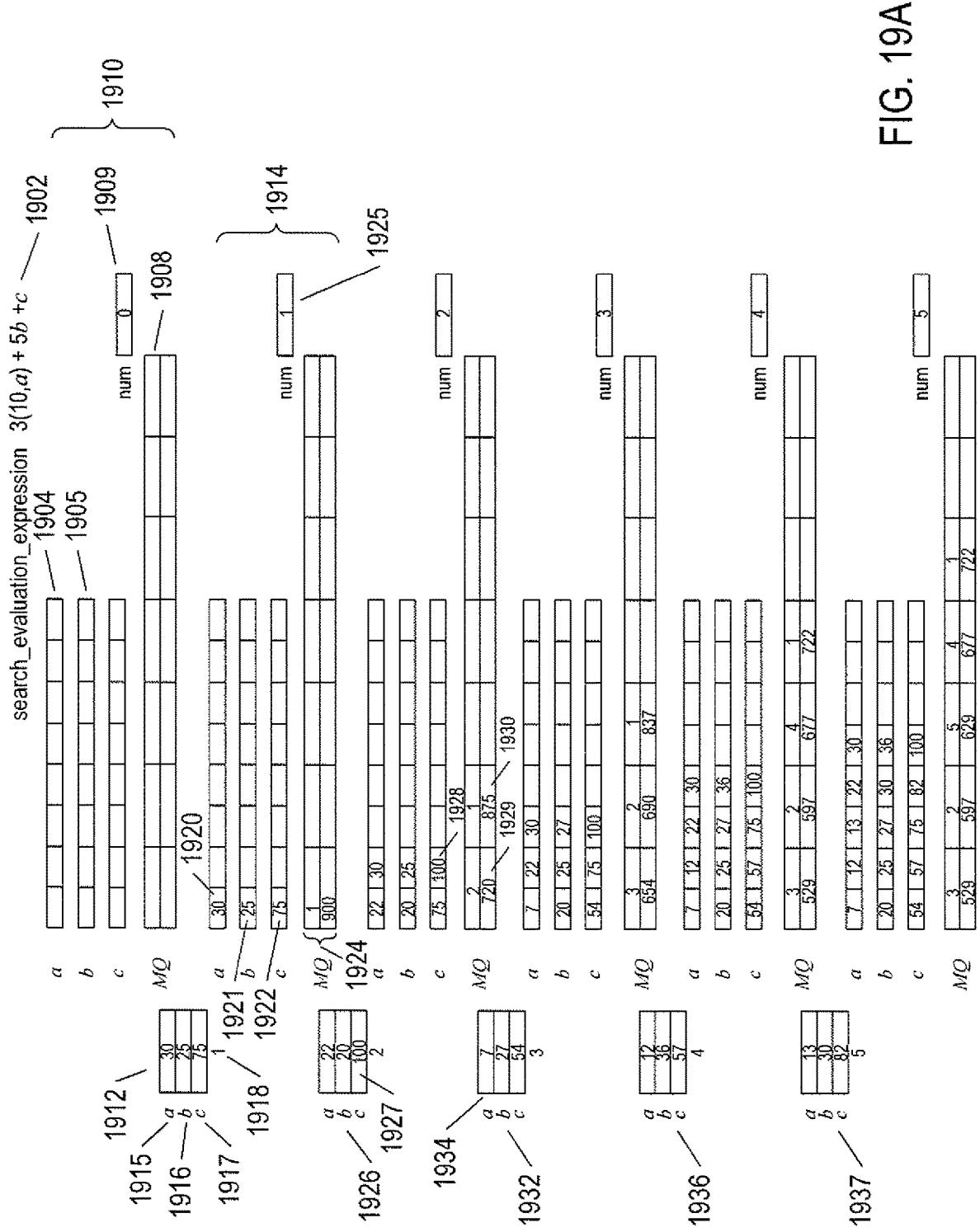
Figure 19B:
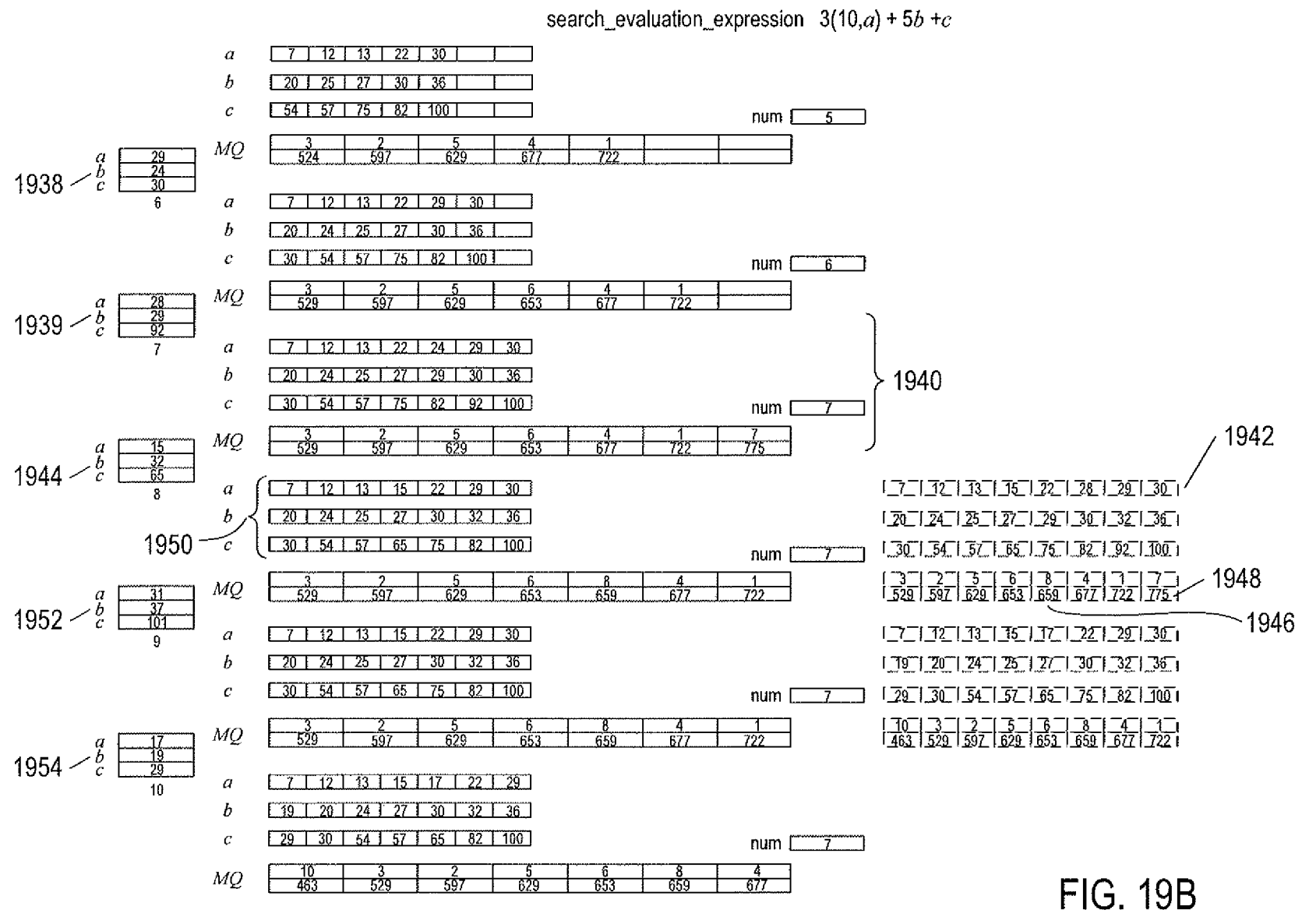

FIGS. 19A-B illustrate operation of the evaluator queues and master queue within an active search context. In this example, a dynamic-attribute-value-request message, a type of information-request message, is transmitted to target participants to obtain current values for each of 3 attributes a, b, and c. The search-evaluation expression 1902 associated with the distributed search is: 3(10,a)+5b+c. The "+" operators indicate that a score is computed by adding values computed for each evaluator. The first evaluator, 3(10,a), has a weight equal to 3, a floor equal to 10, and is computed from the current value of attribute a. The second evaluator 5b has a weight of 5 and is computed from the current value of attribute b. The third evaluator is simply the value of attribute c. The search-evaluation expression is used to compute scores for each received response message, with lower scores more favorable than higher scores. Three evaluator queues 1904-1906 store, in sorted order, the values for attributes a, b, and c for the participant responses stored in the master queue MQ 1908. The number of stored responses is indicated in the variable num 1909. In FIGS. 19A-B, the state of the evaluator queues and the master queue are indicated before and after reception of each of a series of responses to dynamic-attribute-value-request messages. Initially, the queues are empty 1910. After a first response 1912 is received, an entry is placed in each queue, resulting in the queue state 1914. The first response message 1912 includes numeric values for the three attributes a, b, and c 1915, 1916, and 1917. It is also associated with an identifier, or ID 1918. In this example, the IDs are simple monotonically increasing integers starting with "1."

Next, processing of the first response message 1912 is described. The three attribute values 1915-1917 are entered into their respective queues 1920-1922. Because the queues are initially empty, they become the first entries in the queues and are therefore in sorted order. Then, a score is computed using the search-evaluation expression 1902. First, if a returned value is less than the floor in the evaluator associated with the attribute value, an initial evaluator score is set to the floor value. Otherwise, the initial evaluator score is set to the value returned in the response message. Then, a percentage or ratio is computed for each initial evaluator score and the maximum value in the queue in which the associated attribute value was inserted. The ratio is multiplied by 100 to generate an intermediate evaluator score in the range [0, 100]. Then, the intermediate evaluator score is multiplied by the weight to produce a final evaluator score. The three evaluator scores are then added to produce the final score for the response message. In the case of the first response message 1912, all of the returned attribute values are the maximum values in the queues. Therefore, the score is computed as:

$$(3\times((30\div30)\times100))+(5\times((25\div25)\times100))+((75\div75)\times100)=900$$

This score is entered, in association with the identifier for the response message "1," into the master queue as the first entry 1924. There is now one entry in the master queue and each evaluator queue, so the variable num now has the value "1" 1925. Of course, this is merely one way to compute a score from the search-evaluation expression and returned attribute values. Many other types of score computations can be used. For example, the rank of an attribute value in an evaluator queue can be used in addition to, or in place of, the percentage of the maximum value in the queue to compute the intermediate evaluator score. The raw computed ratios of values to max values in queues can be used, rather than percentages. Exponentials and logarithms can be employed to generate non-linear scoring methods. Evaluator scores may be combined by operations other than addition. However, the currently described method has proven to provide good results for certain multi-attribute search results.

A second response message 1926 is then received, and the same operations are performed. Because the values in the evaluator queues are sorted in ascending order, and because the value "100" for attribute c in the second response message 1927 is greater than the value "75" for attribute c in the first response message 1917, the value "100" is now at the end of the evaluator queue 1928 for attribute c. The scores for the first and second messages are now recomputed as:

$$(3\times((30\div30)\times100))+(5\times((25\div25)\times100))+((75\div100)\times100)=875$$

$$(3\times((22\div30)\times100))+(5\times((20\div25)\times100))+((100\div100)\times100)=720$$

In the illustrated queue states, the master queue is kept sorted, in ascending order, so the score and identifier for the second response message occupies the first position 1929 in the master queue and the identifier and score for the second response message now occupies the second position 1930 in the master queue. Again, the lower the score, the more desirable the response. As will be seen, below, the active search context is designed to retain a set of the lowest-scored response messages, alternatively referred to as "most favorably scored response messages," received during the course of the distributed search.

A third response message 1932 is then received, and the same operations are performed. In this case, the value for attribute a, "7," 1934 is lower than the floor "10" for the first evaluator, so the value "10" is used instead of the value "7" in computing the evaluator score associated with attribute a. The scores for all three messages are recomputed as:

$$(3\times((30\div30)\times100))+(5\times((25\div27)\times100))+((75\div100)\times100)=837$$

$$(3\times((22\div30)\times100))+(5\times((20\div27)\times100))+((100\div100)\times100)=690$$

$$(3\times((10\div30)\times100))+(5\times((27\div27)\times100))+((54\div100)\times100)=654$$

In this example, the master queue is kept sorted, in ascending order, so the score and identifier for the second response message occupies the first position 1929 in the master queue and the identifier and score for the second response message now occupies the second position 1930 in the master queue.

Four more response messages 1936-1939 are received, resulting in the queue state 1940 shown in FIG. 19B. At this point, the evaluator queues and the master queue are full. From now on, any newly received response message added to the master queue along with individual attribute values added to the evaluator queues, will involve discarding an entry from each queue. This only occurs when the score computed for the newly received response message is lower than one of the scores in the master queue. As more and more responses are received, the likelihood that any next received response will be entered into the evaluator and master queues quickly decreases to a relatively low value for most types of distributed searches. The operations now become slightly more complex. First, as shown in a scratch-pad representation 1942 of the evaluator and master queues, there is an additional entry in each queue that can temporarily accommodate the attribute values and score for a newly received message. The scores are computed based on all of the entries, including those for the newly arrived response, and then the entries for the response with the highest score are deleted. Newly arrived response 1944 with ID equal to "8" ends up with a score "658," placing it towards the middle 1946 of the scratch-pad master queue. The score for response message "7" 1948 is now highest, and therefore the entries for that response message are deleted from the queues to produce queue state 1950.

The ninth response message 1952 arrives with each attribute value greater than the current maximum value in the respective evaluator queue. As a result, no new scores need be computed, since there is no possibility that a score computed for the ninth response message could be lower than any of the scores currently residing in the master queue. The ninth response is thus immediately rejected and the queue state 1954 remains unchanged.

A Distributed Resource-Exchange System that Aggregates a Large Number of Data Centers to Create a Distributed. Multi-Organization Cloud-Computing and Resource-Sharing Facility FIGS. 20A-E illustrate the concept of resource exchange among cloud-computing facilities, data centers, and other computing facilities. FIGS. 20A-D all use similar illustration conventions, next described with reference to FIG. 20A.

Figure 20A:
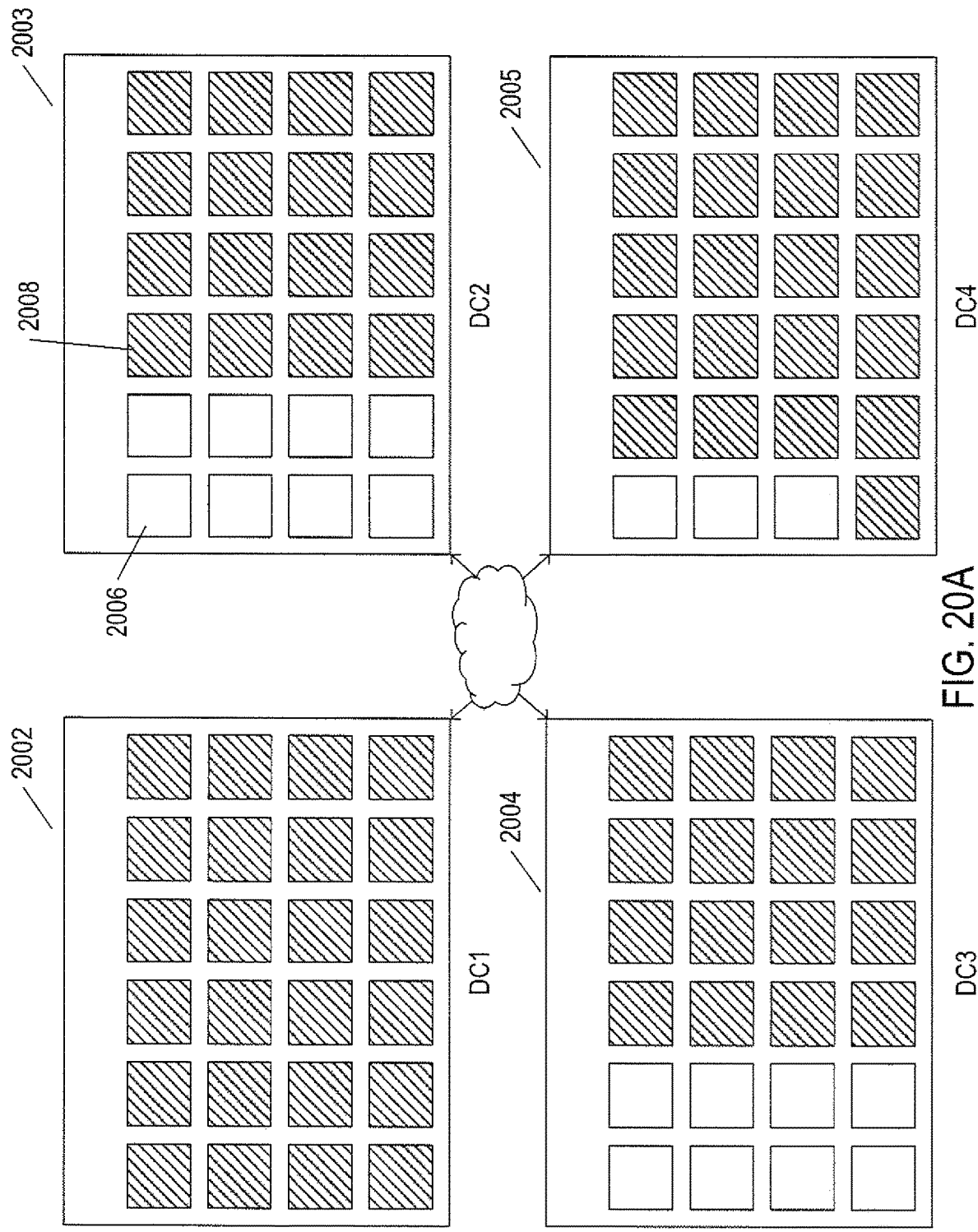
FIGS. 20A-E illustrate the concept of resource exchange among cloud-computing facilities, data centers, and other computing facilities.

FIG. 20A shows abstract representations of four different computing facilities 2002-2005. In each large rectangle representing each computing facility, smaller squares represent a capacity for hosting a VM. Squares without cross-hatching, such as square 2006, represent a currently unused capacity for hosting a VM and cross-hatched squares, such as square 2008, represent a currently in-use capacity for hosting a VM. Of course, real-world computing facilities generally have the resources and capacities to host hundreds, thousands, tens of thousands, or more VMs, but, for current concept-illustration purposes, the 24-VM-hosting capacity of each illustrated computing facility 2002-2005 is sufficient. It should be noted that, in the current document, the computational resources used to host a VM are used as an example of a resource that can be exchanged between computing facilities. The computational resources used to host a container is another example of a resource that can be exchanged between computing facilities. Virtual machines and containers are both examples of computational-resources-consuming entities that can be hosted by computing facilities.

As shown in FIG. 20A, the computing facility DC1 2002 has no spare or unused VM hosting capacity. Computing facilities DC2 2003 and DC3 2004 each have unused capacity for hosting eight additional VMs while computing facility DC4 has unused capacity for hosting three additional VMs. Unused capacity can arise within a computing facility for many reasons. A computing facility may have been expanded to accommodate a planned project or division, but the project or division may not yet need the expanded computational resources or may have been cancelled. In many cases, computational-facility administrators may maintain additional, spare capacity to be able to instantly respond to increased demand from internal users or from remote clients of internally hosted web services and applications. In some cases, the owners and/or managers of a computational facility may have configured the computational facility for providing computational resources as a service to remote clients. The amount of unused capacity within a given computational facility may fluctuate widely and over very short time spans, in certain operational states, or may remain fairly stable, over days, weeks, or months. Currently, for computing facilities other than those specifically established to provide resources as a service, there are few methodologies and media for safely and conveniently making unused capacity available to remote systems and users.

The distributed resource-exchange system facilitates leasing or donating unused computational resources, such as capacity for hosting VMs, by computing facilities to remote computing facilities and users. The distributed resource-exchange system provides a type of automated computational-resource brokerage that brokers exchange of computational resources among participant computing facilities, allowing computational resources to be conveniently, securely, and rationally shared among many different computing facilities owned and managed by many different participant organizations. At a high-level perspective, the automated computational-resource brokerage is a computational-facility-aggregation optimization subsystem that allows for applying computational resources to tasks that need them across a potentially enormous number of discrete computing facilities owned and managed by many different organizations. The distributed resource-exchange system provides efficient brokerage through automation, through use of the above-discussed methods and systems for distributed search, and through use of efficient services provided by virtualization layers with computing facilities, including virtual management networks, secure virtual internal data centers, and secure VM migration services provided by virtualization layers. The automated computational-resource brokerage is convenient and easy to use for administrators, managers, and other users of commutating facilities seeking to sell, donate, or otherwise provide local resources to remote computing-facility resource consumers because of simplified user interfaces, because of predefined attributes, filters, profiles, and easily accessible information about resource providers and resource consumers, and because of a wealth of automated methodologies that streamline searches for resources, transactions that provide resources for defined periods of time to resource consumers, collection of user feedback, and generation of rankings, ratings, and recommendations to facilitate future searchers for resources and resource-acquisition transactions. The automated computational-resource brokerage is rational because the brokerage provides a wealth of information to resource providers and resource consumers in order that participants are fully informed with regard to available resources and their attributes, and because this information is incorporated into automated methods and systems that allow the wealth of information to be constantly updated and to be used by automated distributed-search methods. The automated computational-resource brokerage provides secure remote hosting of VMs, secure data transmission and storage, secure internal and external network communications, and other security measures to ensure that resources provided by remote computing facilities are as secure, or nearly as secure, as local resources used by resource consumers.

Figure 20B:
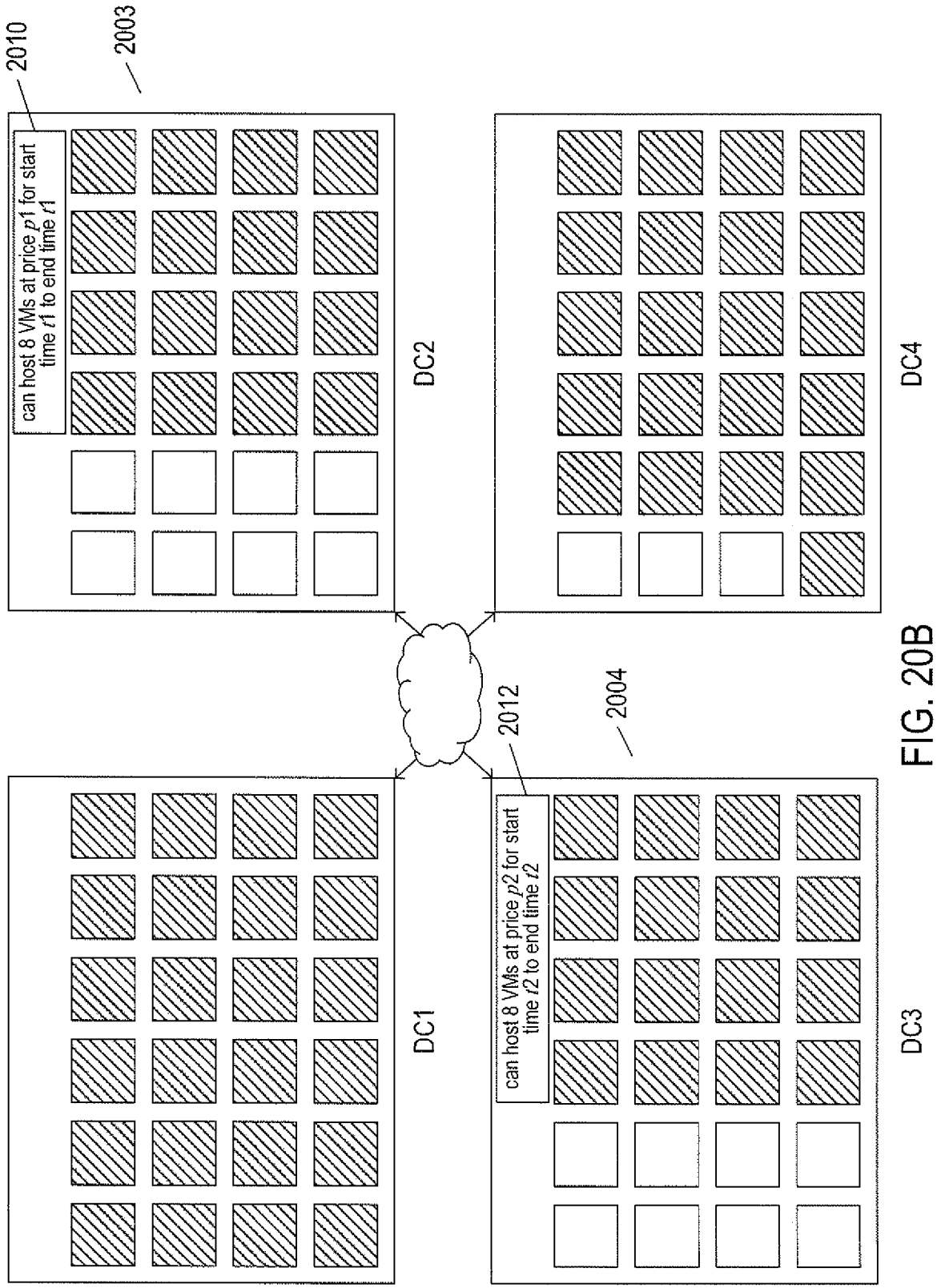

FIG. 20B illustrates an initial step in resource exchange. Computing facilities DC2 2003 and DC3 2004 have registered as participants with the automated computational-resource brokerage in order to make their spare VM-hosting capacity available to remote resource consumers. As shown in FIG. 20B, they have provided attribute values 2010 and 2012 to the automated computational-resource brokerage indicating that they are interested in selling VM-hosting capacity. As discussed above, certain of these attribute values are provided during registration, others are provided in response to static-attribute requests, and still others are provided in response to information-request messages. Attributes such as the current price for VM hosting and current hosting capacity are likely to be provided in response to information-request messages, while the types of hosting services and long-term hosting capacities may be provided in response to static-attribute requests. The fact that computing facilities DC2 and DC3 are automated-computational-resource-brokerage participants is obtained during registration with the automated brokerage.

Figure 20C:
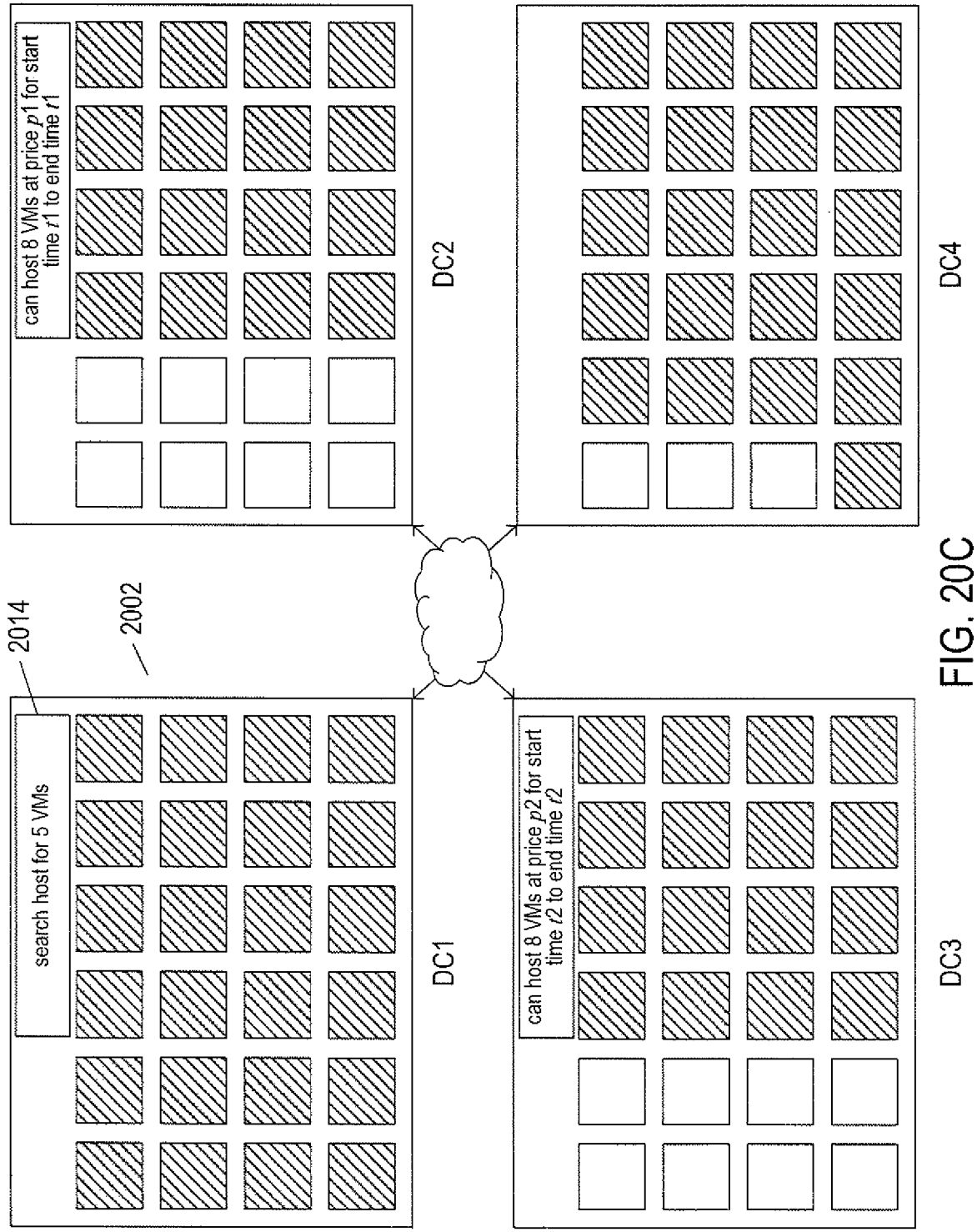

In FIG. 20C, the administrator of computing facility DC1 2003 realizes that all hosting capacity is currently in use within the computing facility. As a result, the administrator can either seek to physically expand the computing facility with new servers and other components or seek to obtain computational resources for remote providers, both for launching new VMs as well as for offloading currently executing VMs. As shown in FIG. 20C, the administrator has elected to register as a participant with the automated computational-resource brokerage and has initiated a search for one or more remote provider-participants to host five VMs 2014.

Figure 20D:
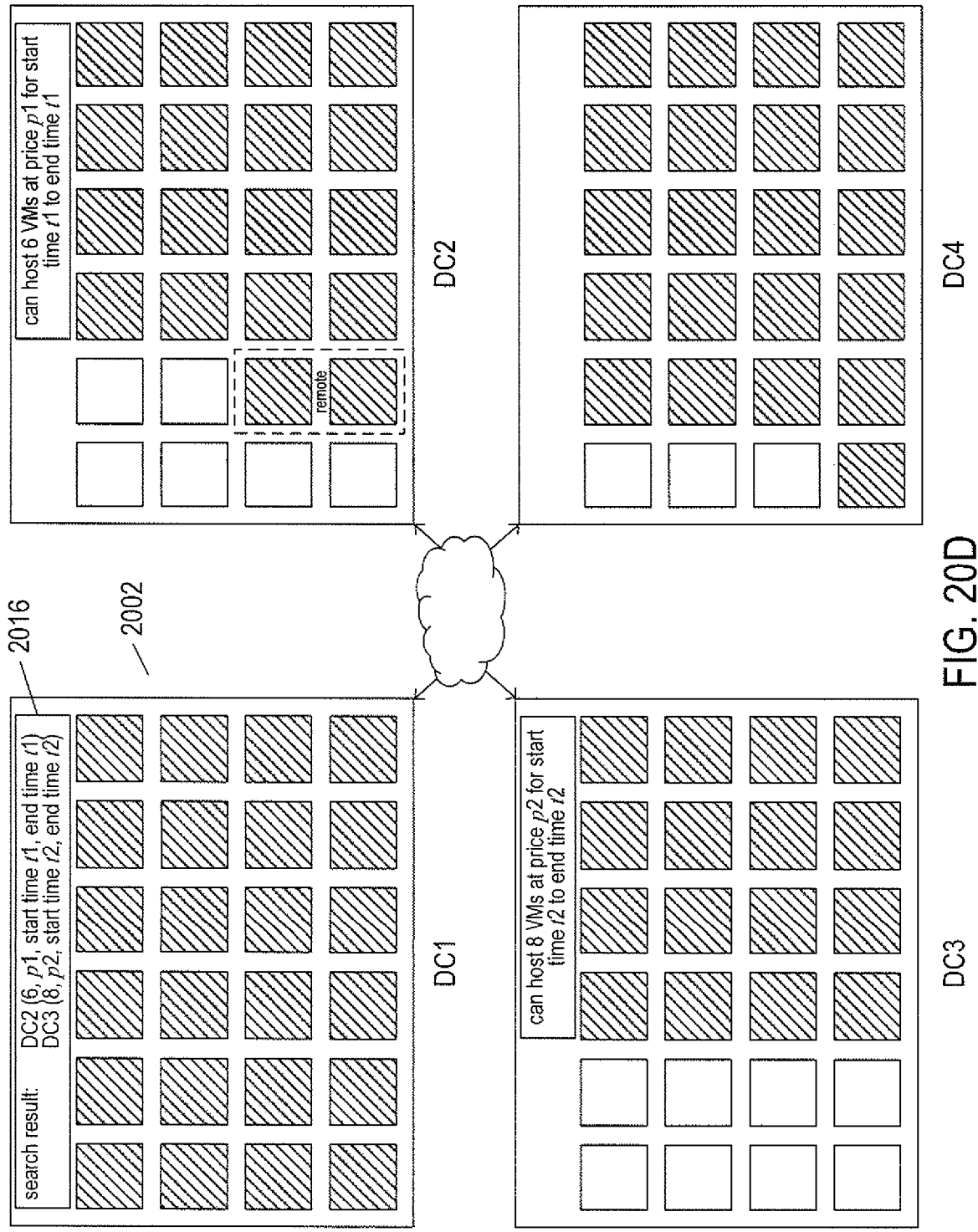

In FIG. 20D, the administrator of computing facility DC1 2002 has received search results 2016 from the automated computational-resource brokerage. The administrator, or automated resource-acquisition functionality within a local client instance of the automated computational-resource brokerage, can choose with which provider to transact for VM hosting, or can transact with both providers for hosting a different subset of the five VMs. Note that, during the time that the search was initiated, as discussed above with reference to FIG. 20C, and when initial information may have been returned from computing facility DC2 to computing facility DC1, several new VMs have been hosted by computing facility DC2. However, because the distributed search verifies respondents prior to returning search results, as discussed above, the search results 2016 accurately reflect the current hosting capacity of computing facility DC2.

Figure 20E:
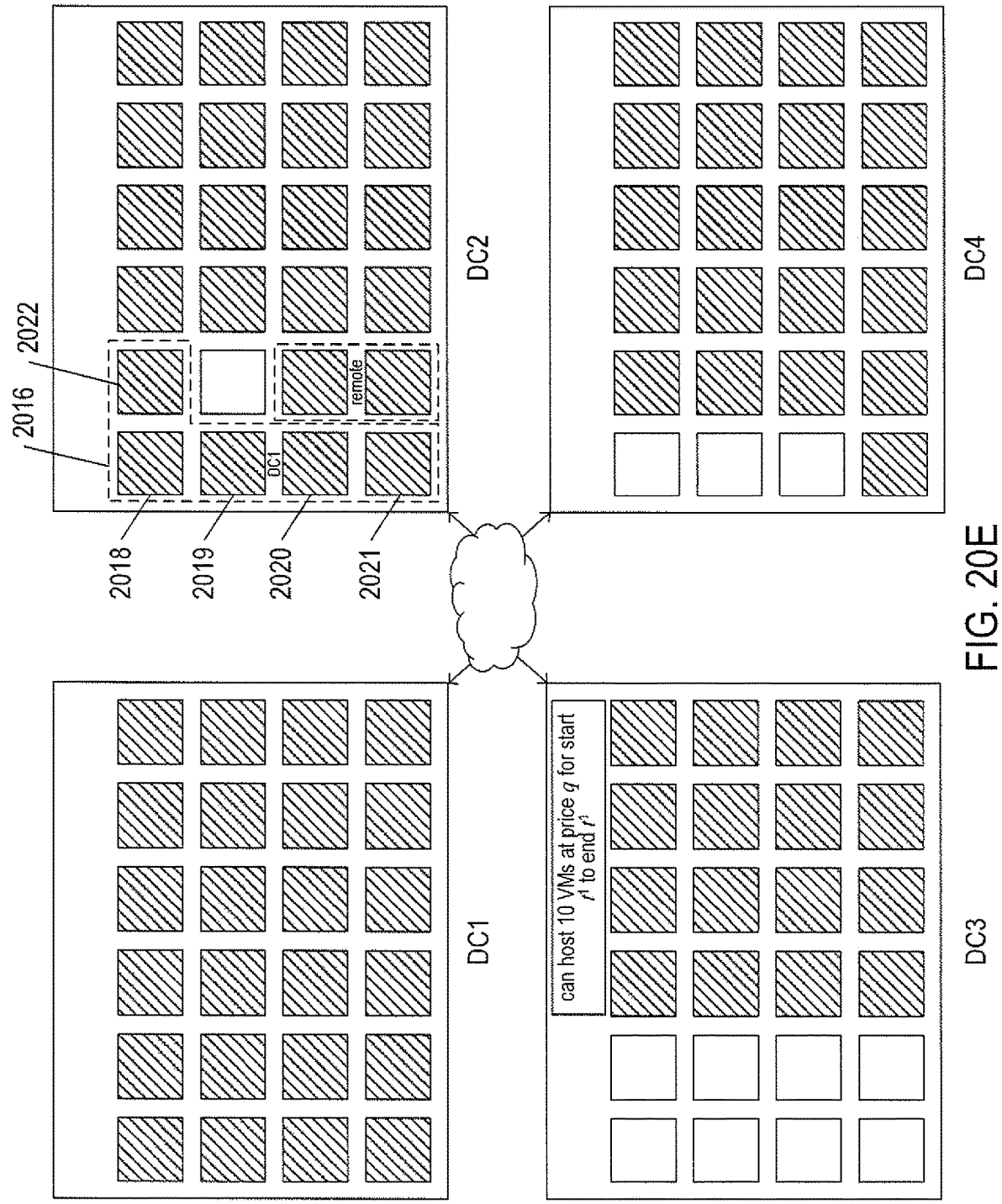

In FIG. 20E, the administrator of computing facility DC1, or automated resource-acquisition functionality within a local client instance of the automated computational-resource brokerage, has decided to transact for hosting the five VMs with computing facility DC2. As shown by the dashed lines 2016 that demarcate the 5 DC1 VMs 2018-2022 hosted by computing facility DC2, the VMs are hosted in a secure hosting partition so that neither the executing VMs nor the internal resources that they use within computing facility DC2 can be accessed or observed by DC2 entities or users. These 5 hosted VMs can be thought of as running within an extension of the DC1 computing facility.

Figure 21A:
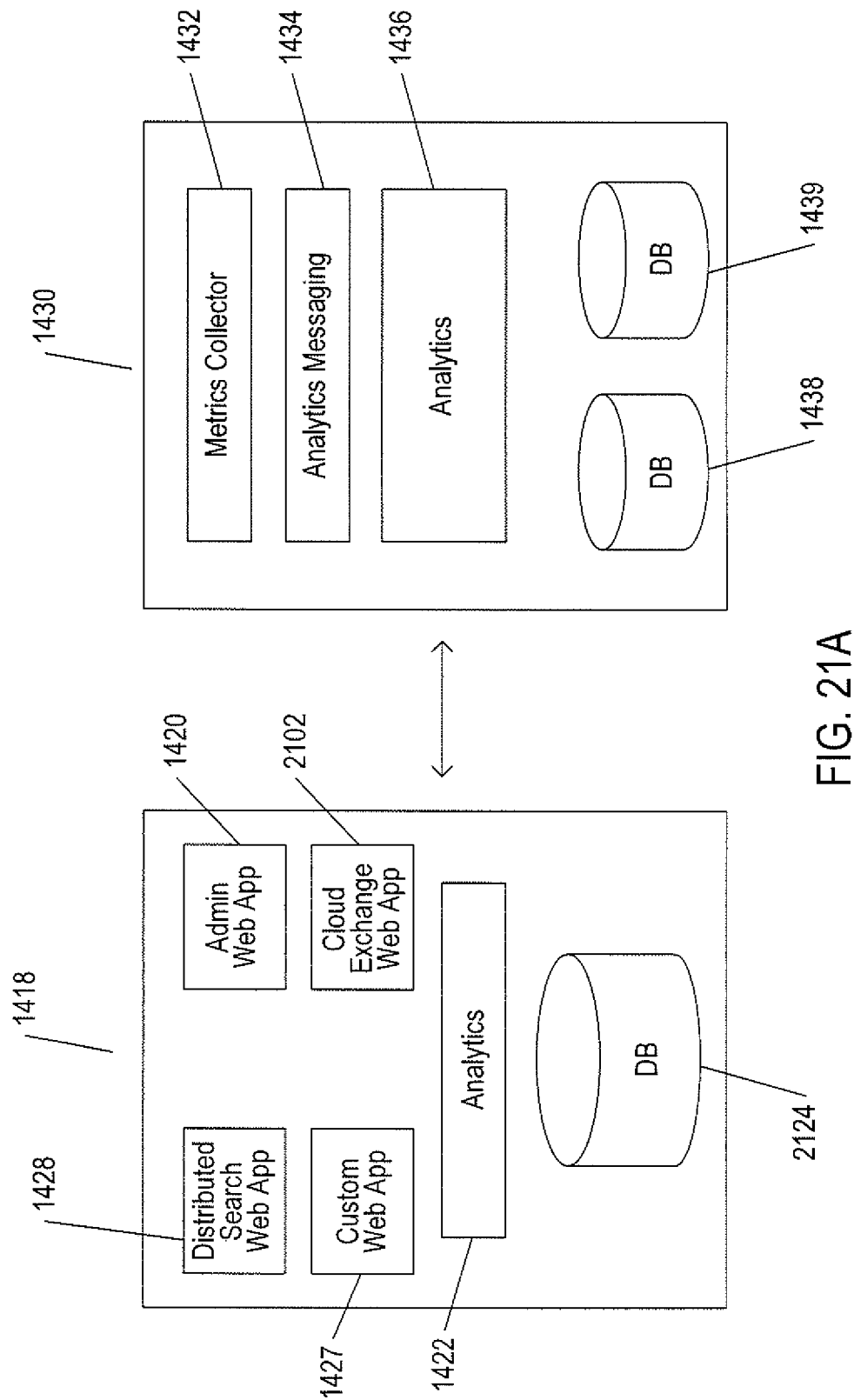
FIGS. 21A-B illustrate implementation of the automated computational-resource brokerage within multiple distributed computing facilities.
Figure 21B:
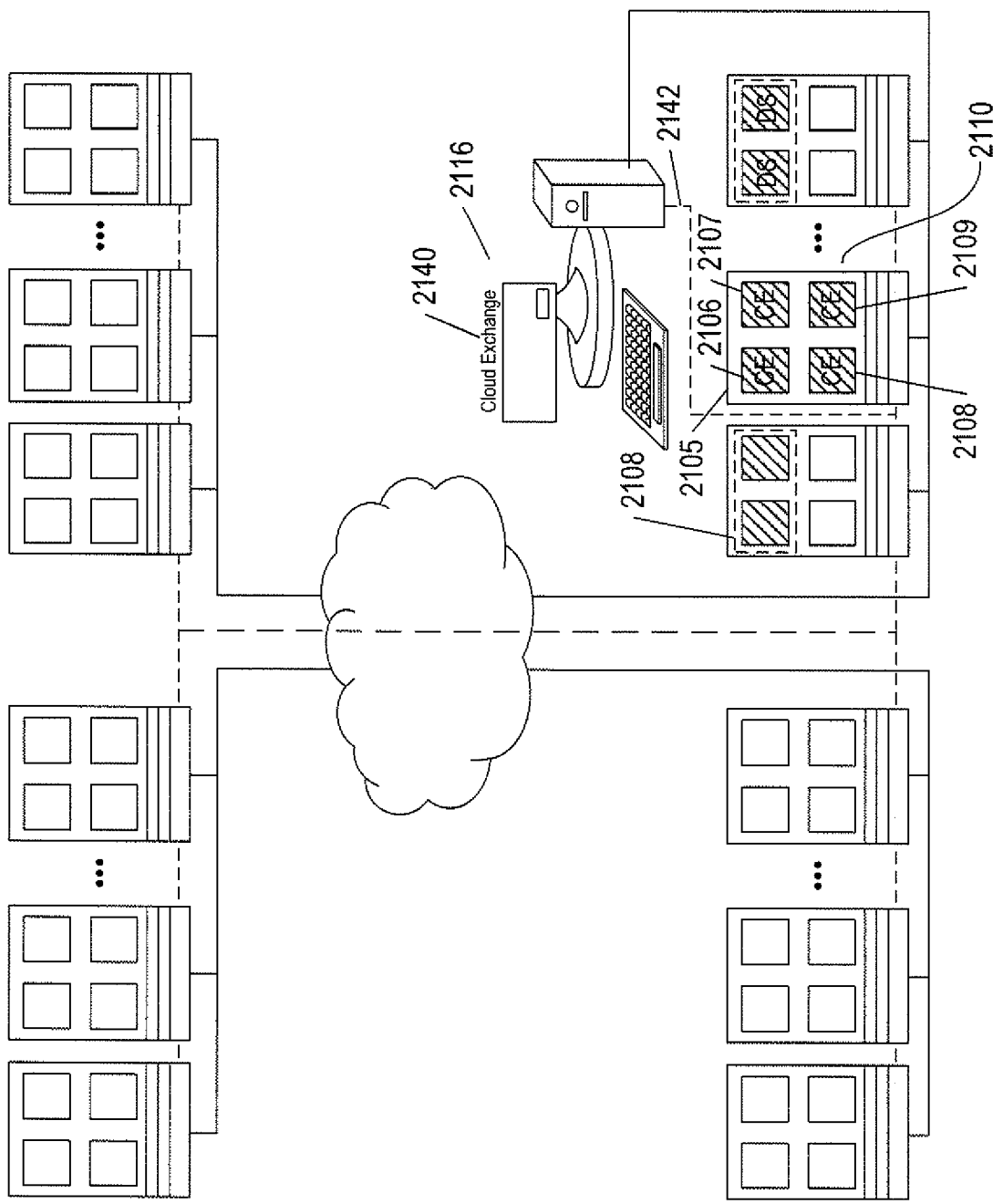

FIGS. 21A-B illustrate implementation of the automated computational-resource brokerage within multiple distributed computing facilities. The implementation of the computational-resource brokerage mirrors implementation of the distributed-search subsystem discussed above with reference to FIGS. 11B-C. The management subsystem is again shown, in FIG. 21A, using the same numeric labels used previously in FIG. 11B. In addition to the distributed-search web application 1128 that represents a local instance of the distributed-search subsystem within a server cluster, virtual data center, or some other set of computational resources within the distributed computer system, the management system provides an execution environment for a cloud-exchange web application 2102 that represents a local instance of the automated computational-resource brokerage within the server cluster. In certain implementations, the distributed-search web application 1128 may be incorporated within the cloud-exchange web application. The cloud-exchange web application 2102 provides a cloud-exchange UI (2104 in FIG. 21B) through which users can register as participants, update participant information, develop exchange policies and filters, set up automated resource-provision and resource-consumption agents within the automated computational-resource brokerage, and monitor exchanges, transactions, and other activities.

As shown in FIG. 21B, the local instance of the automated computational-resource brokerage, or cloud-exchange web application (2102 in FIG. 21A) exchanges requests and responses with a cloud-exchange engine 2105, in one implementation implemented as a multi-tiered application containing multiple cloud-exchange engine virtual machines 2106-2109 that run within a server 2110 or other computer systems within the distributed computer system. The cloud-exchange engine maintains centralized attribute values and other data for the automated computational-resource brokerage, monitors transactions, carries out transactions for computational resources on behalf of participants, collects feedback and maintains ratings and/or rankings of participants, provides many default filters and policies, and carries out many additional functions that together comprise the automated computational-resource brokerage.

Figure 22:
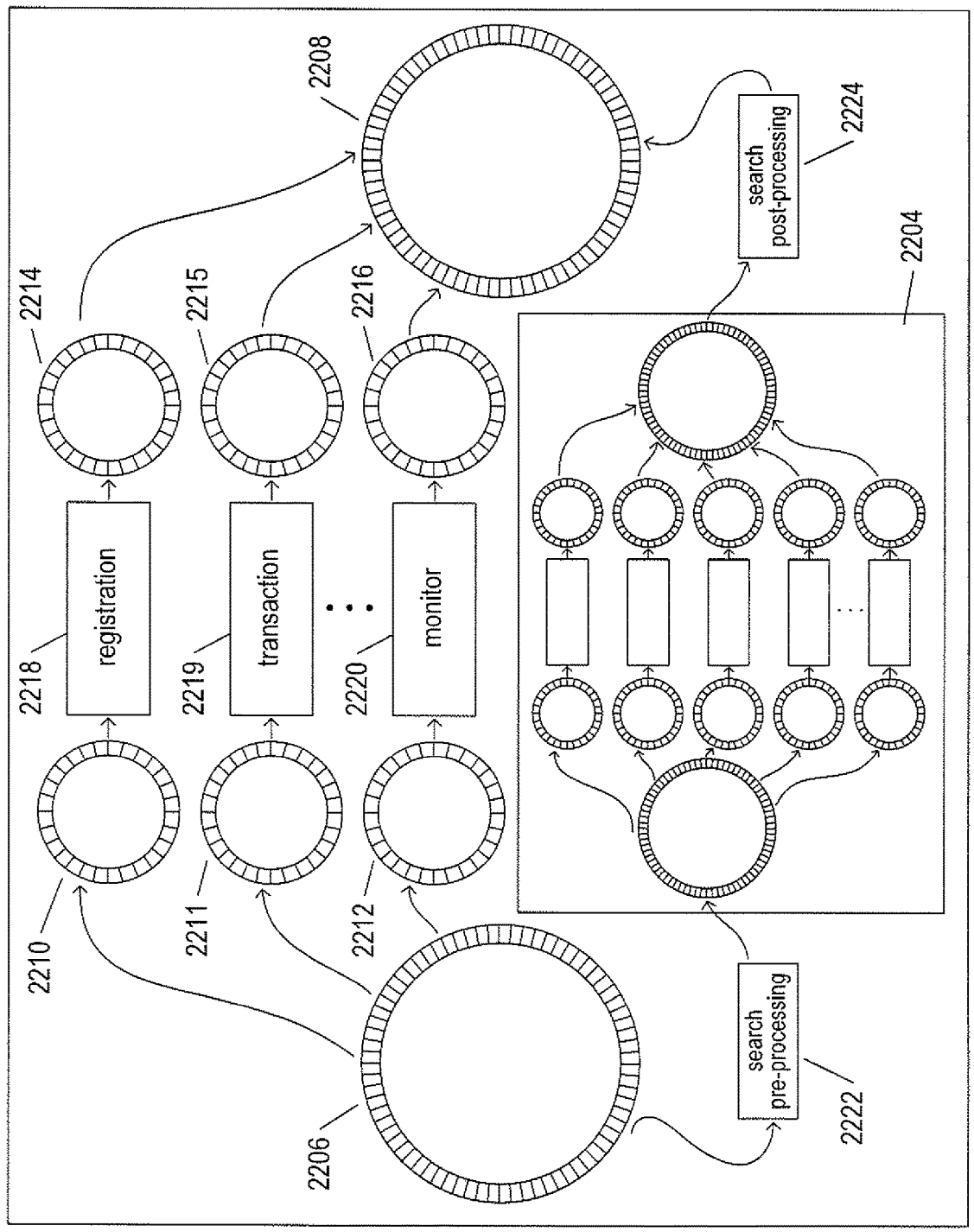
FIG. 22 illustrates the general implementation of the cloud-exchange engine (2105 in FIG. 21B).

FIG. 22 illustrates the general implementation of the cloud-exchange engine (2105 in FIG. 21B). The general implementation of the cloud-exchange engine 2202 mirrors that of the distributed-search engine 2204, discussed above with reference to FIG. 14. Incoming request and response messages are received in a general input queue 2206 and outgoing responses and requests are queued to a general output queue 2208. FIG. 14 is a high-level diagram of the distributed-search engine. There are many different types of messages received and transmitted by the cloud-exchange engine. Different types of messages can be thought of as being distributed from the input queue 2206 to input queues for specific message types, such as input queues 2210-2212. Similarly, specific types of output messages are output to specific output queues, such as output queue 2214-2216, from which they are input to the general output queue 2208 for transmission. Various different types of controllers or logic modules 2218-2220 process particular types of input messages and generate particular types of output messages. For example, controller 2218 receives registration requests and additional requests within registration dialogues and returns responses to those requests. Searches for resources, also considered to be requests for resource consumption or initiation of resource auctions, are processed by a search-pre-processing module 2222 before being input as search requests to the distributed-search engine. Search responses, or bids from resource-provider participants, are processed by a search-post-processing module 2224 before being returned to the resource-consumption participant that initiated the search or auction. Of course, many alternative implementations, including implementations that incorporate distributed-search logic directly within the cloud-exchange engine, are possible.

Resource-Exchange Life Cycle as Represented by a Resource-Exchange Context

In many implementations of the above-described resource-exchange system, each resource exchange involves a well-defined set of operations, or process, the current state of which is encoded in a resource-exchange context that is stored in memory by the resource-exchange system to facilitate execution of the operations and tracking and monitoring of the resource-exchange process. The well-defined set of operations, and the state changes associated with those operations, define the life cycle of a resource exchange within the resource-exchange system. Resource-exchange contexts are physical components of the resource-exchange system. Resource-exchange contexts persistently store policy information and state information that can be electronically accessed during resource-exchange-system operations. Resource-exchange contexts are also control components of resource-exchange system, organizing and driving the many different tasks carried out by many different resource-exchange-system components within many different computing facilities.

To facilitate understanding of the following discussion, terminology used to describe the resource-exchange system and resource-exchange-system components is next presented. The phrase "resource-exchange system" refers to a large number of computing facilities owned and managed by many different organizations that are partially aggregated to allow the computing facilities to share portions of their computational resources with other computing facilities. The phrase "resource-exchange context" refers to the information stored in memories and mass-storage devices of the resource-exchange system that encodes an indication of the current state of a particular resource exchange, a buy policy associated with the resource exchange, an active search context during at least an auction phase of the lifecycle of the resource exchange, and additional information. The phrase "resource exchange" is an exchange of a computational resource, provided for a specified time period by a resource-provider computing facility, for a fee, service, or computational resource provided by a resource-consumer computing facility. The cloud-exchange system is an automated computational-resource brokerage system, as discussed in the preceding section. The resource provider and the resource consumer, both computing-facility participants in a resource exchange, each includes a local cloud-exchange instance which provides a cloud-exchange UI and which carries out client-side tasks in support of a resource exchange that is managed by the cloud-exchange system.

The resource-exchange process can be generally subdivided into three distinct phases: (1) a pre-auction phase; (2) an auction phase; and (3) a post-auction phase. The pre-auction phase includes association of buy policies with sets of virtual machines, virtual-machine activation, and generation and sending of an initiation-request message from a resource consumer to the cloud-exchange system. The auction phase includes generating an active search context, generating a set of initial candidate resource providers, requesting of bids from the candidate resource providers, scoring and queuing returned bids, selecting final candidate resource providers, and verifying a selected resource provider by the cloud-exchange system. The post-auction phase includes migrating the one or more virtual machines to the computing facility for the selected resource provider or building the one or more virtual machines within the computing facility, establishing seamless data-link-layer ("L2") virtual-private-network ("VPN") networking from buyer to seller, and monitoring virtual-machine execution in order to detect and handle virtual-machine-execution termination, including initiating a financial transaction for compensating the resource provider for hosting one or more virtual machines.

Figure 23A:
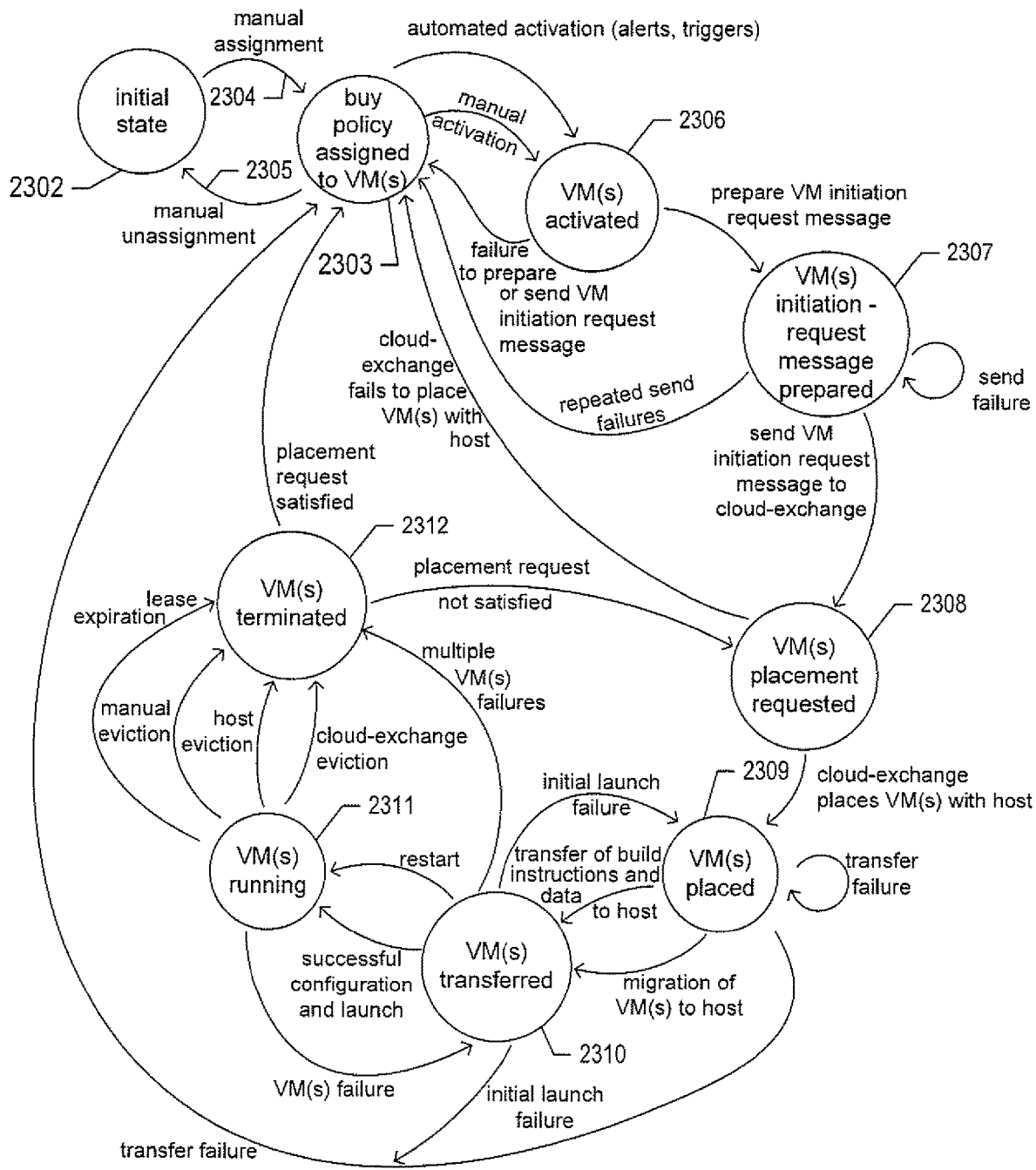
FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context.
Figure 23B:
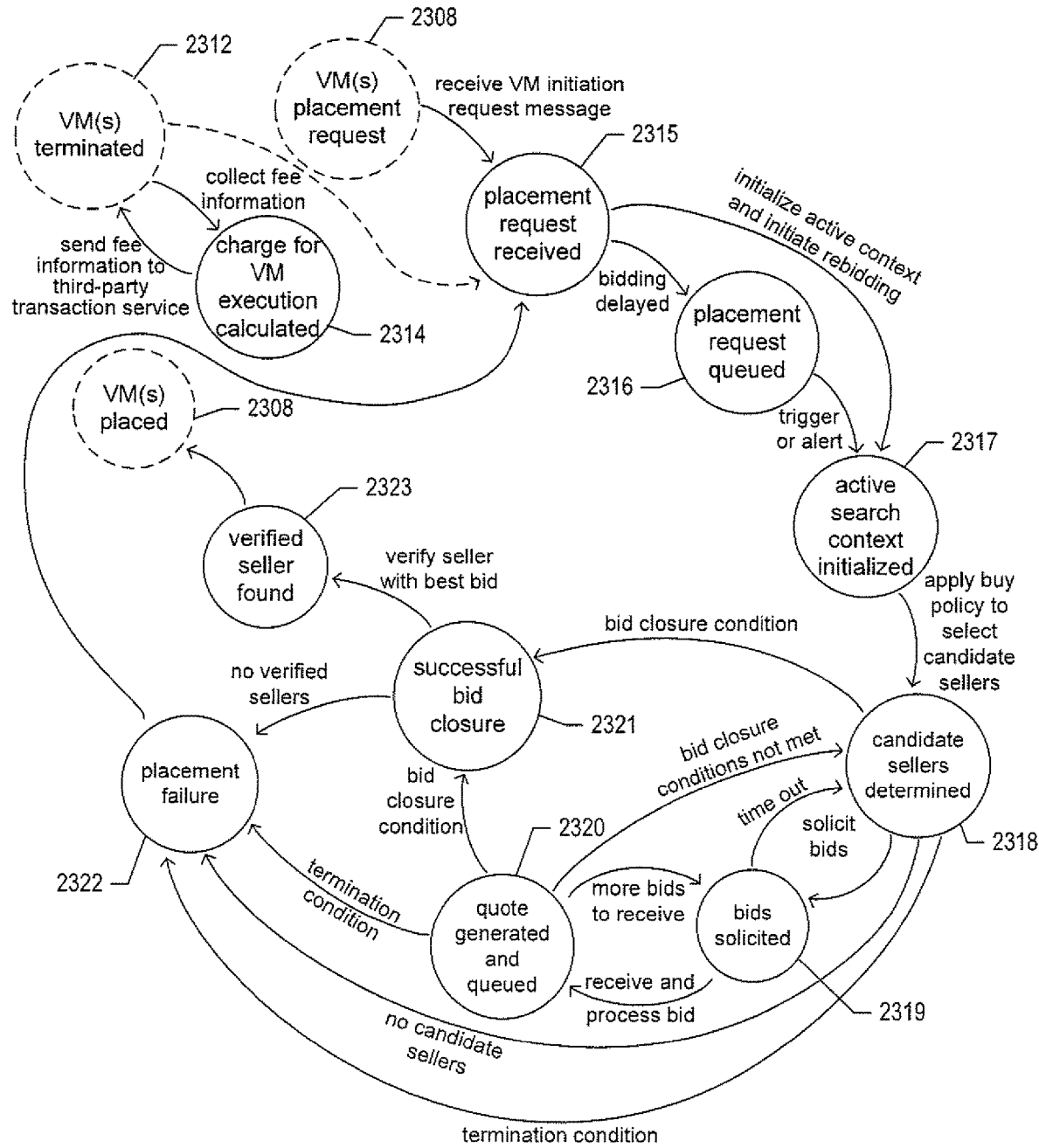
Figure 23C:
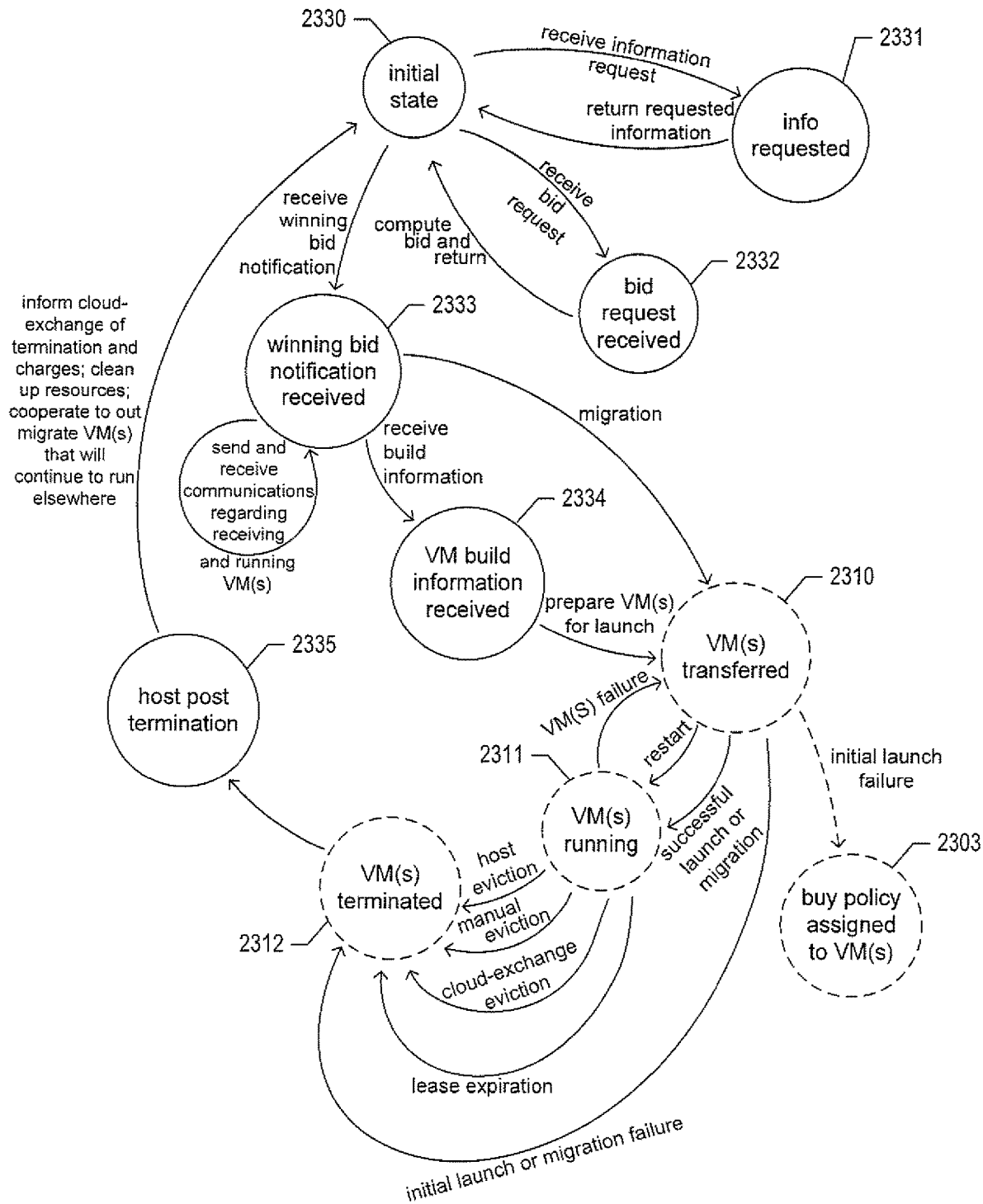

FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context. In FIGS. 23A-C, states are represented by labeled circles and state transitions are represented by curved arrows. A resource context, as discussed above, includes various types of stored information within the local cloud-exchange instances of resource consumers and resource providers as well as stored information within the cloud-exchange system. For much of the lifecycle of a resource exchange, an active search context stored within the cloud-exchange system is a significant component of the resource-exchange context. During all phases of the life cycle of the resource exchange, the current state of the resource exchange is continuously maintained within the resource-exchange context. The current state defines the remaining sequence of tasks that need to be completed by each of the participants in the resource exchange in order to successfully complete the resource exchange.

FIG. 23A a provides a resource-consumer-centric state-transition diagram for a particular resource exchange. The resource-exchange system is considered to be in an initial state 2302 preceding the resource exchange. In the initial state, many other resource exchanges may be in progress within the resource-exchange system. However, the currently discussed state-transition diagrams are intended to illustrate the lifecycle for a particular resource exchange independently from the many other resource exchanges and other events that may be concurrently and simultaneously occurring within the resource-exchange system. For simplicity of illustration, it is assumed that a particular resource exchange involves one or more virtual machines that execute together within a particular host. It is also possible for the virtual machines of a set of one or more virtual machines to be placed into two or more different hosts. However, in this case, each of the placements can be considered to be a separate resource exchange, with the process for each separate resource exchange generally described by the state-transition diagrams provided in FIGS. 23A-C.

The resource-exchange state transitions from the initial state to a buy-policy-assigned state 2303 as a result of manual assignment, by a system administrator or other employee of the organization managing a resource-consumer computing facility, of a buy-policy to one or more virtual machines. In certain implementations, this is carried out through a local cloud-exchange user interface. In one implementation, the virtual machines may be represented by icons that can be grouped together into folders or aggregations. Buy policies may be similarly represented by icons that can be dragged and dropped onto the folders or aggregations by mouse operations directed to the local user interface. The same user interface also allows a buy policy associated with a set of one or more virtual machines to be unassigned, resulting in transition from the buy-policy-assigned state 2303 back to the initial state 2302. These transitions are represented by curved arrows 2304-2305. In the following discussion, particular transitions between states are not numerically labeled, since the curved arrows representing transitions are annotated.

In the buy-policy-assigned state, a set of one or more virtual machines can be thought of as a potential resource exchange. An activation event promotes such potential resource exchanges to candidate-resource-exchange status, represented by the activated state 2306. Activation events generally fall into two broad categories of manual activation and automated activation. Manual activation involves interaction of a user with the UI provided by the local cloud-exchange instance within the resource-consumer computing facility or with a cloud-based UI containing virtual machine inventory data synchronized with the local cloud-exchange instance. Automated activation can occur due to alerts and triggers, electronic events that arise when certain additional events occur or when specified conditions arise within the resource-exchange system. The local cloud-exchange instance may be configured to generate, according to the buy-policy, alerts and/or triggers at specific points in time or when various different types of conditions obtain. As one example, an alert may be triggered when the available capacity for data storage or task execution within the computing facility falls below threshold levels. There are, of course, many different possible conditions or specifications that lead to automated triggers and alerts which, in turn, lead to activation of a buy-policy-assigned set of one or more virtual machines. Once a set of one or more virtual machines is activated, the local cloud-exchange instance prepares an initiation-request message for transmission to the cloud-exchange system, which is accompanied by a transition of the resource-exchange state to the initiation-request-message-prepared state 2307. The local cloud-exchange instance then sends the initiation-request message to the cloud-exchange system. When the initiation-request message is successfully sent, the state of the resource exchange transitions to the placement-requested state 2308. A failure to transmit the message returns the resource-exchange state to the initiation-request-message-prepared state, in which additional attempts to send the initiation-request message may be undertaken. After a sufficient number of failures, the resource-exchange state transitions back to the buy-policy-assigned state 2303, often with various types of error logging and error reporting to the local user interface. In alternative implementations, repeated send failures may result in a transition of the resource-exchange state back to the activated state 2306.

The next states in FIG. 23A, described below, are again shown in FIG. 23B. The transitions between these states involve process steps carried out primarily by the cloud-exchange system and a resource-provider system selected to host the set of one or more VMs. Nonetheless, the local cloud-exchange instance within the resource-consumer computing facility is aware of these state transitions, in many implementations.

The resource-exchange state transitions from the placement-requested state 2308 to the placed state 2309 once the cloud-exchange system places the one or more virtual machines with a selected host computing facility, or resource provider. Once the set of one or more virtual machines has been placed, a successful transfer of build instructions or a successful migration of the one or more virtual machines from the resource-consumer computing facility to the host results in a transition of the resource-exchange state to the transferred state 2310. However, a failure to transfer the build data or to migrate the set of one or more virtual machines results in a transition of the resource-exchange state to the buy-policy-assigned state 2303, in one implementation. In alternative implementations, transitions to other states are possible when, for example, the cloud-exchange system is able to recover from such transfer failures by placing the one or more virtual machines with another host. From the transferred state 2310, the resource-exchange state transitions to the running state 2311 when the one or more virtual machines are successfully configured and launched within the host system. Of course, during a hot migration, the configuration and launching step is merged with the migration step. Execution failure of the one or more virtual machines returns the resource-exchange state to the transferred state 2310. A successful launch of execution or re-start of execution of the one or more VMs returns the resource-exchange state to the running state 2311. Multiple execution failures may result in a transition from the transferred state to the terminated state 2312. In the running state 2311, the one or more virtual machines continue to execute until expiration of the current lease, the occurrence of a resource-consumer eviction, a host eviction, or a cloud-exchange eviction, or the occurrence of other types of execution-termination events. When the original placement request has not yet been satisfied, the resource-exchange state transitions from the terminated state back to the placement-requested state 2308 from which the cloud-exchange system can again place of the one or more virtual machines with a host for continued execution. When the initial placement request is satisfied, the resource-exchange state transitions back to the buy-policy-assigned state 2303.

FIG. 23B provides a cloud-exchange-system-centric resource-exchange state-transition diagram. This state-transition diagram includes three states already shown in FIG. 23A and discussed above. These three states are shown in with dashed circles rather than solid circles. When execution of the one or more virtual machines terminates, and the resource exchange is therefore currently in the terminated state 2312, the resource-exchange state briefly transitions to the charge-for-VM-execution-calculated state 2314 when the cloud-exchange system collects the information for the terminated execution of the one or more virtual machines and computes a charge for the terminated execution. The resource-exchange state transitions back to the terminated state 2312 once the cloud-exchange system sends the fee information and calculated fee to a third-party transaction service. The third-party transaction service carries out the financial transactions needed for transfer of the calculated fee from the resource consumer to the resource provider. There are many different types and modes for these transaction services. The calculated fees may be automatically withdrawn from deposit accounts, in certain cases, or the third-party transaction service may forward electronic or paper bills to the organization that manages the resource-and consumer computing facility. When an initiation-request message has been received by the cloud-exchange system, and the resource-exchange state is in the placement-requested state 2308, the resource-exchange state transitions to the placement-request-received state 2315. When initiation of an auction is delayed, according to the buy-policy associated with the set of one or more virtual machines or because of bandwidth limitations within the cloud-exchange system, the resource-exchange state transitions to the placement-request-queued state 2316. Otherwise, the resource-exchange state transitions to the active-context-initialized state 2317 when the cloud-exchange system uses the information transferred in the initiation-request message, along with information stored within the cloud-exchange system, to prepare an active search context for the placement request. The occurrence of a trigger or alert results in a transition from the placement-request-queued state 2316 to the active-search-context-initialized state 2317. The resource-exchange state transitions from the active-search-context-initialized state 2317 to the candidate-sellers-determined state 2318 when the cloud-exchange system applies buy-policy filters and other information to select an initial candidate set of resource providers. In certain cases, additional information may be solicited by the cloud-exchange system from resource providers to facilitate selection of the initial candidate resource-providers set. Once an initial set of candidate resource providers has been determined, the resource-exchange state transitions, in one implementation, to the bids-solicited state 2319 following transmission, by the cloud-exchange system, of bid solicitations to each of the initial candidate resource providers. When, after a reasonable period of time, one or more of the candidate resource providers has not responded to the bid solicitation, the resource-exchange state may transition back to the candidate-sellers-determined state 2318 in order for additional bid solicitations to be sent out by the cloud-exchange system to non-responding candidate resource providers. In the bids-solicited state 2319, the cloud-exchange system transitions to the quote-generated-and-queued state 2320 upon receiving and processing each bid before returning to the bids-solicited state 2319 to await further bids, when bids have not been received from all candidate resource providers. When the final bid has been received, and a quote generated and queued for the bid, and when bid-closure conditions have been met, the resource-exchange state transitions to the successful-bid-closure state 2321. When, however, one of various different types of termination conditions have instead arisen, the resource-exchange state transitions to the placement-failure state 2322. Otherwise, the resource-exchange state may transition back to the candidate-sellers-determined state 2318 for an immediate or a delayed subsequent round of bid solicitations. When no final candidate resource providers have been obtained following a maximum number of bid-solicitation attempts, or when one of many different types of termination conditions obtain, the resource-exchange state transitions from the candidate-sellers-determined state 2318 to the placement-failure state 2322. When a bid-closure condition obtains while the resource-exchange state is the candidate-sellers-determined state 2318, the resource-exchange state transitions to the successful-bid-closure state 2321. In a second, often more efficient implementation, the bids are generated by the cloud-exchange engine automatically, on behalf of the candidate resource-providers, in which case the bids-solicited state 2319 and the quote-generated-and-queued state 2320 are merged with the candidate-sellers-determined state 2318. In this second implementation, the cloud-exchange engine automatically bids on behalf of the identified candidate sellers and transitions to successful-bid-closure state 2321 or placement-failure state 2322. When the cloud-exchange system is able to successively verify one of the final candidate resource providers, the resource-exchange state transitions to the verified-seller-found state 2323. Otherwise, a transition to the placement-failure state 2322 occurs. From the verified-seller-found state 2323, the resource-exchange state transitions to the previously described placed state 2309. The resource-exchange state transitions from the placement-failure state 2322 to the previously described placement-request-received state 2315.

Of course, in each particular implementation of the resource-exchange system, there may be many additional states and state transitions. The currently described state-transition diagrams are intended to show those states and state transitions that are common to the reasonably large fraction of the various possible implementations of the resource-exchange system.

FIG. 23C provides a resource-provider-centric resource-exchange state-transition diagram. The resource provider is shown to inhabit an initial state 2330. When the resource provider receives an information request, the resource-exchange state transitions to the information-requested state 2331 and then returns back to the initial state when the requested information is returned to the cloud-exchange system. Similarly, when the resource provider system receives a bid request, the resource-exchange state transitions briefly to the bid-request-received state 2332 before returning to the initial state following a transmission of a computed bid request back to the cloud-exchange system. When the resource-provider system receives a winning-bid notification from the cloud-exchange System, the resource-exchange state transitions to the winning-bid-notification-received state 2333. In the winning-bid-notification-received state, the resource-provider computing facility exchanges communications with the cloud-exchange system and the local cloud-exchange instance within the resource consumer to coordinate the transfer of virtual-machine build information or migration of virtual machines to the resource provider. When the virtual machine is built by the resource provider, the resource-exchange state transitions to the build-information-received state 2334 and then to the previously described transferred state 2310 once the one or more virtual machines have been prepared for launch. The resource-exchange state transitions from the winning-bid-notification-received state 2333 to the transferred state 2310 directly when the one or more virtual machines are migrated to the resource provider. States 2310-2312 and 2303 are again shown in FIG. 23C, for completeness, but are not again described. Following termination of the execution of the one or more virtual machines, the resource-exchange state transitions to the host-post-termination state 2335. In the host-post-termination state, the resource provider exchanges communications with the cloud-exchange system to inform the cloud-exchange system of the execution termination and of the accrued fees for hosting the one or more virtual machines, cooperates with other entities to migrate the one or more virtual machines to another computing facility, in the case that the one or more virtual machines will continue to execute following lease termination or eviction, and cleans up local resources allocated for executing the one or more virtual machines within the resource-provider computing facility. The transition to the host-post-termination state may be initiated by a cloud-exchange lease-expiration scheduler which continuously monitors active resource exchanges to detect lease terminations.

Note that the resource-exchange state is generally a combination of two or more of the states, discussed above with reference to FIGS. 23A-C, each inhabited by one or more of the resource consumer, the cloud-exchange system, and one or more resource providers. For example, the resource-exchange state may temporarily be a combination of the host-post-termination state 2335, the placement-request-receive state 2315, and the buy-policy-assigned state 2303. Note also that certain of the operations performed to affect state transitions may vary, depending on the history of state transitions for a particular resource exchange. As one example, an active search context needs only to be allocated the first time a resource exchange transitions from the placement-request-receive state 2315 to the active-search-context-initialize state 2317.

Security Methods and Subsystems

Figure 24A:
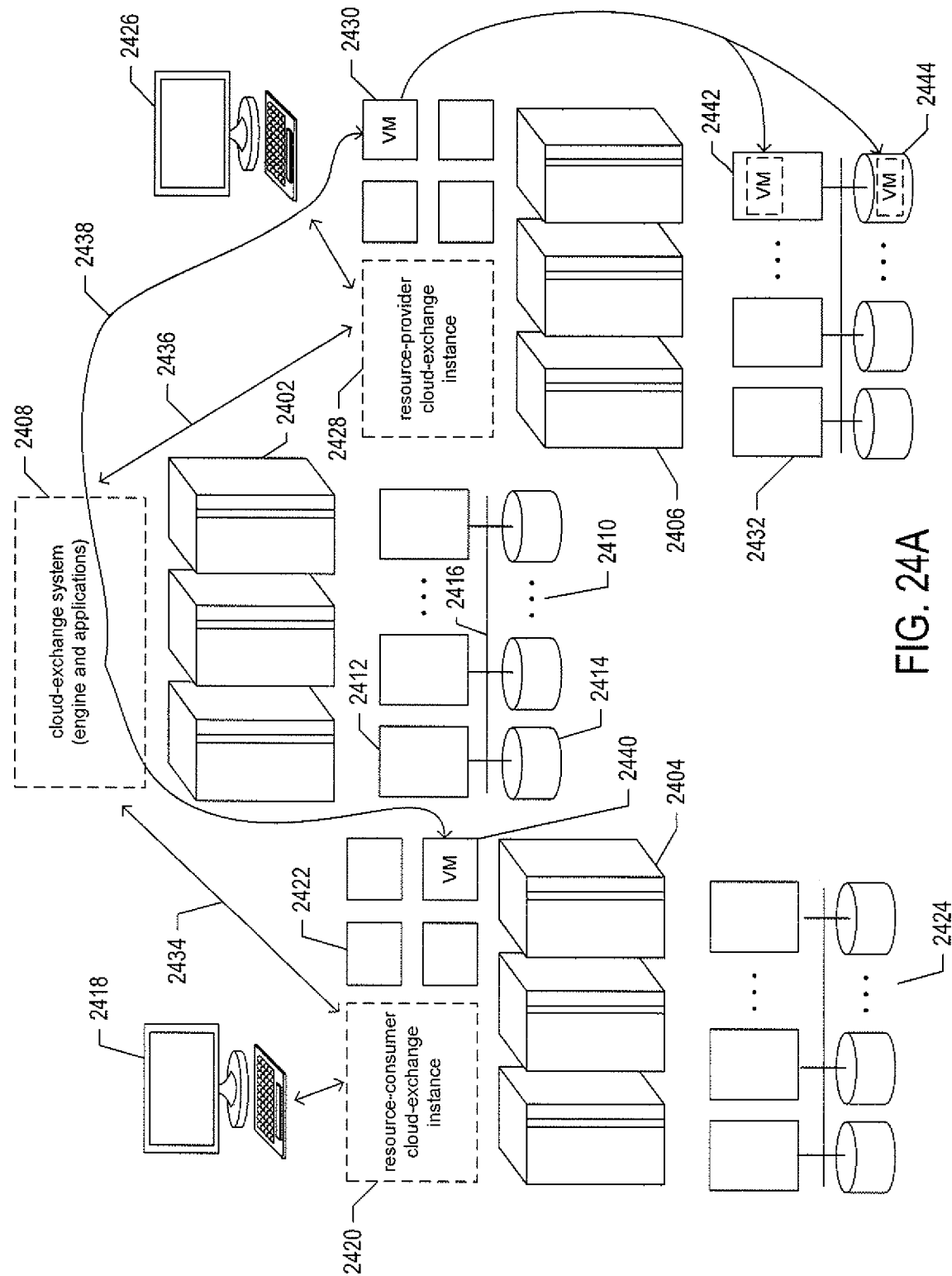
FIGS. 24A-B illustrate various types of security concerns within the resource-exchange system discussed above in preceding subsections.
Figure 24B:
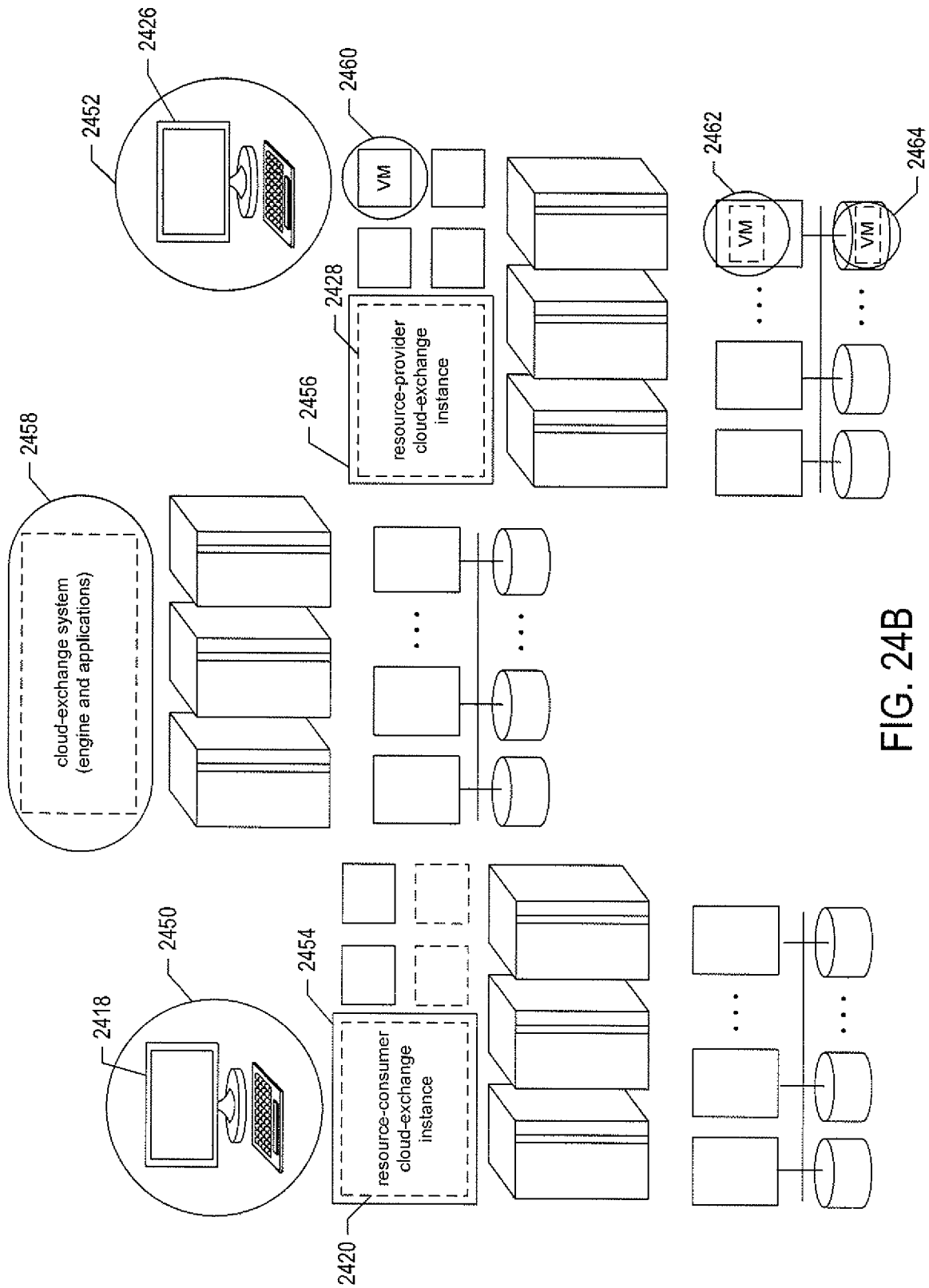

FIGS. 24A-B illustrate various types of security concerns within the resource-exchange system discussed above in preceding subsections. FIG. 24A shows the cloud-exchange system 2402, a resource-consumer resource-exchange-system participant 2404, and a resource-provider resource-exchange-system participant 2406. The cloud-exchange system includes the cloud-exchange engine and additional cloud-exchange applications 2408 as well as underlying hardware 2410 represented as multiple servers, such as server 2412, multiple data-storage appliances, such as data-storage appliance 2414, and communications networks 2416. The resource-consumer resource-exchange-system participant 2404 includes an administration console 2418, a resource-consumer cloud-exchange instance 2420, multiple virtual machines, such as virtual machine 2422, which the resource-consumer resource-exchange-system participant wishes to export to a resource-provider resource-exchange-system participant for remote hosting, and underlying hardware 2424. The resource-provider resource-exchange-system participant 2406 includes an administration console 2426, a resource-provider cloud-exchange instance 2428, multiple virtual machines received from resource-consumer resource-exchange-system participants for hosting, including virtual machine 2430, and underlying hardware 2432. As discussed above, the resource-consumer cloud-exchange instance 2420 communicates 2434 with the cloud-exchange system in order to transmit general information to the cloud-exchange system, during a registration process, as well as to transmit to the cloud-exchange system buyer policies and hosting requests. Similarly, the resource-provider cloud-exchange instance 2428 communicates 2436 with the cloud-exchange system to provide information to the cloud-exchange system during a registration process, to receive hosting requests, and to transmit bids for hosting computational entities described in the hosting requests to the cloud-exchange system. System administrators access administration services provided by the cloud-exchange instances 2420 and 2428 through the administrative consoles 2418 and 2426, respectively. As indicated by curved arrow 2438, once the cloud-exchange system has successfully auctioned a virtual machine or other computational entity for remote hosting, the virtual machine or other computational resource, such as virtual machine 2440, is transferred under cloud-exchange-system control from the resource-consumer resource-exchange-system participant to the resource-provider resource-exchange-system participant, which transfers the virtual machine to particular components 2442 and 2444 for execution. Although, as discussed above, the resource-exchange system features many additional types of services and operations, the services, operations, and communications illustrated in FIG. 2480 provide a context for discussing the general security concerns within the resource-exchange system.

FIG. 24B illustrates particular areas of security concerns in the resource-exchange system. A first area of concern is the need to control access to the services provided by the participant cloud-exchange instances through the administration consoles 2418 and 2406. These concerns are represented by circles 2450 and 2452. Of course, uncontrolled access to cloud-exchange-instance-provided services could easily deleteriously effect both resource-exchange-system participants and the cloud-exchange system. For example, were an unauthorized user to offer large amounts of computational resources to the cloud-exchange system through resource-provider cloud-exchange-instance services and interfaces accessed through administration console 2406, a resource-provider resource-exchange-system participant could end up with insufficient local resources for supporting local computational entities and internal functionalities. Furthermore, unauthorized personnel might be able to view sensitive and confidential information that would allow the unauthorized personnel to compromise an organization that owns or manages a resource-exchange-system participant and to interfere with operations of both hosted and native computational entities.

Another area of concern, represented by rectangles 2454 and 2456, is the confidential data maintained by the cloud-exchange instances 2420 and 2428. This data needs to be protected from access by unauthorized remote systems and remote-system users and must also be protected from access during transmission to the cloud-exchange system via electronic communications. Oval 2458 represents an additional security concern with respect to data stored within and used by the cloud-exchange system. Much of this data, including buy policies, other resource-exchange-system-participant data, and data associated with the distributed-search subsystems of the cloud-exchange engine, is provided to the cloud-exchange system by resource-exchange-system participants with the understanding of the data will be securely managed and protected from inadvertent or malicious access by entities other than the cloud-exchange system, both within the computational facility that hosts the cloud-exchange system as well as within remote computing facilities and systems.

Circle 2460 represents yet an additional security concern. A resource-consumer resource-exchange-system participant generally wishes to maintain a computational entity transferred to a resource-provider resource-exchange-system participant for remote hosting in a fully secure encapsulation within the resource-provider computing facility. In general, a resource-consumer resource-exchange-system participant does not wish for the data and the executables and interfaces of a remotely hosted virtual machine, for example, to be accessible to the hosting resource-provider resource-exchange-system participant. This security concern includes unauthorized access to virtual-machine data during initial transfer of the virtual machine to a resource-provider resource-exchange-system participant, unauthorized access the virtual machine as it is internally transferred to a server and launched on the server 2462, unauthorized access to data locally stored on behalf of the hosted virtual 2464 during hosting, access to and data remaining within the resource-provider computing facility following lease termination, and any data exchanges between the virtual machine and other computational entities, both within the resource-provider computing facility as well as within remote computing facilities and computer systems. A resource-provider resource-exchange-system participant also generally has security concerns with regard to the computational entities hosted by the resource-provider participant, including concerns with regard to interference with, and access to, local or native computational entities, with resource-provider computational-facility computational resources, and, potentially, with external computational facilities and computer systems. Thus, because the currently disclosed resource-exchange system is a complex system with many geographically distributed participants, and because resource-exchange-system participants in the cloud-exchange system are generally interconnected through electronic communications with enormous numbers of remote computing facilities and computer systems, security concerns abound.

Figure 25:
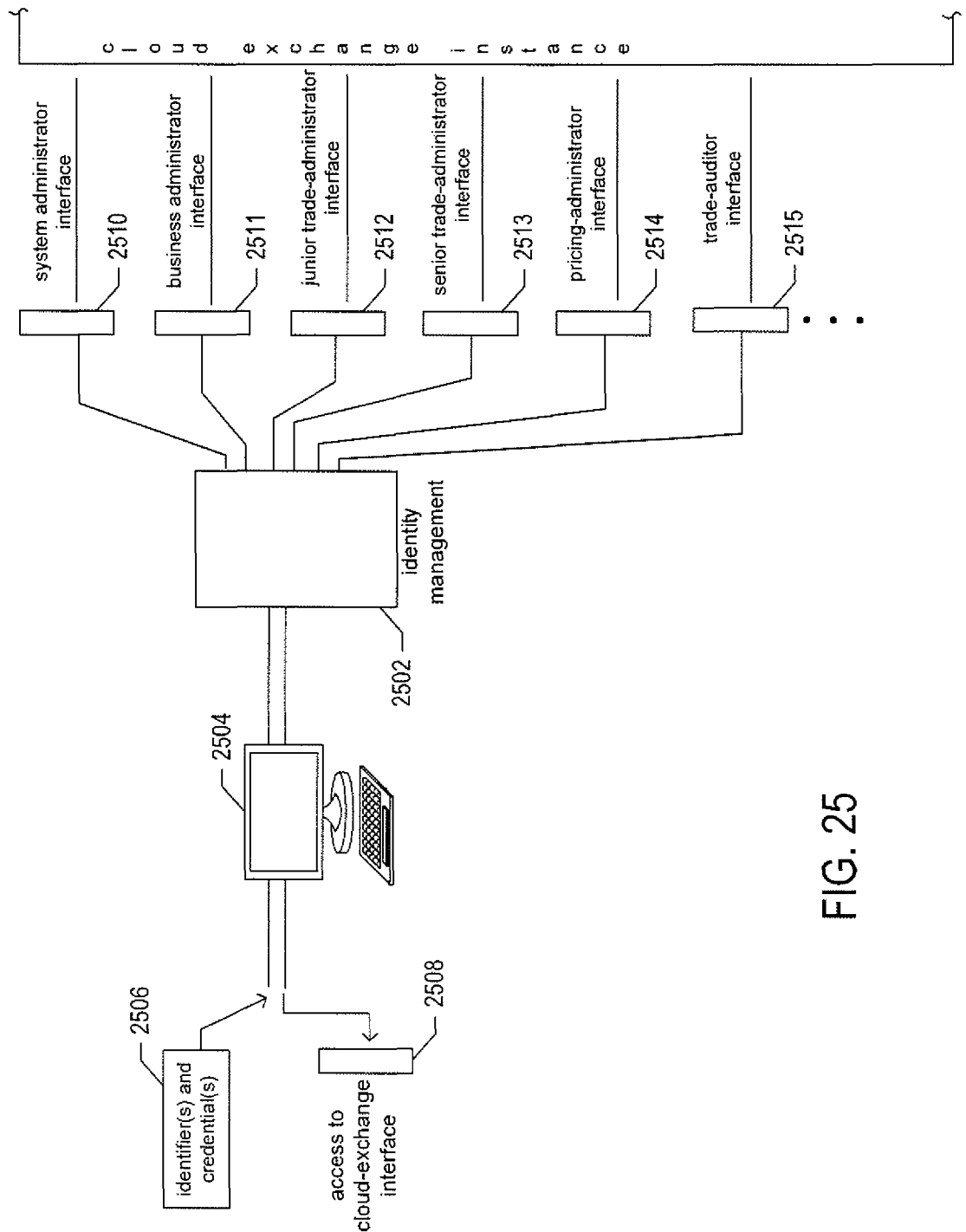
FIG. 25 illustrates a first security method and subsystem incorporated into the resource-exchange system.

FIG. 25 illustrates a first security method and subsystem incorporated into the resource-exchange system to address the security concerns represented by circles 2450 and 2452 in FIG. 24B. As shown in FIG. 25, each cloud-exchange instance includes an identity-management subsystem 2502 that controls access through the administration console 2504, or through any other electronic device with which users access the cloud-exchange instance within a resource-exchange-system participant, to services and interfaces provided by the cloud-exchange instance. A user supplies one or more identifiers and/or credentials 2506 to the identity-management subsystem 2502. When the identity-management subsystem verifies the supplied identifiers and credentials, the identity-management subsystem provides an identified and authorized user with access to one or more cloud-exchange-instance interfaces 2508. These interfaces 2510-2515 represent collections of services accessible to particular predefined roles that a user may assume, with the identifiers and credentials 2506 supplied by user used by the identity-management subsystem to which roles the user is authorized to assume.

A first role is that of the system administrator, corresponding to the system-administrator interface 2510. A system administrator carries out the initial registration of a resource-exchange-system participant with the cloud-exchange system. The system administrator also carries out ongoing monitoring of various participation parameters established through registration and may, from time to time, modify the values of these parameters.

A second role is that of the business administrator, corresponding to the business-administrator interface 2511. A business administrator enters sensitive financial information, such as bank account information, tax-related information, and other such sensitive information to the cloud-exchange system.

A third role is out of the junior trade administrator, corresponding to the junior-trade-administrator interface 2512. A junior trade administrator creates buy policies and assigns buy policies to groups of virtual machines. In general, the junior trade administrator does not have authorization to activate buy policies or carry out other operations that would result in financial exchanges and computational-resource commitments.

A fourth role is that of the senior trade administrator, corresponding to senior-trade-administrator interface 2513. A senior trade administrator activates trade policies on behalf of a resource-exchange-system participant and may carry out other tasks associated with managing resource trades.

A fifth role is that of the pricing administrator, corresponding to the pricing-administrator interface 2514. A pricing administrator is authorized to set and modify pricing parameters associated with resource-provider resources that are made available for hosting virtual machines and other computational entities through the resource-exchange system.

A sixth role is out of the trade auditor, corresponding to the trade-auditor interface 2515. The trade auditor accesses trade-history information and trade-transactions reports, including financial transactions and exchanges carried out through the cloud-exchange system, in order to carry out various types of auditing, tax planning, and report preparation.

Any particular implementation of the resource-exchange system may support many additional roles. The identity-management subsystem manages role definitions, identifiers and credentials, and serves both to authorize users as well as to restrict users to particular roles and therefore provides access only to particular interfaces of the cloud-exchange instance to a given user. Even were a user able to fraudulently obtain initial authorization for access, the user would be restricted to accessing only a subset of the services provided by the cloud-exchange instance, thus limiting the potential damage that the fraudulent user could cause. Authorization for a user to assumer different roles involves supplying a different set credentials for each role. Of course, the identity-management system generally employs passwords, biometrics, and other techniques to provide near certain identification of users prior to allowing users access to any service provided by the cloud-exchange instance.

Figure 26A:
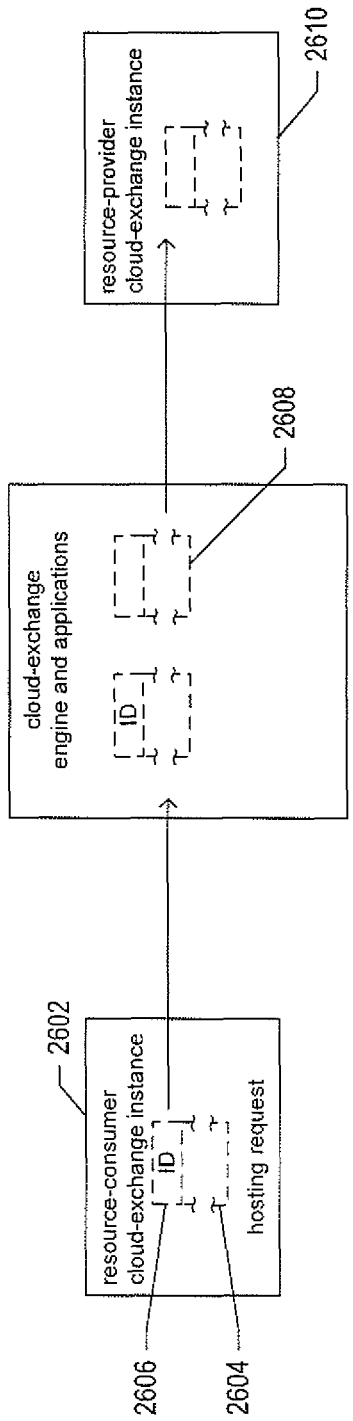
FIGS. 26A-B illustrate security methods related to the security concerns represented by rectangles 2454 and 2456 in FIG. 24B.
Figure 26B:
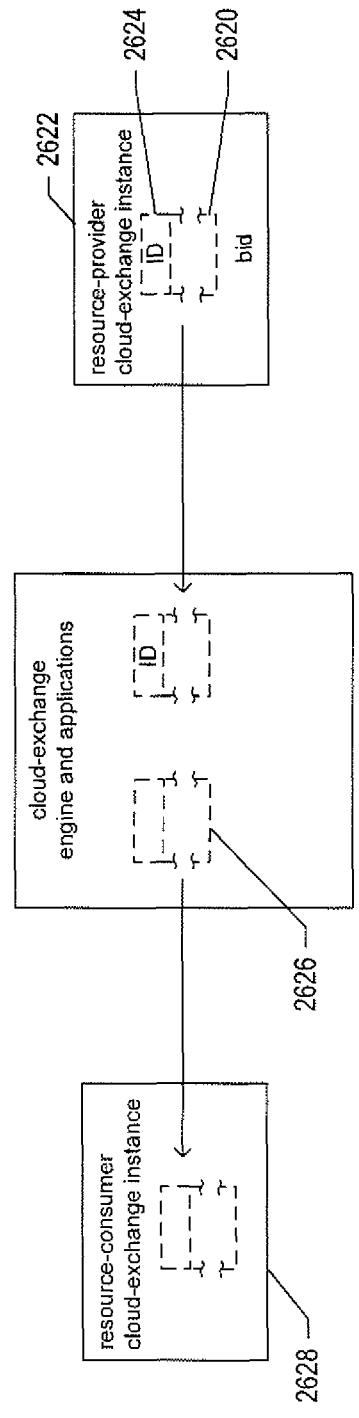

FIGS. 26A-B illustrate security methods related to the security concerns represented by rectangles 2454 and 2456 in FIG. 24B. Part of the security issues with respect to resource-exchange-system-participant information and data concerns exposure of resource-consumer-participant and resource-provider-participant identities during cloud-exchange-mediated resource exchanges. As shown in FIG. 26A, the cloud-exchange system can, according to specified participation parameters, maintain the identity of resource-consumer resource-exchange-system participants in confidence. When the resource-consumer participant 2602 creates and transmits a hosting request 2604 to the cloud-exchange system, the hosting request contains resource-consumer-participant identifying information 2606. However, the cloud-exchange system, when desired by the resource open consumer participant, omits such identifying information in corresponding bid-request messages 2608 transmitted to resource-provider participants 2610 during the distributed-search process. In these cases, the resource-provider resource-exchange-system participants are unaware of the identity of the resource-consumer resource-exchange-participant hosting requester. There are a variety of reasons why a resource-consumer participant may wish to not reveal its identity during resource exchanges. When a resource-consumer participant's identity is revealed to candidate resource-provider participants, the resource-consumer-participant's remotely hosted computational entities may be more vulnerable to security risks. Furthermore, a resource-consumer participant may not wish resource-provider participants to filter hosting requests on an identity basis. However, certain resource-provider resource-exchange-system participants may desire to receive identification information for hosting requesters. For example, a resource-provider resource-exchange-system participant which significantly depends on revenues generated by hosting computational entities through the cloud-exchange system may desire such information for advertising purposes. As another example, resource-provider resource-exchange-system participants may wish to ensure that they do not end up hosting computational entities on behalf of direct competitors or unsavory organizations, for various security-concern reasons. The cloud-exchange system honors participation parameters requiring that the identities of resource-consumer participants not be exposed during resource exchanges, but provides many ways for resource-provider resource-exchange-system participants to reject or discourage hosting requests transmitted by the cloud-exchange system on behalf of anonymous resource-consumer participants. A resource-provider participant may design hosting policies, communicated to the cloud-exchange system, that include filters to exempt itself from bidding on hosting requests submitted by anonymous resource-consumer participants. Similarly, a resource-provider participant may offer pricing discounts for resource-consumer participants that submit hosting requests containing identifying information in order to encourage hosting requests that identify the requesting participants.

As shown in FIG. 26B, the cloud-exchange system may similarly remove resource-provider-participant-identifying information from bids forwarded to resource-consumer participants requesting remote hosting of computational entities. As shown in FIG. 26B, a bid request 2620 created within a resource-provider resource-exchange-system participant 2622 and transmitted to the cloud-exchange system in response to a hosting request received during the auction process generally includes identifying information 2624 that identifies the resource-provider participant. When directed by participant-parameter values sent by the resource-provider resource-exchange-system participants, the identifying information is removed from bids forwarded by the cloud-exchange system 2626 to resource-consumer resource-exchange-system hosting requesters 2628. There are many reasons why a resource-provider resource-exchange-system participant may wish to not reveal its identity during resource exchanges. A resource-consumer resource-exchange-system participant may set parameter values in buy policies to filter out anonymous resource-provider participants from consideration for hosting its computational entities and a resource-exchange-system participant may also specify, in its seller policy, a willingness to pay higher hosting fees to resource-provider resource-exchange-system participants which reveal their identities when bidding on hosting requests.

Figure 27A:
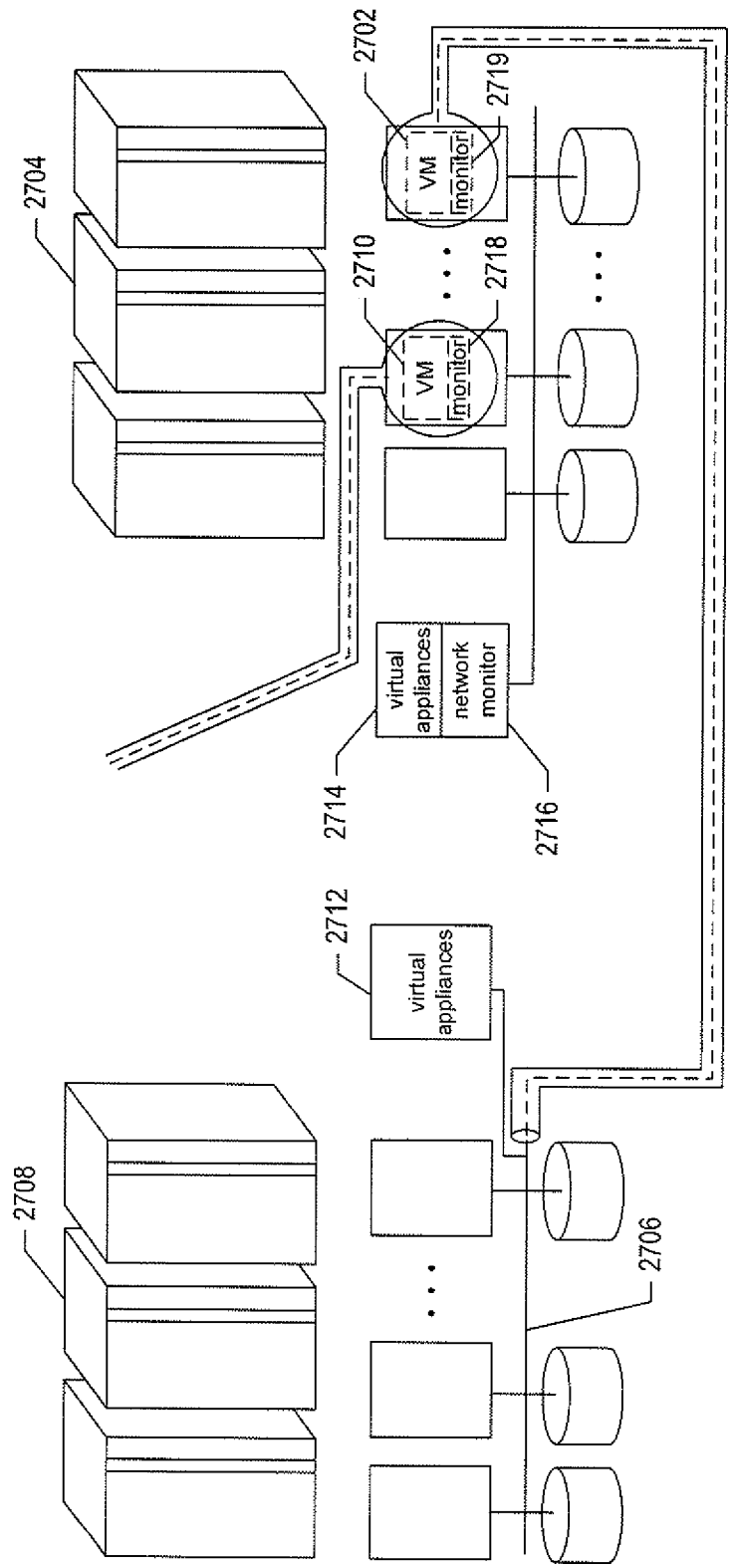
FIGS. 27A-C illustrate security methods and subsystems that address certain of the security concerns illustrated in FIG. 24B with circles 2460 and 2462 as well as additional security concerns.
Figure 27B:
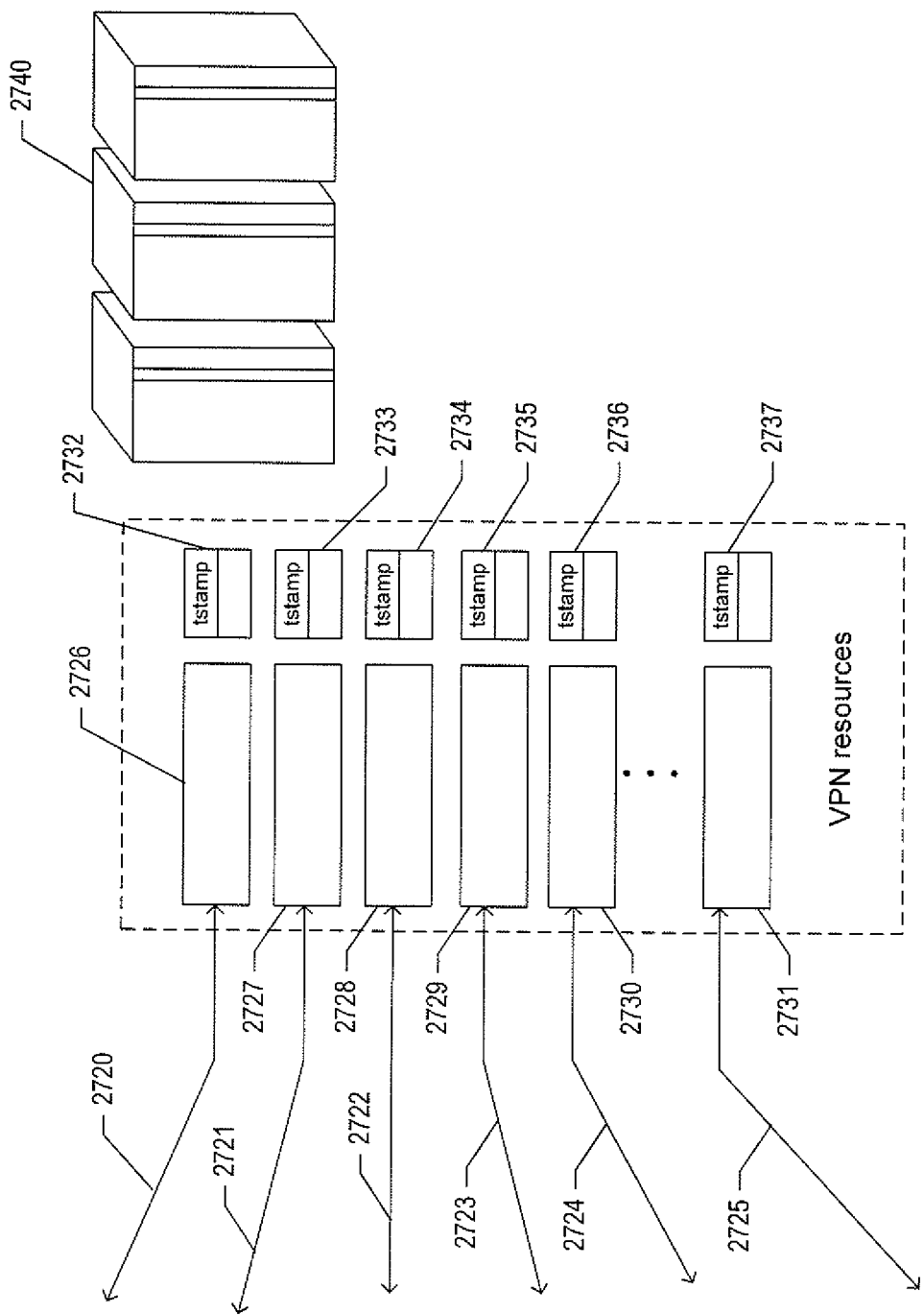
Figure 27C:
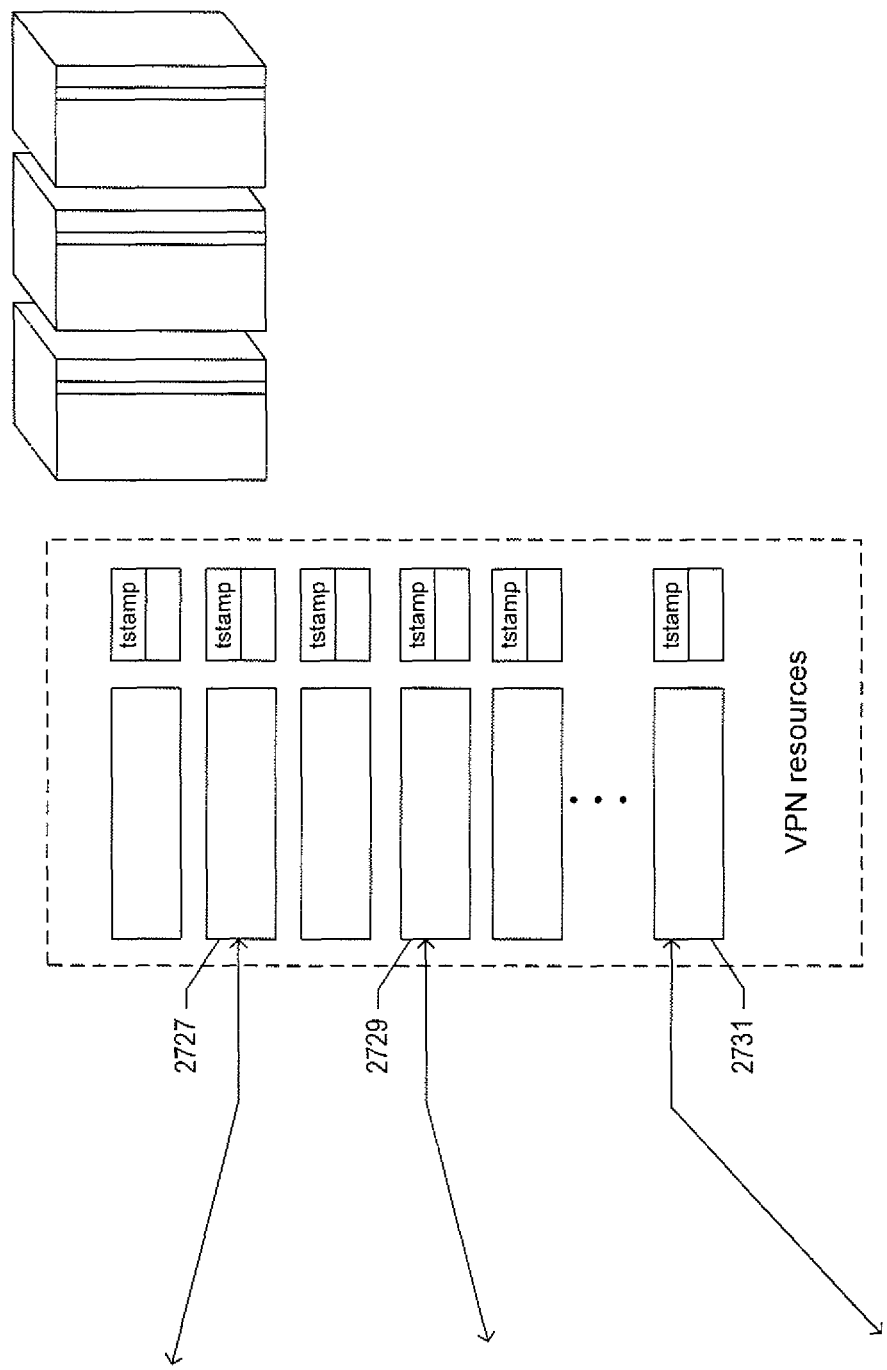

FIGS. 27A-C illustrate security methods and subsystems that address certain of the security concerns illustrated in FIG. 24B with circles 2460 and 2462 as well as additional security concerns. As shown in FIG. 27A, when a virtual machine 2702 is hosted by a resource-provider resource-exchange-system participant 2704, the cloud-exchange system coordinates with the resource-consumer resource-exchange-system for which the virtual machine is being hosted and the hosting resource-provider resource-exchange system to extend an internal communications network 2706 within the resource-consumer resource-exchange-system participant 2708 to interconnect the hosted virtual machine 2702 with the internal resource-consumer-participant network 2706. In essence, this network-stretching or network-extension technology allows the hosted virtual machine to execute as if its IP addresses and other network-connectivity parameters were unchanged with respect to the IP addresses and other network-connectivity that the virtual machine would employ were the virtual machine to execute within the resource-consumer computing facility. Not only does the network-stretching technology vastly simplify migration of a virtual machine from the resource-consumer participant to the resource-provider participant, the network-stretching technology allows for isolation of the hosted virtual machine from other hosted virtual machines within the resource-provider computing facility as well as from the local virtual machines within the resource-provider computing facility. Strict networking isolation of hosted virtual machines removes many potential security concerns associated with remotely hosted virtual machines. As shown in FIG. 27A, a second hosted virtual machine 2710 transferred from a different resource-consumer participant executes within an extended network separate and distinct from that in which the first virtual machine 2702 executes. In both cases, the hosted virtual machines are isolated, with respect to network communications, from other virtual machines and computational entities executing within the resource-provider computing facility. The network-stretching technology involves a number of virtual appliances 2712 and 2714 in both the resource-consumer computing facility and in the resource-provider computing facility. The virtual appliances include, in one implementation, a hybrid cloud manager ("HCM"), cloud-Gateway ("CTW") virtual appliances, and L2 concentrator appliances. In addition, the network-stretching technology involves allocation, by the resource-provider computing system, of IP addresses to the cloud-exchange system for setting up the virtual private networks ("VPNs") used as a basis for network stretching. In certain implementations, the cloud-exchange system mediates the use of VPN tunnels for layer-3 and layer-2 network traffic that employ UDP wrapped protocols.

In addition to network-communications isolation of hosted virtual machines via network-stretching technology, the cloud-exchange system can incorporate various levels of monitoring to detect and stop deleterious network activity. In one implementation, a network monitor 2716 is incorporated into one or more of the virtual appliances that implement network stretching as well as in individual hosted virtual machines 2718-2719. Network monitor 2716 enforces bandwidth limits on outbound traffic for hosted virtual machines and monitors communications traffic on network-stretching-implementing VPNs in order to identify potentially malicious network behavior, such as launching of a denial-of-the-service attack. The network monitor cooperates with virtualization-layer functionality in a secure fashion that is not susceptible to hijacking by remote computational entities or by application-level or operating-system-level routines and programs within the resource-provider computing facility. Monitors 2718-2719 may provide generalized malware-detection services that also operate at the virtualization-layer level to protect virtual machines from various types of malicious agents and malicious access. Upon detection of malware within a hosted virtual machine, the cloud-exchange system undertakes various ameliorative measures to quarantine or suspend hosted-virtual-machine execution. Both the network monitor 2716 and the virtual-machine-resident monitors 2718-2719 may be selectively included within virtual networking appliances and virtual machines, in certain implementations, based on participant-parameter values incorporated into participant policies, with higher levels of security factored into hosting prices.

FIGS. 27B-C illustrate use of network-stretching resources within the resource-provider resource-exchange-system participants. As discussed above, the resources associated with network stretching include instantiated virtual appliances and IP addresses. In many cases, the number of incoming stretched networks to a resource-provider computing facility is limited by the number of IP addresses allocated by the resource-provider participant to the cloud-exchange system. As shown in FIG. 27B, the finite maximum number of incoming stretched networks 2720-2725 are each associated with a corresponding set of network-stretching resources 2726-2731. Each of these sets of network-stretching resources is, in turn, associated with a timestamp and other usage information 2732-2737. When, as shown in FIG. 27B, a maximum number of incoming stretched networks are currently active, the resource-provider computing facility 2740 cannot accept computational entities for hosting from resource-consumer resource-exchange-system participants other than those associated with the active incoming stretched networks. However, as shown in FIG. 27C, when only a subset of the network-stretching resource sets (2727, 2729, and 2731) are active, a hosting request from a resource-consumer participant not associated with the active incoming stretched networks can be accepted. When a hosting request is received from a resource-consumer participant for which one of the inactive network-stretching resource sets was configured, the inactive network-stretching resource set is reactivated to accommodate the hosting request and hosting of a computational entity represented by the hosting request. When the hosting request is received from a resource-consumer participant for which none of the inactive network-stretching resource sets were previously configured, the cloud-exchange instance within the resource-provider computing facility selects an inactive network-stretching resource set with a least recently updated usage timestamp for replacement by a newly instantiated network-stretching-resource set to extend a network within the resource-consumer participant to the resource-provider computing facility. Thus, the resource sets associated with incoming active or inactive stretched networks are maintained in a network-stretching-resource pool, with currently unused network-stretching resource sets maintained in inactive states and reconfigured, as needed, to support a maximum number of active incoming stretched networks. This avoids significant temporal and computational costs associated with completely tearing down and rebuilding virtual appliances and other network-stretching resources for each newly received hosting request from a resource-consumer resource-exchange-system participant not currently associated with an active set of network-stretching resources.

Figure 28:
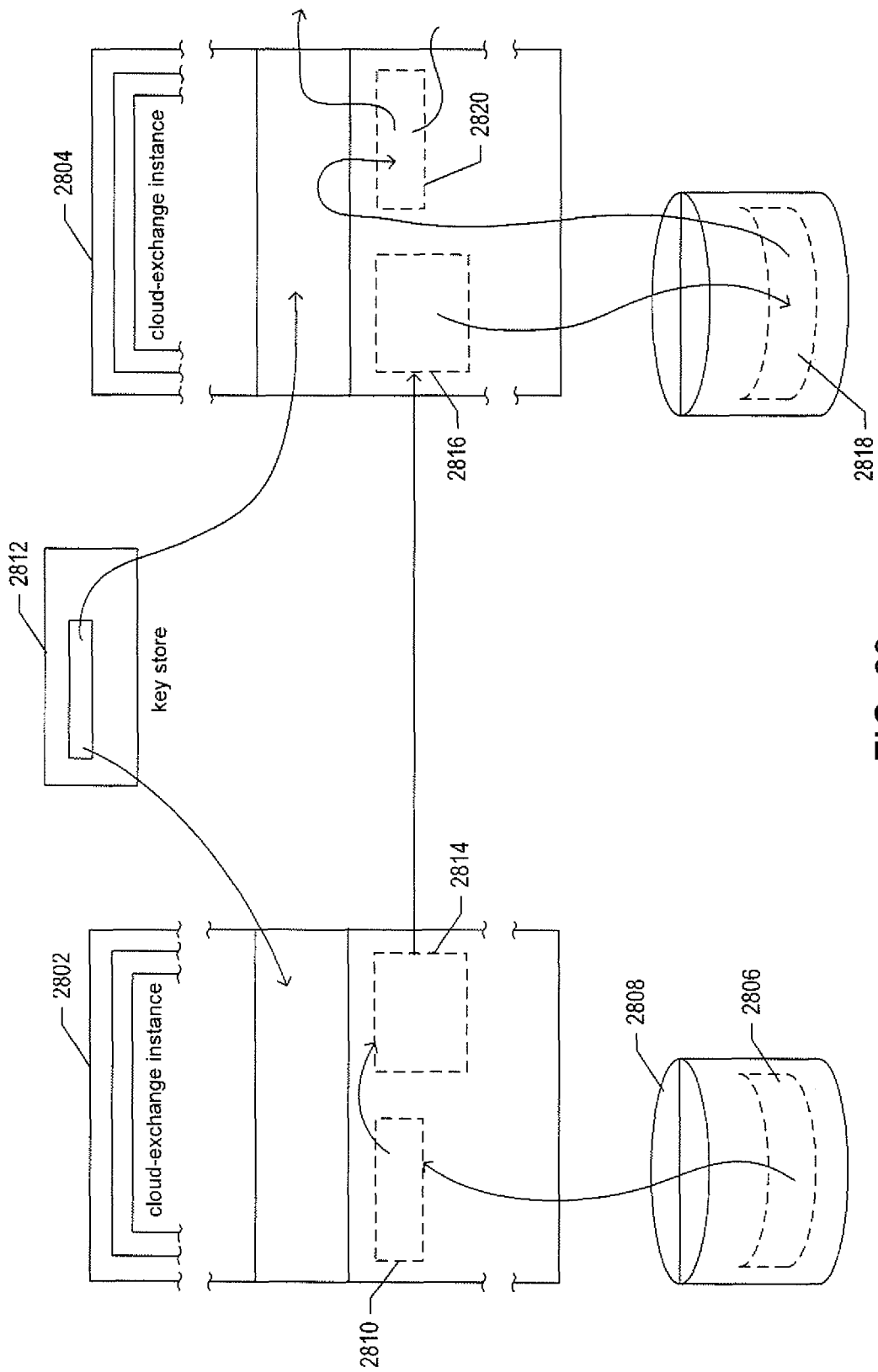
FIG. 28 illustrates a data-security method and subsystem used in the resource-exchange system to address data-security issues discussed above with reference to FIG. 24B.

FIG. 28 illustrates a data-security method and subsystem used in the resource-exchange system to address data-security issues discussed above with reference to FIG. 24B. As discussed above, data-security issues in the resource-exchange system include securing data received from resource-exchange-system participants and stored by the cloud-exchange system as well as securing data generated and maintained by hosted virtual machines within resource-provider computing facilities. Numerous different discrete data-security techniques are employed by the resource-exchange system. The basis for these discrete data-security techniques is using secure data encryption and securely-stored encryption keys to prevent unauthorized access to data. FIG. 28 provides one example method representative of these data-security techniques. In FIG. 28, a virtual machine, including a virtual desk, is transferred from a resource-consumer computing system 2802 to a resource-provider computer system 2804 as one or more files. The file or files that contain a data representation of the virtual-machine 2806 are read from a mass-storage device 2808 into memory 2810 of a resource-consumer computer system. The cloud-exchange instance within the resource-consumer computing facility accesses a secure key store 2812 to obtain an encryption key associated with the resource-consumer participant that is used to encrypt the data representation of the virtual machine 2814 for transfer to the resource-provider computer system. In general, the encryption occurs block-by-block as portions of the virtual-machine image are prepared for transmission to the resource-provider computer system. The resource-provider computer system receives encrypted portions of the virtual-machine image 2816 and stores them in one or more mass-storage devices 2818. When the virtual machine is then transferred to a computer system within the resource-provider computing facility for execution, the data representation of the virtual-machine is read from the mass-storage device and the cloud-exchange instance accesses the encryption key from the key store 2812 to decrypt portions of the virtual-machine image 2020, as needed, to facilitate tasks related to launching of the virtual machine. However, unencrypted data associated with the virtual-machine image is not stored on disk and is not transmitted in communications messages. Furthermore, the encryption key or encryption keys employed for encrypting and decrypting the data representation of the virtual-machine are not stored on disk or transmitted in unencrypted forms through communications media. The encryption keys are accessed, during virtual-machine migration, only by the cloud-exchange instances and by disk-encryption and disk-decryption services implemented at the virtualization-layer or level. The fact that hosted-virtual-machine data is not stored on mass-storage devices or sent in communications messages in clear form, along with the network isolation of hosted virtual machines and other security features used by the resource-exchange system, ensures that data associated with hosted virtual machines cannot be accessed by remote computer systems and cannot be accessed by computational entities executing within the resource-provider computing facility. Similar data-security techniques are employed to secure data transferred to the cloud-exchange system by cloud-exchange instances within resource-exchange-system participants. Only currently needed data appears in clear form within memory, and data encryption and data decryption are carried out at the virtualization-layer or level. Encryption keys used for this process may be securely stored in third-party repositories or within the resource-exchange-system participants and are accessed and transferred only in encrypted form by the cloud-exchange system for use at the virtualization-layer or level by encryption-based data-security methods.

Of course, all electronic communications between resource-exchange-system participants and between resource-exchange-system participants in the cloud-exchange system are secured both by multiple levels of encryption. In many implementations, the cloud-exchange system and the local cloud-exchange instances are additionally interconnected by secure VPN tunnels to ensure network isolation and to minimize any security concerns related to data transfer among resource-exchange-system components. Information exchange other than through secure VPN tunnels uses secure-data-transmission protocols.

Figure 29:
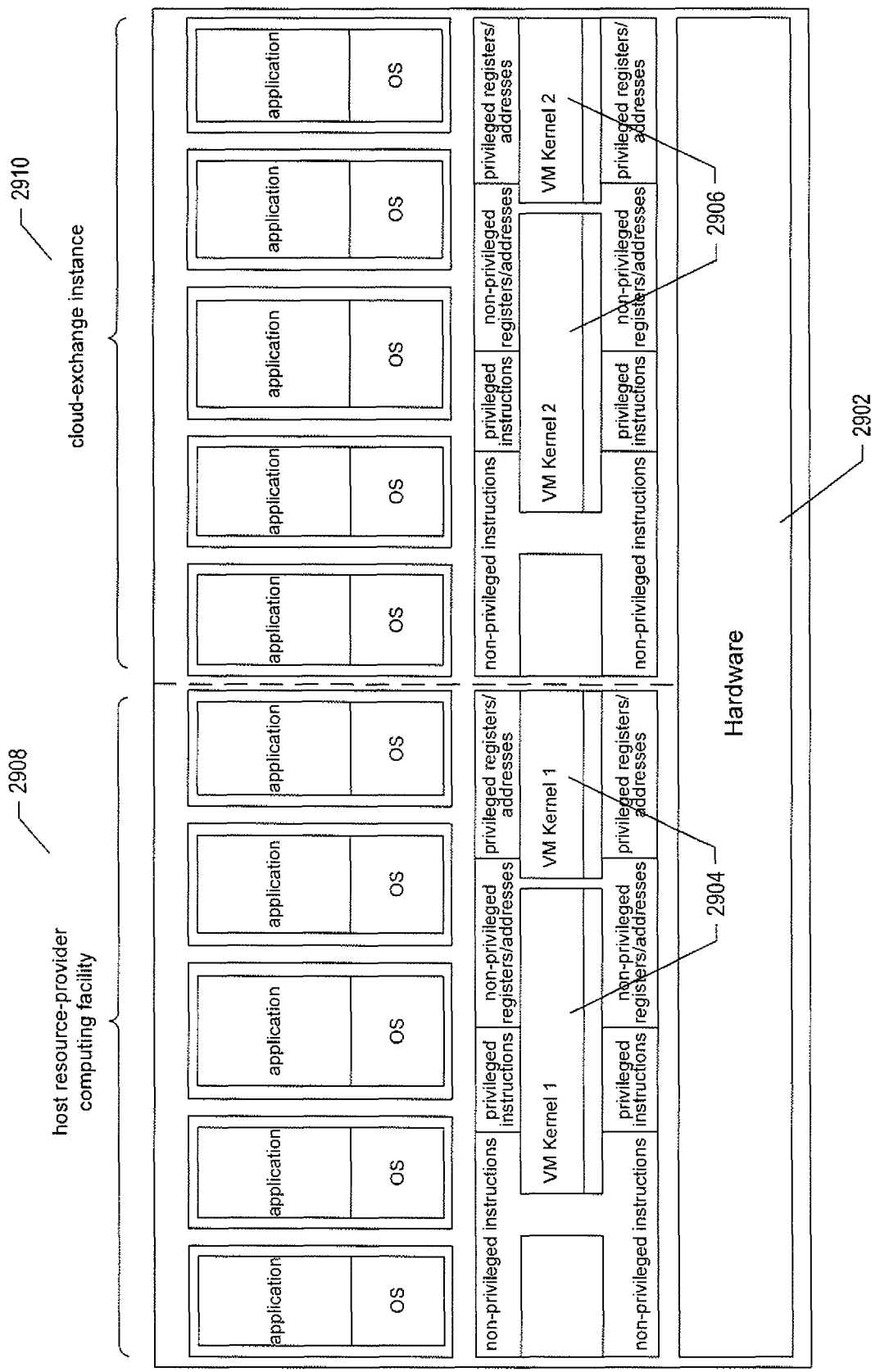
FIG. 29 illustrates a virtualization-layer related security method used in the resource-exchange system.

FIG. 29 illustrates yet another security method used in the resource-exchange system. As discussed above, the resource-exchange system employs various types of data-security encryption-based methods, secure communications, user-identity management subsystems, network-communications isolation, participant-anonymity, and other security techniques to secure identifying information and data associated with resource-exchange-system participants and hosted computational entities from inadvertent or malicious access and use. However, since the cloud-exchange system and the cloud-exchange local instances are implemented as sets of virtual machines, in the disclosed implementations, and since a primary type of computational entity that is hosted by resource-provider computing facilities is the virtual machine, which executes in an execution environment provided by a virtualization layer, the virtualization layer, itself, represents a potential security concern. Various types of computer-system and data-center management systems, for example, provide functionalities and services that allow administrators to access and control virtual-machine execution and virtual-machine-related data using functionalities provided by virtualization layers. In order to address security issues related to the virtualization layer, the resource-exchange system employs a dual-virtualization-layer-kernel technology to provide two separate virtualization-layer-provided execution environments that are separately administered by different administrative personnel or administrative-personnel proxies. FIG. 29 shows a block diagram similar to that shown in FIG. 8A, discussed above. However, although a single hardware layer 2902 is shown in the diagram, there are two different virtualization-layer kernels 2904 and 2906 that provide execution environments to two separate sets of virtual machines 2908 and 2910. The management and administrative interfaces provided by these two different virtualization-layer kernels are entirely separate and are separately secured to allow access only to authorized administrative users and automated proxies. One of the two virtualization-layer kernels is allocated by the resource-provider computing facility to the local cloud-exchange instance while the other is used within the resource-provider computing facility for execution of native virtual machines and administration of those native resources. Thus, servers within the resource-provider computing facility that execute hosted virtual machines and the local cloud-exchange instance are configured with the dual-virtualization-layer-kernel technology so that hosted virtual machines cannot be accessed or controlled through virtualization-layer administrative interfaces by the resource-provider computer system. Use of this dual-virtualization-layer-kernel technology in combination with the various security methods and subsystems discussed above provides an extremely robust and secure encapsulation of data and resources exchanged between resource-exchange-system participants and between the cloud-exchange system and resource-exchange-system participants.

Although the present invention has been described in terms of particular embodiments, it is not intended that the invention be limited to these embodiments. Modifications within the spirit of the invention will be apparent to those skilled in the art. For example, many different design and implementation parameters can be varied to produce alternative implementations, including choice of operating system, the hardware platforms and virtualization layers that are controlled by the distributed service-based application, modular organization, control structures, data structures, and other such parameters. Any of many different third-party security technologies can be used within the resource-exchange system for identity management, secure communications, data security, and virtualization-layer security.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated resource-exchange system comprising:
multiple resource-exchange-system participants that each
  includes multiple server computers, each having one or more processors and one or more memories, and
  includes a local cloud-exchange instance; and
a cloud-exchange system that
  is implemented on multiple physical server computers, each including one or more processors and one or more memories,
  includes a cloud-exchange engine,
  includes the multiple local cloud-exchange instances each included in one of the multiple resource-exchange-system participants,
  receives a request to host a computational-resources-consuming entity from a resource-consumer resource-exchange-system participant,
  determines a set of one or more candidate resource-exchange-system participants for hosting the computational-resources-consuming entity by evaluating resource-exchange parameters and constraints, including one or more communications-latency constraints,
  selects one or more resource-provider resource-exchange-system participants from the set of one or more candidate resource-exchange-system participants to host the one or more computational-resources-consuming entities,
  employs secure communications, secure data-storage, identity management, secure network extension, and resource-exchange-system-participant anonymity to protect the resource-exchange system from inadvertent or malicious access and operational interference, and
  encrypts data, received from a resource-exchange-system participant, prior to storage on mass-storage devices within the cloud-exchange system, using one or more encryption keys obtained from a secure third-party repository or from the resource-exchange-system participant, the data encryption carried out at the virtualization-layer level, and the one or more encryption keys themselves encrypted during transmission from the repository or resource-exchange-system participant to the virtualization-layer of a computer system in which the encryption is carried out.

2. An automated resource-exchange system comprising:
multiple resource-exchange-system participants that each
  includes multiple server computers, each having one or more processors and one or more memories, and
  includes a local cloud-exchange instance; and
a cloud-exchange system that
  is implemented on multiple physical server computers, each including one or more processors and one or more memories,
  includes a cloud-exchange engine,
  includes the multiple local cloud-exchange instances each included in one of the multiple resource-exchange-system participants,
  receives a request to host a computational-resources-consuming entity from a resource-consumer resource-exchange-system participant,
  determines a set of one or more candidate resource-exchange-system participants for hosting the computational-resources-consuming entity by evaluating resource-exchange parameters and constraints, including one or more communications-latency constraints,
  selects one or more resource-provider resource-exchange-system participants from the set of one or more candidate resource-exchange-system participants to host the one or more computational-resources-consuming entities,
  employs secure communications, secure data-storage, identity management, secure network extension, and resource-exchange-system-participant anonymity to protect the resource-exchange system from inadvertent or malicious access and operational interference, and
  encrypts data, generated and used by hosted virtual machine within a resource-provider-participant computer system, prior to storage on mass-storage devices within the cloud-exchange system, using one or more encryption keys obtained from a secure third-party repository or from the resource-consumer resource-exchange-system participant for which the virtual machine is being hosted.

3. The automated resource-exchange system of claim 2 wherein data encryption is carried out at the virtualization-layer level and wherein the one or more encryption keys are themselves encrypted during transmission from the repository or resource-exchange-system participant to the virtualization-layer of a computer system in which the encryption is carried out.

4. An automated resource-exchange system comprising:
multiple resource-exchange-system participants that each
  includes multiple server computers, each having one or more processors and one or more memories, and
  includes a local cloud-exchange instance; and
a cloud-exchange system that
  is implemented on multiple physical server computers, each including one or more processors and one or more memories,
  includes a cloud-exchange engine,
  includes the multiple local cloud-exchange instances each included in one of the multiple resource-exchange-system participants,
  receives a request to host a computational-resources-consuming entity from a resource-consumer resource-exchange-system participant,
  determines a set of one or more candidate resource-exchange-system participants for hosting the computational-resources-consuming entity by evaluating resource-exchange parameters and constraints, including one or more communications-latency constraints,
  selects one or more resource-provider resource-exchange-system participants from the set of one or more candidate resource-exchange-system participants to host the one or more computational-resources-consuming entities,
  employs secure communications, secure data-storage, identity management, secure network extension, and resource-exchange-system-participant anonymity to protect the resource-exchange system from inadvertent or malicious access and operational interference, and
  includes an identity-management subsystem that identifies and authorizes a user to access one or more interfaces to local cloud-exchange services provided by the local cloud-exchange instance within a resource-exchange-system participant, each interface associated with a role.

5. The automated resource-exchange system of claim 4 where the roles associated with interfaces to local cloud-exchange services include:
  a system-administrator role corresponding to a system-administrator interface that provides services that facilitate initial registration of a resource-exchange-system participant with the cloud-exchange system, ongoing monitoring of participation parameters established through registration, and modification of the values of the participation parameters:
  a business-administrator role corresponding to a business-administrator interface that provides services that facilitate entry of sensitive financial information, including bank-account information and tax-related information, into the cloud-exchange system;
  a junior-trade-administrator role corresponding to a junior-trade-administrator interface that provides services that facilitate creation of buy policies and assignment of buy policies to groups of virtual machines;
  a senior-trade-administrator role corresponding to senior-trade-administrator interface that provides services that facilitate activation of trade policies on behalf of a resource-exchange-system participant;
  a pricing-administrator role corresponding to a pricing-administrator interface that provides services that facilitate setting and modifying pricing parameters associated with resource-provider resources that are made available for hosting virtual machines and other computational entities through the resource-exchange system; and
  a trade-auditor role corresponding to the trade-auditor interface that provides services that facilitate access to trade-history information and to trade-transactions reports, including financial transactions and exchanges carried out through the cloud-exchange system.

6. An automated resource-exchange system comprising:
multiple resource-exchange-system participants that each includes multiple server computers, each having one or more processors and one or more memories, and
includes a local cloud-exchange instance; and a cloud-exchange system that
is implemented on multiple physical server computers, each including one or more processors and one or more memories,
includes a cloud-exchange engine,
includes the multiple local cloud-exchange instances each included in one of the multiple resource-exchange-system participants,
receives a request to host a computational-resources-consuming entity from a resource-consumer resource-exchange-system participant,
determines a set of one or more candidate resource-exchange-system participants for hosting the computational-resources-consuming entity by evaluating resource-exchange parameters and constraints, including one or more communications-latency constraints,
selects one or more resource-provider resource-exchange-system participants from the set of one or more candidate resource-exchange-system participants to host the one or more computational-resources-consuming entities,
employs secure communications, secure data-storage, identity management, secure network extension, and resource-exchange-system-participant anonymity to protect the resource-exchange system from inadvertent or malicious access and operational interference, and
includes a virtual-machine-transfer-and-instantiation subsystem that extends an internal communications network within a resource-consumer resource-exchange-system participant to a virtual machine hosted on behalf of the resource-consumer resource-exchange-system participant within a resource-provider resource-exchange-system participant, the virtual machine hosted on behalf of the resource-consumer resource-exchange-system participant within the resource-provider resource-exchange-system participant executing as if its IP addresses and other network-connectivity parameters were unchanged with respect to the IP addresses and other network-connectivity parameters that the virtual machine would employ were the virtual machine executing within the resource-consumer resource-exchange-system participant.

7. An automated resource-exchange system comprising:
multiple resource-exchange-system participants that each
includes multiple server computers, each having one or more processors and one or more memories, and
includes a local cloud-exchange instance; and
a cloud-exchange system that
is implemented on multiple physical server computers, each including one or more processors and one or more memories,
includes a cloud-exchange engine,
includes the multiple local cloud-exchange instances each included in one of the multiple resource-exchange-system participants,
receives a request to host a computational-resources-consuming entity from a resource-consumer resource-exchange-system participant,
determines a set of one or more candidate resource-exchange-system participants for hosting the computational-resources-consuming entity by evaluating resource-exchange parameters and constraints, including one or more communications-latency constraints,
selects one or more resource-provider resource-exchange-system participants from the set of one or more candidate resource-exchange-system participants to host the one or more computational-resources-consuming entities,
employs secure communications, secure data-storage, identity management, secure network extension, and resource-exchange-system-participant anonymity to protect the resource-exchange system from inadvertent or malicious access and operational interference, and
includes a virtual-machine-transfer-and-instantiation subsystem that extends an internal communications network within a resource-consumer resource-exchange-system participant to a virtual machine hosted on behalf of the resource-consumer resource-exchange-system participant within a resource-provider resource-exchange-system participant, the virtual-machine-transfer-and-instantiation subsystem instantiating virtual appliances within both the resource-consumer resource-exchange-system participant and the resource-provider resource-exchange-system participant in order to extend the internal communications network within the resource-consumer resource-exchange-system participant to the virtual machine hosted on behalf of the resource-consumer resource-exchange-system participant within the resource-provider resource-exchange-system participant, the virtual appliances including hybrid cloud manager virtual appliances, cloud-Gateway virtual appliances, and L2-concentrator virtual appliances that together comprise network-extension resources.

8. The automated resource-exchange system of claim 7 wherein the network-extension resources further include communications addresses, a finite number of which are allocated to each resource-exchange-system participant.

9. The automated resource-exchange system of claim 8
wherein a set of network-extension resources is allocated to each of a maximum number of incoming-extended-network connection within the resource-exchange-system participants;
wherein the incoming-extended-network connections occupy one of the three operational states ASSIGNED, INACTIVE, and UNASSIGNED;
wherein an incoming-extended-network connection in the UNASSIGNED state is assigned to extend an internal network of a resource-consumer resource-exchange-system participant to a virtual machine accepted for hosting by a resource-provider resource-exchange-system participant, changing the state of the incoming-extended-network connection to ASSIGNED;
wherein an incoming-extended-network connection in the ASSIGNED state transitions to the INACTIVE state when hosting of the virtual machine to which the incoming-extended-network connection was assigned terminates;
wherein, when no incoming-extended-network connections in the state UNASSIGNED are available, an incoming-extended-network connection in the INACTIVE state is reassigned to extend an internal network of a resource-consumer resource-exchange-system participant to a virtual machine accepted for hosting by a resource-provider resource-exchange-system participant, changing the state of the incoming-extended-network connection to ASSIGNED; and wherein, when no incoming-extended-network connections in the state UNASSIGNED or in the state INACTIVE are available within a resource-provider resource-exchange-system participant, the resource-provider resource-exchange-system participant does not accept additional virtual machines for hosting.

\* \* \* \* \*